United States Patent

[11] 3,612,767

[72] Inventors Harold P. Anderson
Lincroft;
Floyd K. Becker, Colts Neck; Robert D. Berryman, Red Bank; Nelson Botsford, Jr., Colts Neck; Maurice A. Hoffman, Woodbridge; Arthur P. Ryan, III, Belmar, all of N.J.

[21] Appl. No. 832,292
[22] Filed June 11, 1969
[45] Patented Oct. 12, 1971
[73] Assignee Bell Telephone Laboratories, Incorporated Murray Hill, N.J.

[54] EQUIPMENT FOR SELECTIVELY ESTABLISHING AUDIO AND WIDEBAND COMMUNICATION PATHS THROUGH TWO AUTONOMOUS SWITCHING SYSTEMS
28 Claims, 53 Drawing Figs.

[52] U.S. Cl. .......... 179/2 TV, 179/18 C, 179/18 EA
[51] Int. Cl. .......... H04m 11/08
[50] Field of Search .......... 179/2 TV, 2 DP, 18 EA, 18 C; 178/68 PD

[56] References Cited

UNITED STATES PATENTS

| | | | |
|---|---|---|---|
| 3,335,226 | 8/1967 | Michael et al. | 179/81 |
| 3,316,354 | 4/1967 | Svala | 179/18.21 |
| 3,001,027 | 9/1961 | Armstrong et al. | 179/18.21 |

FOREIGN PATENTS

| | | | |
|---|---|---|---|
| 1,122,924 | 8/1968 | Great Britain | 179/2 |

*Primary Examiner*—Kathleen H. Claffy
*Assistant Examiner*—Thomas D'Amico
*Attorneys*—R. J. Guenther and James Warren Falk

ABSTRACT: Independently operated switching systems which are actuated on every call are disclosed for establishing via one system audio-only communication paths and via the other system wideband as well as audio communication paths. Initially, both systems are connected on a call and one of them is released by the caller for determining the particular switching system and therefore the necessary switching facilities to be utilized on the call.

INVENTORS H. P. ANDERSON
F. K. BECKER
R. D. BERRYMAN
N. BOTSFORD JR.
M. A. HOFFMAN
A. P. RYAN III

BY Charles H Davis

ATTORNEY

PATENTED OCT 12 1971

3,612,767

EQUIPMENT FOR SELECTIVELY ESTABLISHING AUDIO AND WIDEBAND COMMUNICATION PATHS THROUGH TWO AUTONOMOUS SWITCHING SYSTEMS

BACKGROUND OF THE INVENTION

Our invention concerns communication equipment and particularly, switching arrangements including separate switching systems for independently establishing wideband and audio path connections between customer stations. More particularly, the invention pertains to apparatus which is controllable by a caller to direct the establishment of an audio path or alternatively a video-audio path via the separate systems.

The video telephone equipment required for providing visual as well as audio communications between telephone customers is manifestly more complex and it requires more sophisticated circuit arrangements than that presently available in conventional audio-only switching systems. For example, the switchable paths conveying video communication signals require an appreciably wider bandwidth capability than audio signal paths because video signals contain higher frequency components. Moreover, during the establishment of such video paths, path continuity tests must be performed and enabling signals with unique video formats must be forwarded to the connected stations. Importantly, video telephone equipment must be selectively capable of establishing audio-only, or video and audio paths on particular calls as required by calling customers.

Some arrangements have been devised in the past for adding video communication to audio switching facilities, but they are costly, inflexible and in the main limited to the particular type of switching system for which they have been devised. In one such arrangement, an existing audio switching network is augmented by a separate video network which is essentially in parallel with the audio network. Consequently, there is a one-to-one correspondence between voice and video paths. Since ordinarily only a small percentage of customers are equipped with video station apparatus, that arrangement has manifest inefficiencies because initially video switching capability for all customer lines is furnished.

In other arrangements, an autonomous switching facility is provided for the separate establishment of a video communication path while a companion audio communication path is established via existing switching facilities. This arrangement, while it has various advantages and is fully flexible allowing the video switching facilities to be tailored to customer needs, requires additional equipment to coordinate the action of the separate facilities. Otherwise, the audio and video portions of a call could be inadvertently separated and result in the establishment of the different call portions on unrelated call connections. This additional equipment is expensive and increases the time required to establish the entire call connections.

In view of the foregoing, it may be appreciated that a need exists for a switching arrangement to interconnect customers equipped for video service which arrangement is entirely controlled by the caller who can also select the type of call, i.e., audio-video, or audio-only, and direct its establishment through appropriate switching facilities.

SUMMARY OF THE INVENTION

In accordance with the principles of this invention, separate and autonomously operated switching systems are furnished to interconnect audio as well as video station equipments. One system, a video-audio switching system, has the capability of establishing audio paths as well as wider bandwidth communication paths between customer terminals. The other system is limited to the completion of audio-only communication paths. Although both systems are initially connected to a calling customer line upon the receipt of a call request signal, the calling customer, advantageously, controls the release of one system before forwarding the address of the called customer to the connected system. In this manner, the customer selects the system, and therefore the appropriate switching facilities which are to be utilized in establishing the particular call.

With reference to FIG. 1, when the caller desires to initiate an audio or a video-audio call connection to another customer, he removes the receiver of his audio station set, e.g., set S1, in the customary manner. This directs a signal to the video-audio switching system which, in turn, connects an available register circuit (Path 1) to the caller line circuit V1. In addition, a video communication path, referred to hereinafter as a video quad, is extended from video terminal equipment, PP1, at the caller station to the switch network of the video-audio switching system. As soon as this connection is completed and verified, the connected register circuit under control of the video-audio system common control CC forwards a signal to the calling video line circuit V1.

Line circuit V1 subsequently sends a service request to the audio-only switching system via a separate line and line circuit, A1, appearance thereof. In response to this service request a second connection from video line circuit V1 to an idle register circuit (Path 2) of the audio-only system is established. This register circuit returns dial tone to the caller for indicating that system selection and dialing may commence.

A salient aspect of our invention is the provision of equipment enabled by the calling customer to choose the audio-only switching system or the video-audio switching system to complete call connections. The system selection is advantageously made quite simply and effectively by dialing a prefix digit. If the prefix digit is sent before the address code, the visual-audio communication channel is selected. Alternatively, commencing to dial the address code without the prefix digit selects an audio-only communication channel.

Equipment in the video-audio system is responsive in either case to release itself or control the release of the audio-only system. If a prefix digit is forwarded, both system register circuits record the digit but the register circuit of the video-audio system includes circuitry for detecting the digit. In that event, a signal is sent by the detection circuit to video line circuit V1 releasing the audio-only system connection. It is noted, calling line circuit A1 appearance in that system continues to appear busy to other calls.

If the customer commences to dial the address code without dialing a prefix digit, the detection circuitry determines the customer desires an audio-only connection. Accordingly, the circuitry forwards a signal to the video line circuit V1 which releases the video-audio system connection. Advantageously, the aforementioned system is released without interference with the transmission of the remaining portion of the address code and without requiring that the caller delay dialing until the particular system releases.

In accordance with another aspect of our invention, incoming audiovisual calls may be extended on an audiovisual basis or, alternatively, on an audio-only basis, thereby abandoning the visual portion of the call. This latter choice is under control of an attendant and is made only when the potentiality of completing the inward audiovisual call is affected by troubles in the video-audio system or when the called customer is not equipped to receive visual-audio calls.

Inward calls are extended via a video trunk circuit T1–Tn to an attendant and also to the called customer terminal. Similar to the video line circuit, V1 or V2, each such trunk circuit connects to the video-audio switching system as well as the audio-only switching system. When a video trunk circuit is seized by a distant office, a seizure signal is forwarded to an attendant's console and to a position applique circuit. A lamp lights at the console position and the attendant answers by depressing a key associated with the particular trunk circuit. This automatically establishes audio and visual communications between the attendant and the calling customer. After ascertaining the called customer address code, the attendant depresses a start key for initiating a register circuit-to-trunk circuit connection via both systems.

The register circuit of the video-audio system is first connected and subsequently a register circuit of the audio-only switching equipment is connected to the video trunk circuit. Under these circumstances the detecting circuitry of the register circuit in the video-audio system is disabled and a prefix digit is simulated and stored in the register circuit. The foregoing enables the attendant to directly release either system and also does away with the necessity of dialing or keying a prefix digit before the address code. After one system is released, the attendant dials the address code and the connected system completes the connection.

In addition to the foregoing, our invention also pertains to certain operational aspects of the video-audio switching system. After the establishment of each call connection and before the common control releases from a particular call, a video continuity test is conducted over the video communication path to ascertain the continuity and transmission quality of the visual communication channel. Failing in this test, the common control automatically enters a new operational mode whereby the caller is connected both audibly as well as visually to a special announcement facility for reporting the difficulty. Other such aspects will become more apparent from a reading of the ensuring detailed description.

BRIEF DESCRIPTION OF THE DRAWING

A full understanding of the arrangement contemplated by the present invention as well as an appreciation of the various advantageous features thereof may be gained from consideration of the following detailed description in connection with the accompanying drawing, in which:

FIGS. 40 to 51 show the central office trunk circuit;

GENERAL SYSTEM DESCRIPTION

Figure 1:
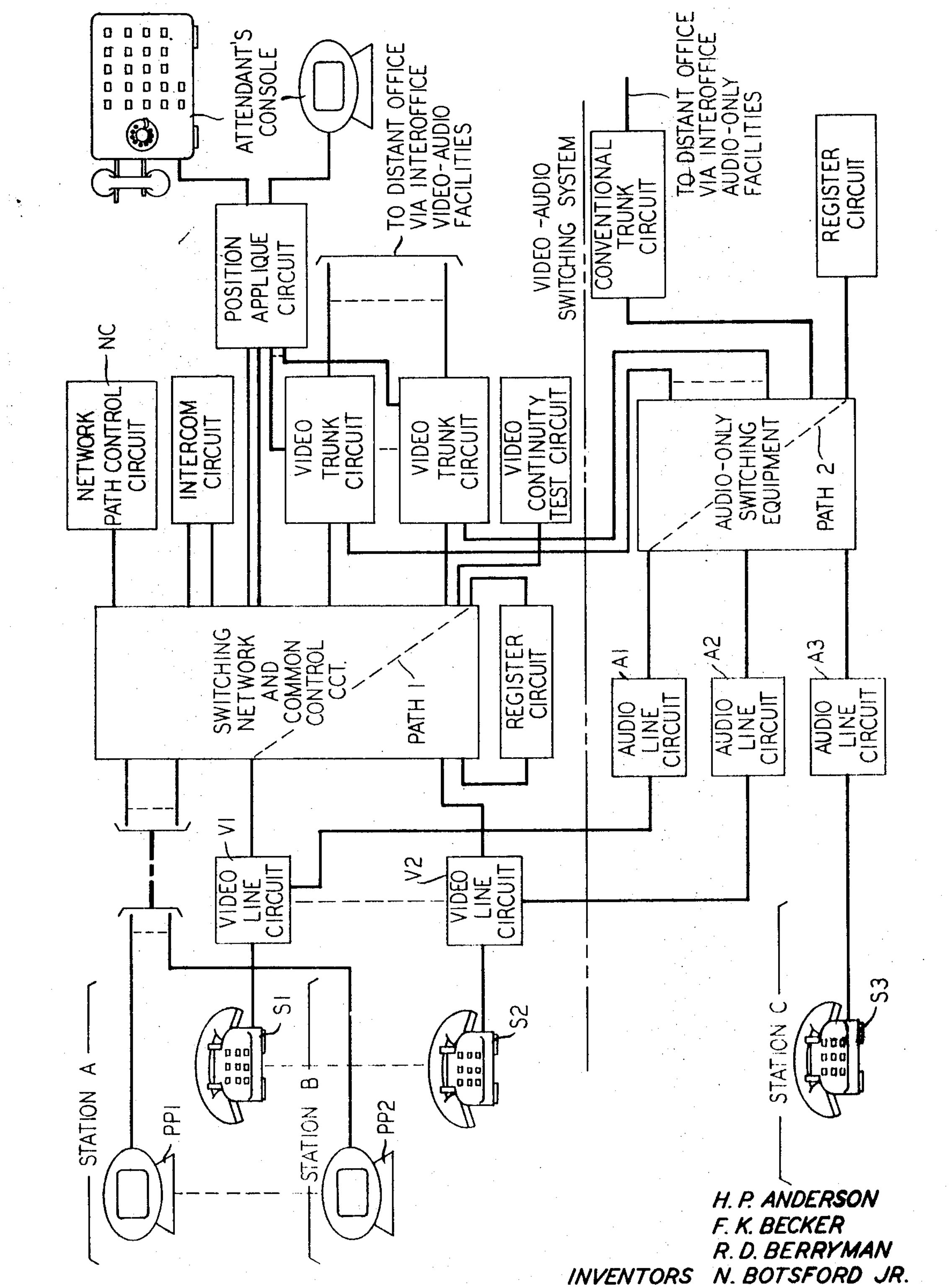
FIG. 1 shows schematically the relationship of certain of the basic individual circuits which comprise one specific illustrative embodiment of the switching system arrangement contemplated by the invention.

The system arrangement and the operation of the various components of the illustrative embodiment of the invention will be described in detail subsequently with reference to FIGS. 2–51 inclusive. However, in order to first gain a general overall understanding of the arrangement contemplated, a brief general description will be given at this point with reference particularly to FIG. 1. The latter depicts schematically a video-audio switching system for establishing concurrently both audio as well as video path connections. In addition, FIG. 1 depicts facilities for connecting station telephone equipment to an audio-only switching system for controlling the establishment of audio-only connection paths. An example of one such system is disclosed in U.S. Pat. No. 3,377,432 to H. H. Abbott et al. issued Apr. 9, 1968. Let it be assumed in subsequent discussions that the Abbott et al. system is utilized herein to furnish such audio-only connections.

In an effort to simplify the description so far as possible consistent with disclosure of the invention, there are shown in FIG. 1 only three stations, station A, B and C, two video line circuits V1, V2 and three audio line circuits A1–A3. In an actual installation there would ordinarily be a plurality of such stations (as indicated by the dashed lines between stations A and B) and a plurality of video and audio line circuits to connect those stations to the respective switching systems.

Each station having video as well as audio terminal equipment, such as stations A and B, have their respective station subsets S1 and S2 connected directly to video line circuits V1, V2 and three audio line circuits A1–A3. In an actual installation there would ordinarily be a plurality of such stations (as indicated by the dashed lines between stations A and B) and a plurality of video and audio line circuits to connect those stations to the respective switching systems.

Each station having video as well as audio terminal equipment, such as stations A and B, have their respective station subsets S1 and S2 connected directly to video line circuits V1 and V2. Station C represents the customary line connection where only audio terminal equipment is furnished at the station. As shown, the station subset S3 connects directly to a conventional audio line circuit A3. Each video line circuit, V1 and V2, is in turn connected to the network of the video-audio system and also to respective audio line circuits A1 and A2 which connect to network terminal appearances of the audio-only switching system.

The network of the video-audio system is not shown in detail herein. It is contemplated that a full access (nonblocking) ferreed switching array be furnished and be operated in much the same manner as the network shown in Abbott et al. Sufficient intranetwork paths are available to assure that a unique path is available on every call connection. Thus, the marking of two network appearances always defines a discrete path through the array between the marked terminals. For an example of a switching array suitable for this arrangement reference may be made to U.S. Pat. No. 3,110,772 to W. S. Hayward, Jr. of Nov. 12, 1963.

Additional details relating to the manner in which individual line circuits, truck circuits, etc., are connected to the video-audio network may be gained by reference to the aforementioned Abbott et al. patent.

It is noted that in our arrangement six wire connections are established between a calling and a called customer's audio and video equipment via the video-audio network. Hayward and Abbott et al. disclosed networks for establishing two wire audio connections. In our arrangement, four wires, termed a video quad, are required to interconnect station video equipments, such as PP1–PP2, while two more interconnect station subscriber sets, i.e., subsets, such as S1 and S2, for audio communication. Although the number of cross-points operated during a call connection is increased in our arrangement over that described in Hayward or Abbott et al., the additional cross-points may be added in a manner well known in the art. Also, the contemplated array control circuitry of our network is substantially the same as in Abbott et al. and in Hayward.

Figure 52:
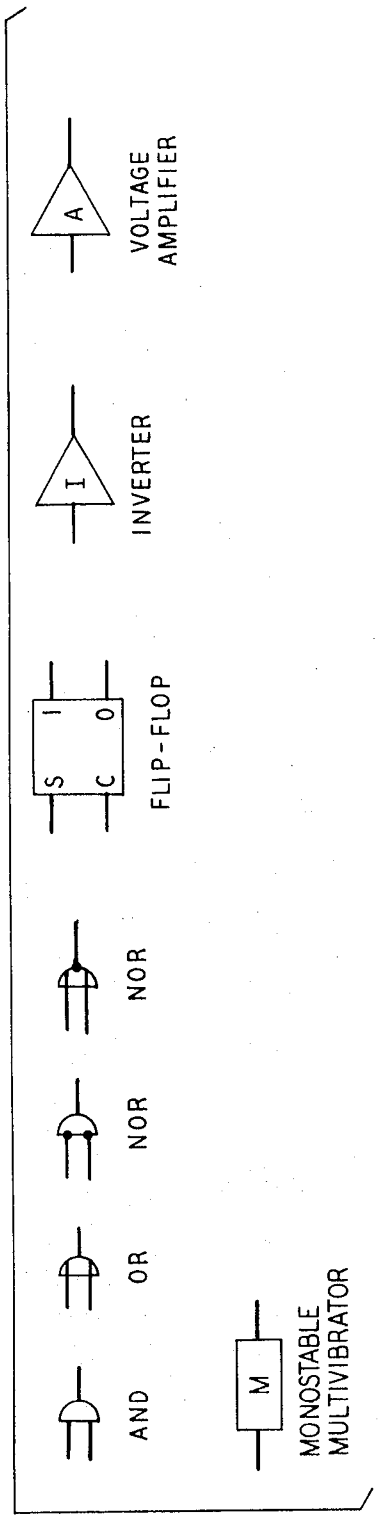
FIG. 52 shows drawing convention symbols.
Figure 53:
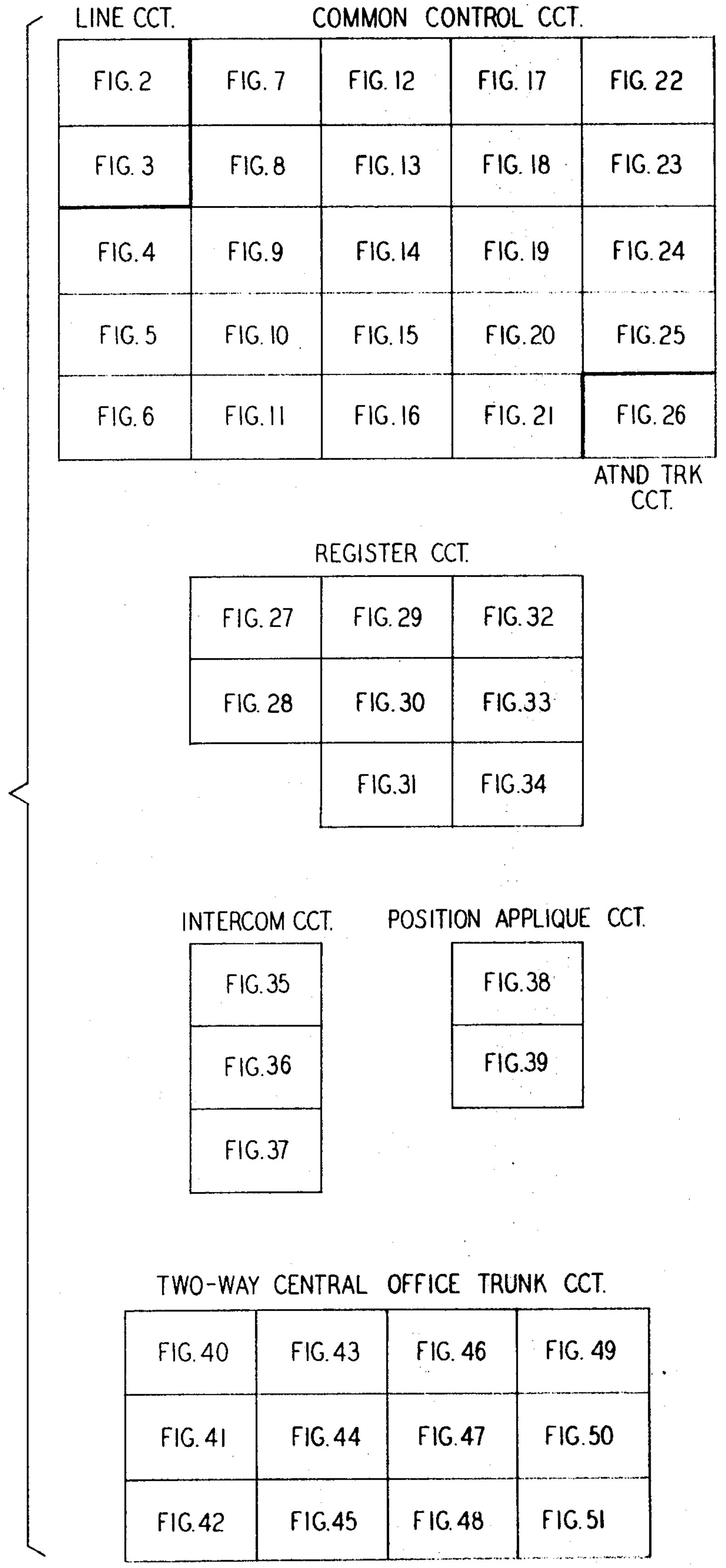
FIG. 53 shows the manner in which FIGS. 2 to 51 should be arranged to show the specific illustrative embodiment of the invention.

Before proceeding with the detailed description it is opportune at this time to discuss drawing conventions and the terminology used in describing the circuit actions. The conventions employed to describe gates, flip-flop, etc., are depicted and labeled in FIG. 52. In subsequently describing the operating voltage signals associated with these gates, reference is made to high or high signals as well as to low or low signals. Ordinarily, a high-signal (a positive or negative voltage depending on the type of transistor used in the gate circuitry) turns on a gate, sets, or resets (clears) a flip-flop. A low signal, essentially ground in most instances, is the output of a turned on gate or of terminal 0 of a set flip-flop.

To assist the reader in following the circuit operations, each lead is designated with a letter designation followed in parenthesis by a number. The latter corresponds to the figure number to which the lead may be traced.

Certain portions of the overall operation of the present arrangement are in general accord with the operation of systems known in the prior art and fully described in prior patents. In order to prevent undue complication of the present disclosure, those operations described in earlier patents will be referred to here, and also in the subsequent detailed description, only to the extent necessary for a full and complete understanding of the presently contemplated novel arrangement. For example, certain of the switching operations and control thereof, particularly with regard to common control circuit operations, are generally similar to corresponding operations and controls embodied in the No. 800 Private Branch Exchange which was developed by the Bell System and is disclosed in the aforementioned Abbott et al. patent.

DETAILED DESCRIPTION

Connection from a Caller to Both Systems

Let it be assumed that station A initiates a call by removing the handset from the cradle of subset S1. The latter in FIG. 2 connects video line circuit V1 via leads T and R. This action places a low-resistance bridge across leads T and R for turning off gate LA and signaling a call request. When station A is on-hook, gate LA is normally turned on and held in that state by common control CC. During this period control CC applies +24 volts to lead Fe which is coupled via network RLC3 to the 1 input of gate LA. The other input leads of gate LA, (*a*)T, (*b*)T, (*c*)U, and (*d*)U, are low at this time. In addition to the +24 volts, common control CC also connects −24 volts to lead Ge which is connected via network RLC3 and a break contact of transfer contact 3CO–2 to lead R. Thus, when leads T and R are bridged by lifting the receiver, −24 volts is coupled via lead T, break contact of transfer contact 3CO–4, and network RLC3 to the 1 input of gate LA turning it off. The output of gate LA connects to control CC via diode D1, a break contact of transfer contact 3CO–1, diode D2 and lead LI1 and causes control CC to be activated into a dial tone mode.

Figure 6:
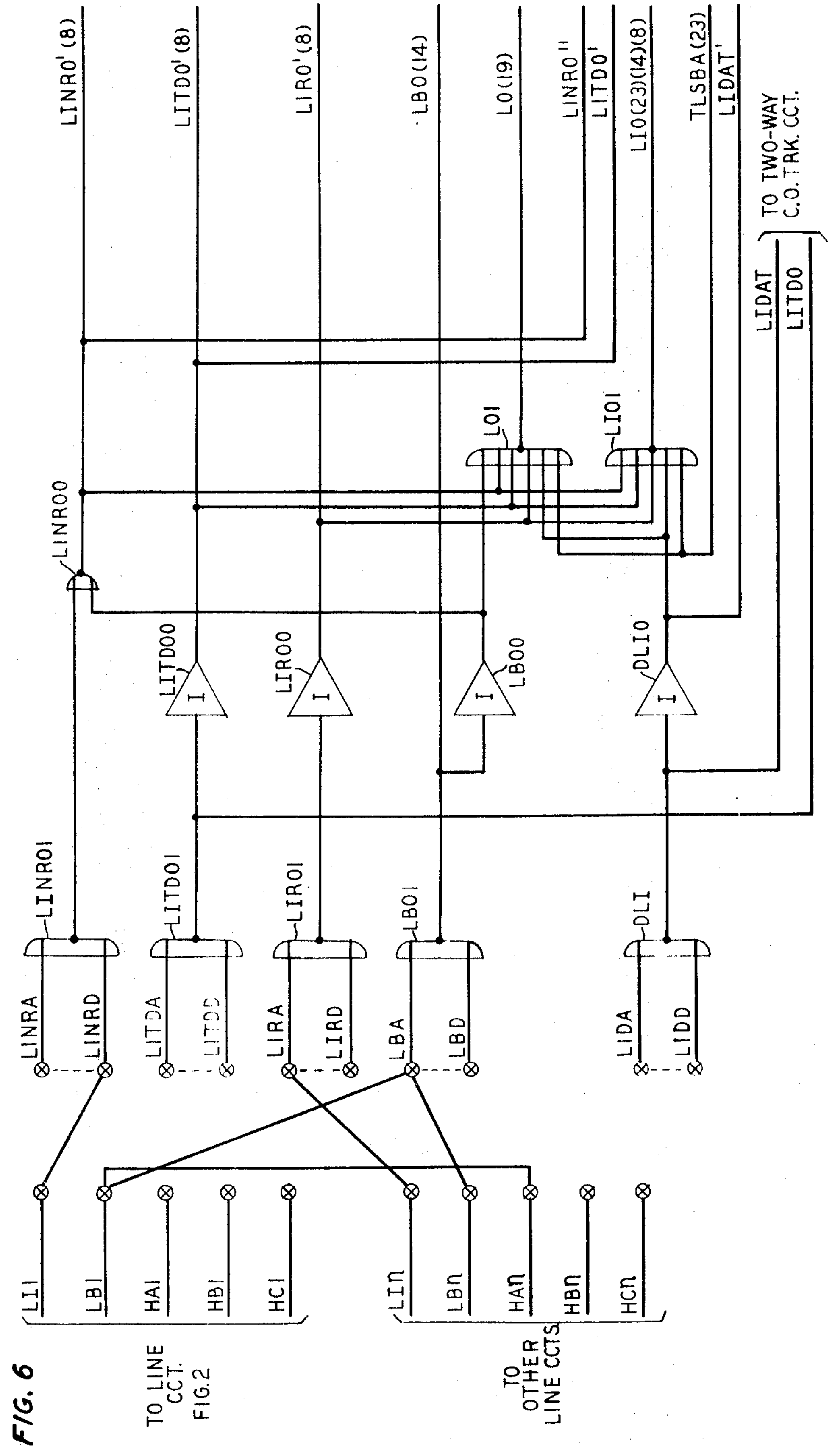

Turning next to the details of the dial tone mode of operation of control CC and with reference to FIG. 6, lead LI1 from circuit V1 terminates on a cross connect punching shown to the left of that figure. As shown, the punching is cross-connected to a punching designated LINRD, an input of gate LINRO1. Other punchings associated with gate LINRO1, such as punching LINRA, are wired (not shown) to other video line circuits such as circuit V2 associated with station B. When lead LI1 goes high, gate LINRO1 is switched and its output is low. The low signal connects to the input of gate LINRO0. At this time the other input of gate LINRO0 which is connected to the output of gate LBO0 is also low and thus lead LINRO′, the output of gate LINRO0, is high. In FIG. 6, the high signal on lead LINRO′ may be traced to gate LIO1 which is switched on producing a low signal on lead LI0. This low signal may be traced to FIG. 23 via the intracircuit cable and therein it connects to gate LDTC.

As the first order of business control CC establishes the preference of the dial mode of operation over all other operational modes. Gate LDTC is switched as a result of the low signal on lead LI0 if the other inputs, leads RELC and RA are low concurrently. Lead RELC is low, if the network controller (discussed subsequently) is idle, and lead RA is low, if at least one register circuit is idle. Assuming that this dial tone request is the only bid for service, gate LDTC switches and sends a high signal to inverter LDTB. The latter inverts the signal and forwards a low signal to gate LDTA. If, at this time the various circuits of control CC are idle gate LDTA is switched and its output circuitry generates a high signal which is forwarded through a delay network, DN1, to flip-flop LDT″. The latter is set and as a result a high signal is generated at its terminal 1 and a low signal at terminal 0, corresponding respectively to leads LDT and LDT″. The setting of flip-flop LDT″ establishes the line dial tone mode of control CC. Thus all other so-called mode requests are locked out. Specifically, lockout occurs as a result of the high signal on lead LDT which connects to gate MCB′. The latter is switched and produces at its output a low signal which is inverted by gate MCA′. The output of gate MCA′ connects to inputs of gates TDTA, LDTA and RRA and disables those gates for preventing the setting of flip-flops RR″ and TDT″ or alteration of the set state of flip-flop LDT″.

Figure 4:
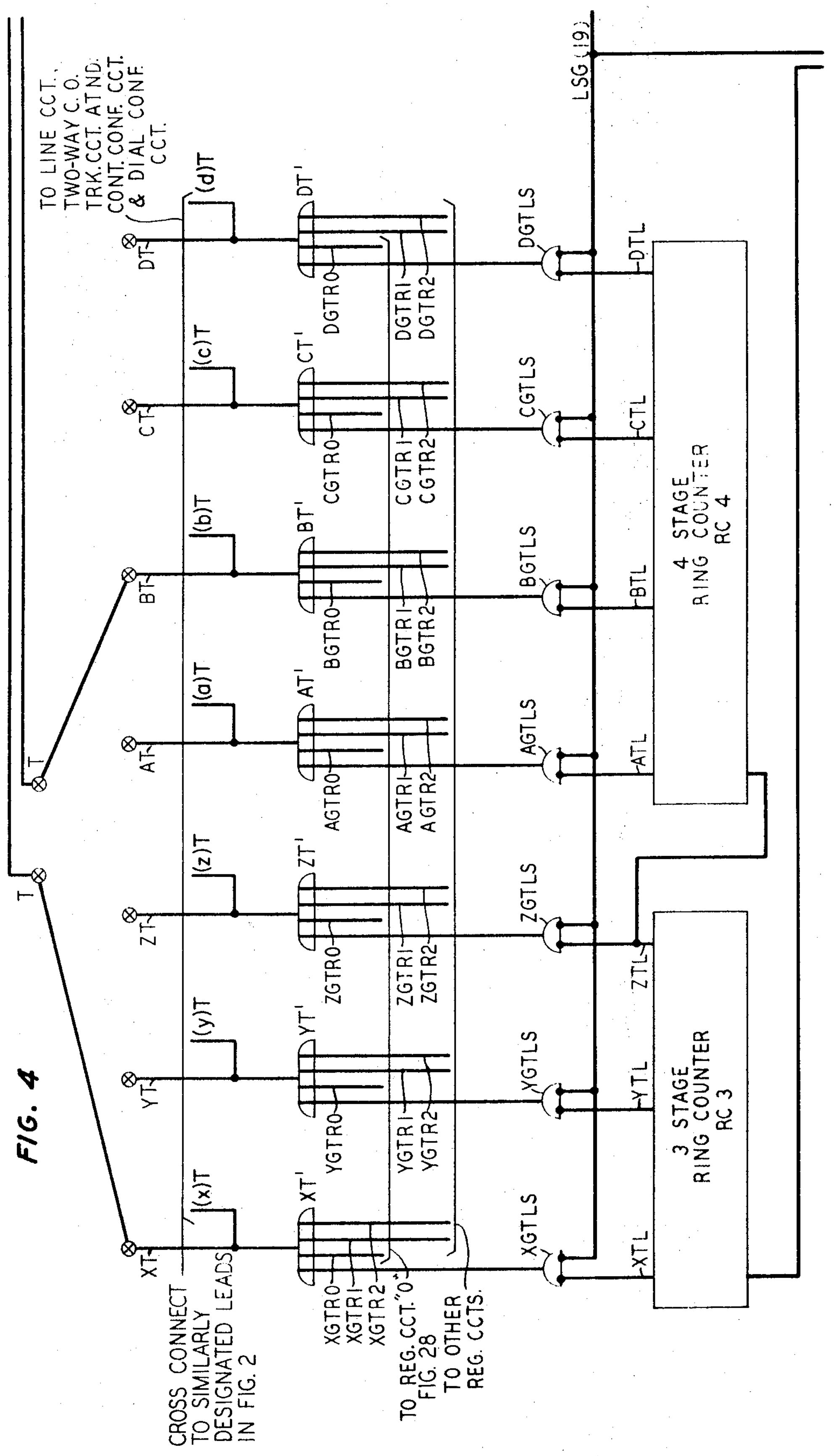
FIGS. 4 to 25 show the common control circuit.
Figure 5:
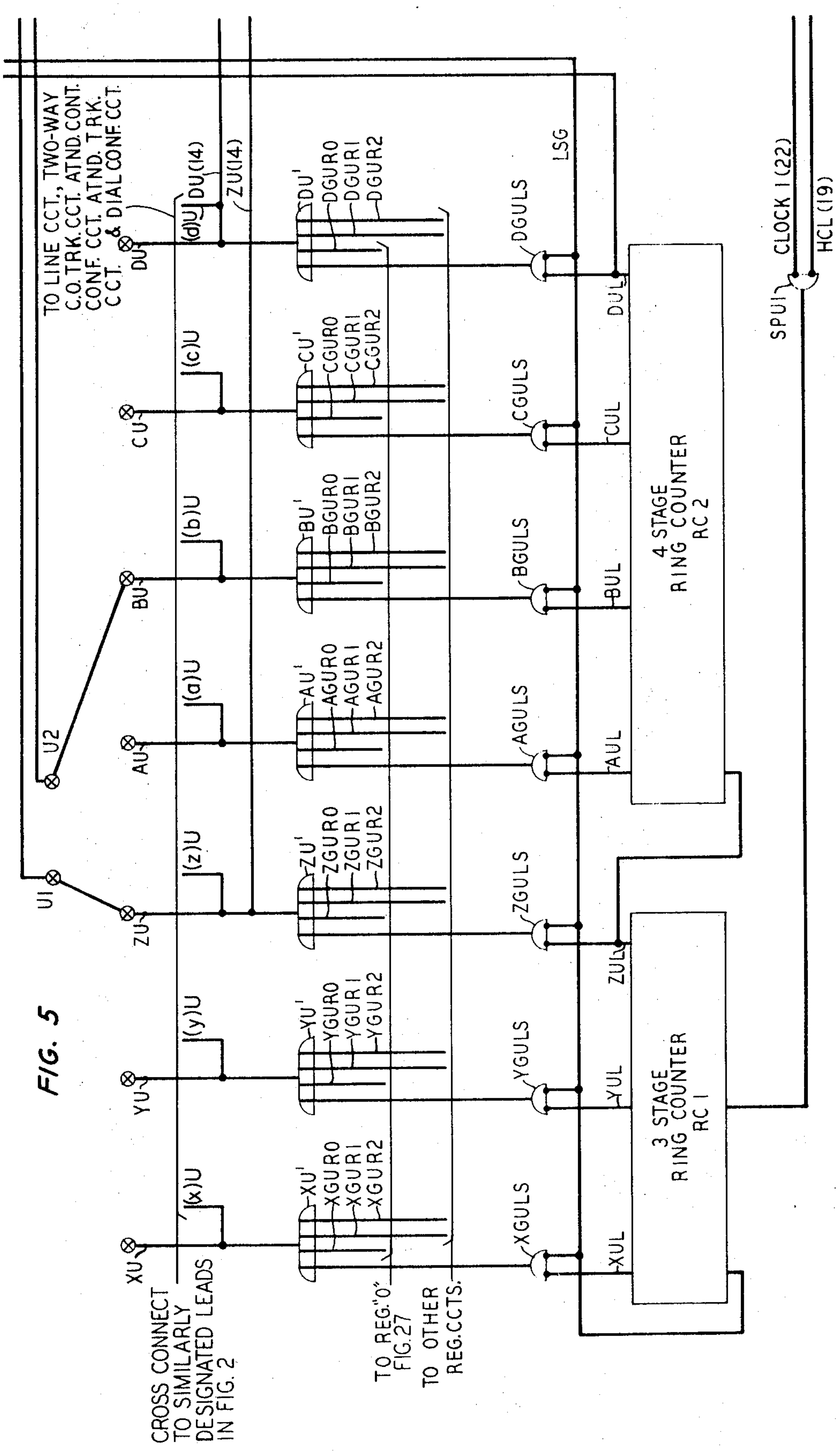

Continuing now with the operation of control CC, the line scanner shown in FIGS. 4 and 5 is energized by the high signal on lead LDT to identify the calling line. Lead LDT may be traced from FIG. 23 to FIG. 19 wherein the high signal on that lead causes gate LSCA to switch and produce a low signal at its output. The output of gate LSCA is coupled to a one-shot pulse generator PG1 which generates a "clear" pulse. That pulse is connected to terminal C of flip-flop HCL which is reset as a result. Flip-flop HCL″ in this state produces a high signal at terminal 0 and a low signal at terminal 1, respectively coupled to leads HCL′ and HCL. The line scanner is energized by the low signal on lead HCL. The latter may be traced from FIG. 19 to FIG. 5 via the intracircuit cable and in FIG. 5 to gate SPU1. The other input to gate SPU1 connects to clock 20, shown in FIG. 22, which periodically generates low signals on lead clock 1. Each time the two inputs to gate SPU1 are low the gate switches and a pulse is forwarded to ring counter RC1. Referring once again to FIG. 19 when gate LSCA switches a low signal is produced on lead LSG, which may be traced to FIG. 5 for enabling of inputs to gates XGULS, YGULS, ZGULS, AGULS, BGULS, CGULS, and DGULS. Similarly, seven gates of FIG. 4 are also partially enabled.

Figure 2:
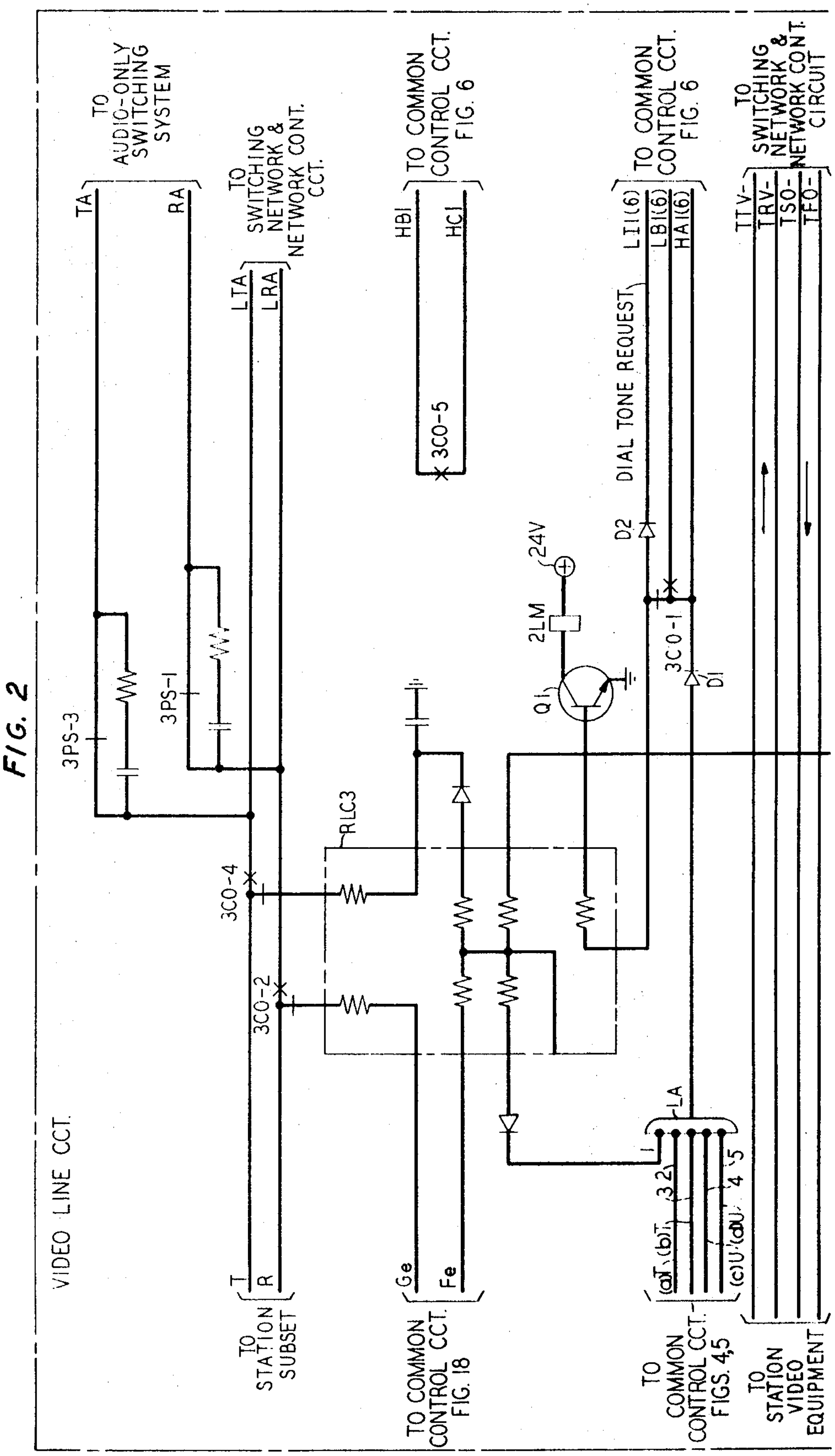
FIGS. 2 and 3 show a video line circuit.

Referring now with more particularity to the line scanner of FIGS. 4 and 5, it comprises four conventional ring counters RC1, RC2, RC3 and RC4 which are associated in pairs, e.g., counter RC1 and RC2 of FIG. 5, to determine the tens and units identity of the off-hook line. For details of ring counter circuitry which may be utilized in this arrangement reference may be made to U.S. Pat. No. 3,366,778 issued Jan. 30, 1968 to V. R. De Stefano. For particular detail as to the operation of ring counters in general when used to locate an off-hook lines refer to the FIG. 21 and to column 15 et seq. of the aforementioned Abbott et al. patent. As a result of the clock pulses received at counter RC1 and the intercounter stage wiring such as from lead ZUL of counter RC1 to counter RC2, from lead DUL of counter RC2 to counter RC3 and from lead ZTL of counter RC3 to counter RC4, various code leads are systematically enabled. The code leads, XU, YU, ZU, AU, BU, CU, and DU of FIG. 5 and XT, YT, ZT, AT, BT, CT, DT of FIG. 4 are energized via so-called code lead amplifiers which are in actuality "OR" gates bearing the same designation as the associated code lead. Each video line circuit is assigned a unique tens-unit identity which corresponds to four leads out of the fourteen code leads and is directly wired to the corresponding four code lead amplifiers. With reference to FIG. 2, lower left-hand corner, leads (*a*)T, (*b*)T, (*c*)U, and (*d*)U represent the four line circuit leads to be connected to the code lead amplifier. (Leads (*x*)T, (*y*)T, (*z*)T, (*a*)T, (*b*)T, (*c*)T, (*d*)T, (*x*)U, (*y*)U, (*z*)U, (*a*)U, (*b*)U, (*c*)U, (*d*)U.)

The procedure for detecting the off-hook line is as follows. The line scanner of FIGS. 4 and 5 places low signals on the four line identity leads, (*a*)T, (*b*)T, (*c*)U, and (*d*)U, and gate LA of FIG. 2 turns off. The operation of gate LA in this arrangement is quite unique and bears closer scrutiny. It will be recalled that normally gate LA is turned on when the line circuit is on-hook and it turns off as previously described when the customer takes his receiver off-hook. At the start of the line scanner operation, since at least one of the four identity leads contains a high signal, gate LA again turns on. Thus, when all four identity leads are low, gate LA turns off for the second time indicating that the calling line has been located. Specifically, the line scanner is stopped and the identity of the calling circuit is locked therein in the following manner. Gate LA produces a high signal which is coupled via diode D1, a break contact on transfer contact 3CO–1, diode D2 and lead LI1 which is traceable to FIG. 6 wherein it cross-connects via punchings to gate LINRO1. The latter gate being switched generates an output which couples to gate LINRO0 which also switches and produces a signal on its output. That signal switches gate LO1 and its output which connects to lead LO, is a low signal. Lead LO may be traced to FIG. 19 wherein the low signal is inverted by gate LO0 and forwarded via gate HCLA to terminal S of flip-flop HCL″ which is set. The setting of flip-flop HCL″ stops the scanner because the low signal on lead HCL is replaced by a high signal and gate SPU1 of FIG. 5 is turned off to disconnect clock 20.

Also, as a result of gate LA in FIG. 2 turning off the second time, the line circuit marks its location in the switching network (not shown) preparatory to the establishment of a network path between the calling line circuit and a digit register circuit. In particular, the high signal at the output of gate LA may be traced via diode D1, break contact on transfer contact 3C0–1 and network RLC3 to transistor Q1 which operates relay 2LM. The latter at its contacts 2LM–3 and 2LM–4 shown in FIG. 3 couples a ground via a break contact of transfer contacts 3CO–6 to a network control circuit (not shown). The latter ground is connected on leads LC and LD and provides what is referred to as mark signals for path selection.

Figure 19:
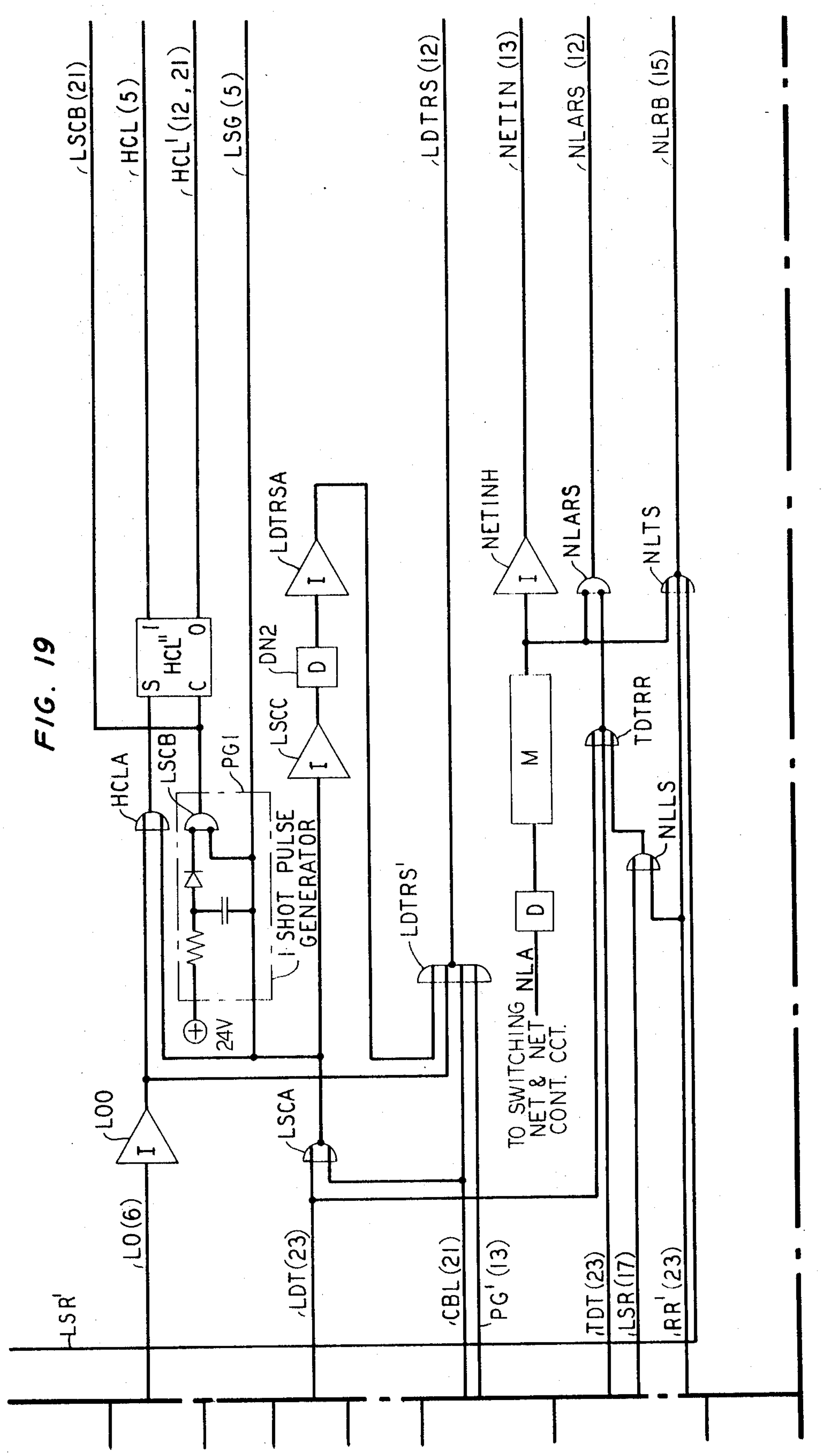

It is to be noted that if no line circuit is located after a predetermined interval of time which is determined by the circuitry in FIG. 19 including inverters LSCC and LDTRSA and delay network DN2, control CC automatically resets from the dial tone mode and the request is abandoned. Specifically, after the timed interval, inverter LDTRSA forwards a low signal to gate LDTRS. If the output of inverter LO0 is still low indicating the line circuit has not been located, all inputs to gate LDTRS′ are low and a high signal is generated on lead LDTRS for actuating the reset circuitry of FIG. 12 and for restoring the circuit to normal.

Returning to the discussion of the call establishment, the register for serving this call is located and marked in the following way. Returning to FIG. 6, since the calling circuit V1 is located and its gate LA is turned off, lead LINRO′ is high. The lead is connected to FIG. 8 wherein gate LIOA′ is switched producing a low signal on lead LIOA. The latter may be followed to FIG. 24 where it connects to gate MTR1. As lead LDT′ is low (dial tone mode) at this time gate MTR1 is switched and its output, a high signal, is inverted by inverter MTRO and coupled to the register circuits via lead MTR′. The manner in which register circuits are preferred, located by operation of an idle circuit scanner and connected to the network control circuit is disclosed in detail hereinafter. For present purposes it is sufficient to state that a register circuit is marked in the network in response to the low signal on lead MTR′. Thus at this point a line circuit and register circuit are marked in the network.

Figure 13:
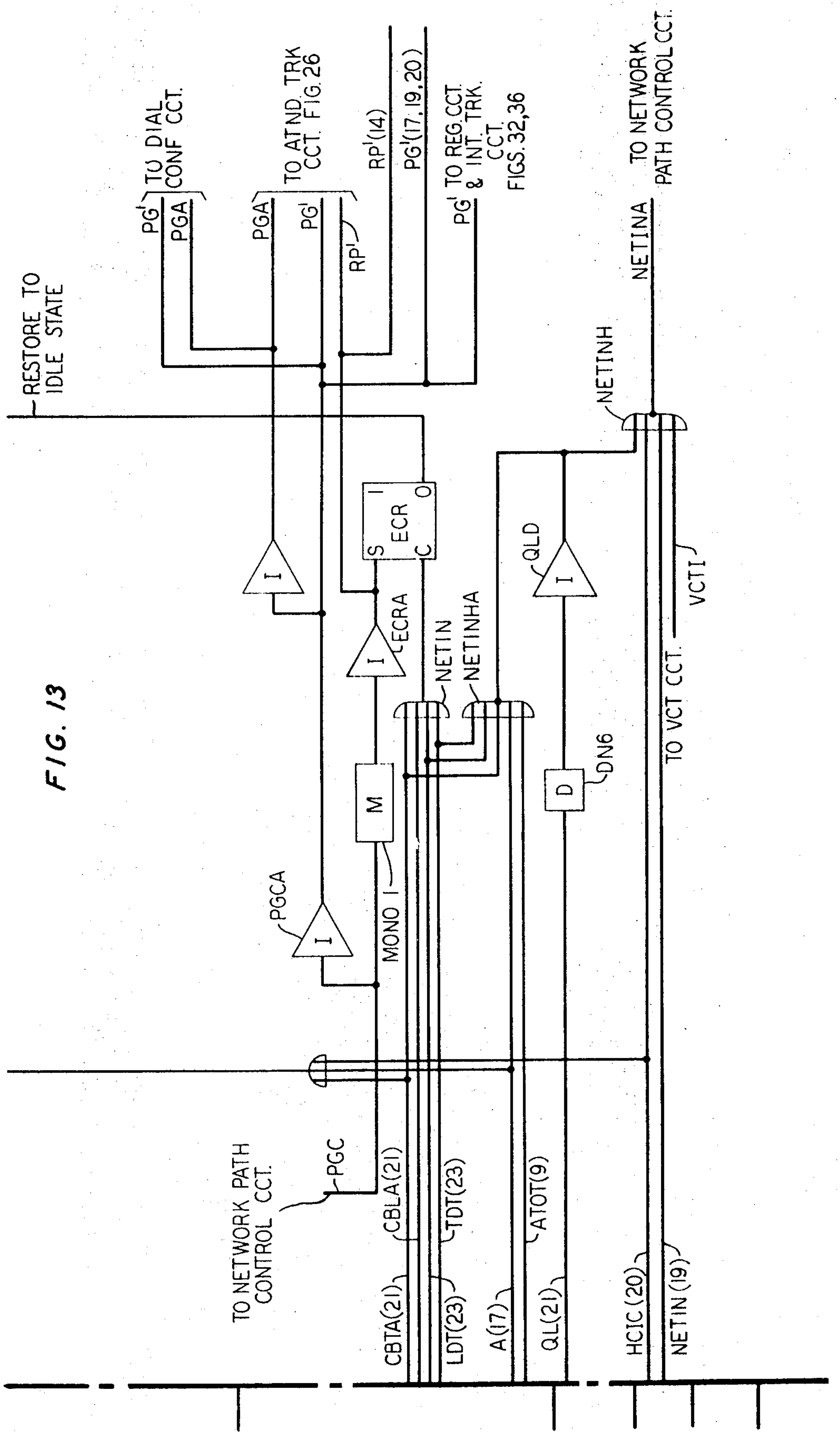

The network control circuit NC (shown in FIG. 1) is actuated to proceed with the establishment of a network connection in the following manner. With reference to FIG. 13, it will be recalled that lead LDT is high at this time since control CC is in a dial tone mode. That high signal actuates gates NETINHA and NETINH producing a high signal on lead NETINA. Upon receipt of the high signal at network control NC a network pulse is generated closing cross-points of the network and establishing the connection (path 1 of FIG. 1) between the line circuit and register. At the same time that the network pulse is generated, network control NC returns a high signal on lead PGC (also shown in FIG. 13) indicating to control CC that it may begin a release or reset sequence. The signal is coupled to monostable multivibrator MONO1 and thence via inverter ECRA to flip-flop ECR. The latter is set as a result and at its terminal 0 a low signal is produced which couples to gate ECRA. The output of gate ECRA is connected to various circuits within circuit CC and it restores those circuits to normal preparatory to handling the next call. It is to be noted that the output of gate NETIN is coupled to flip-flop ECR for setting the circuit after the set pulse is removed.

Figure 3:
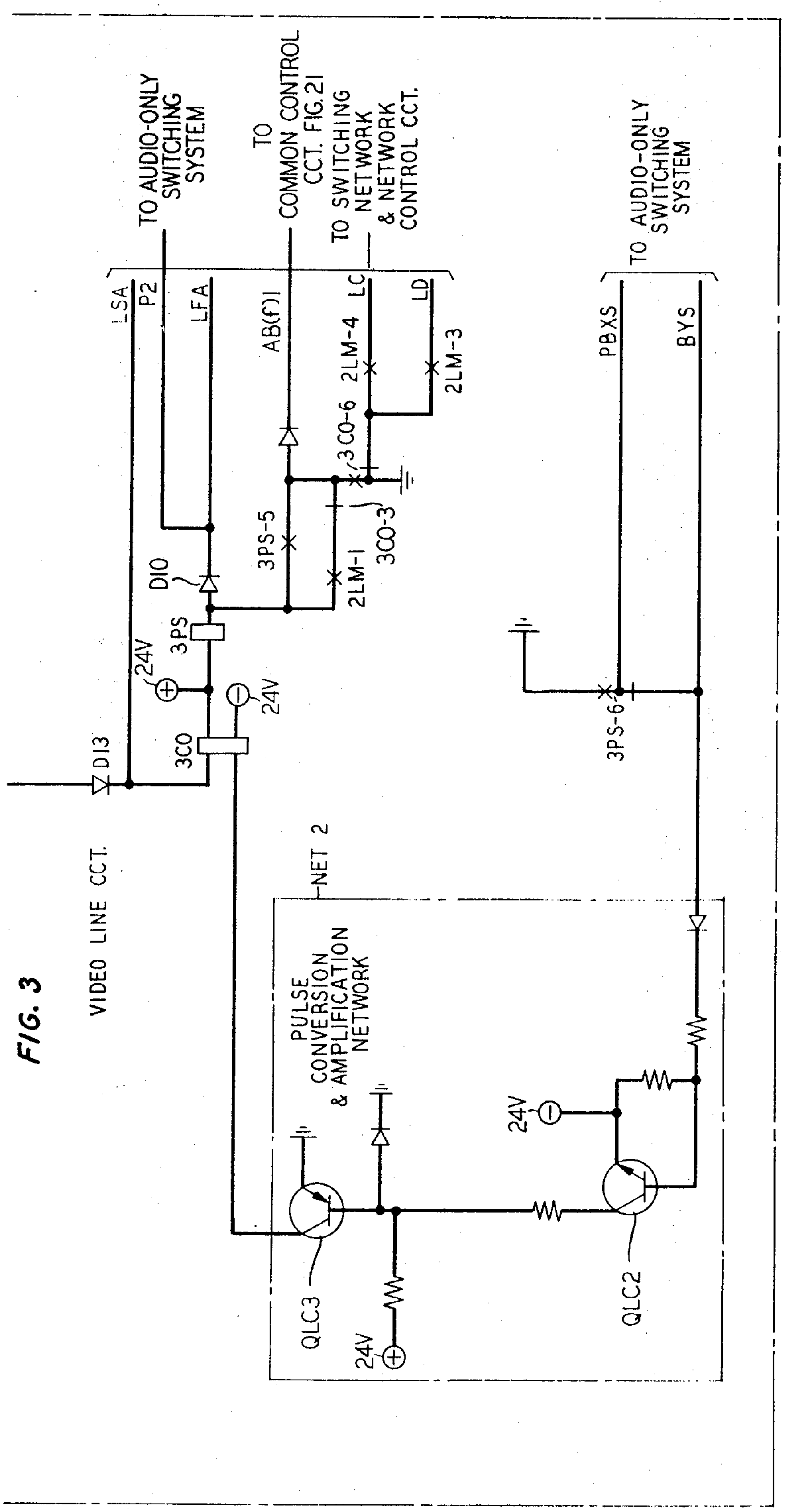

After circuit V1 of FIGS. 2 and 3 is connected to a register circuit such as for example, register 0 disclosed in FIGS. 27 to 34, a connection from the same line circuit to a register of the audio switching system is initiated. Advantageously, the latter connection is established only after a register-to-line circuit connection has been completed via the video-audio switching system. When the register of the audio switching system is connected, a dial tone signal is returned to alert the customer that both systems are connected. An important aspect of this invention which is discussed hereinafter in greater detail is that the customer may select through the transmission of appropriate signals to both registers either one of the systems to serve the call.

Figure 32:
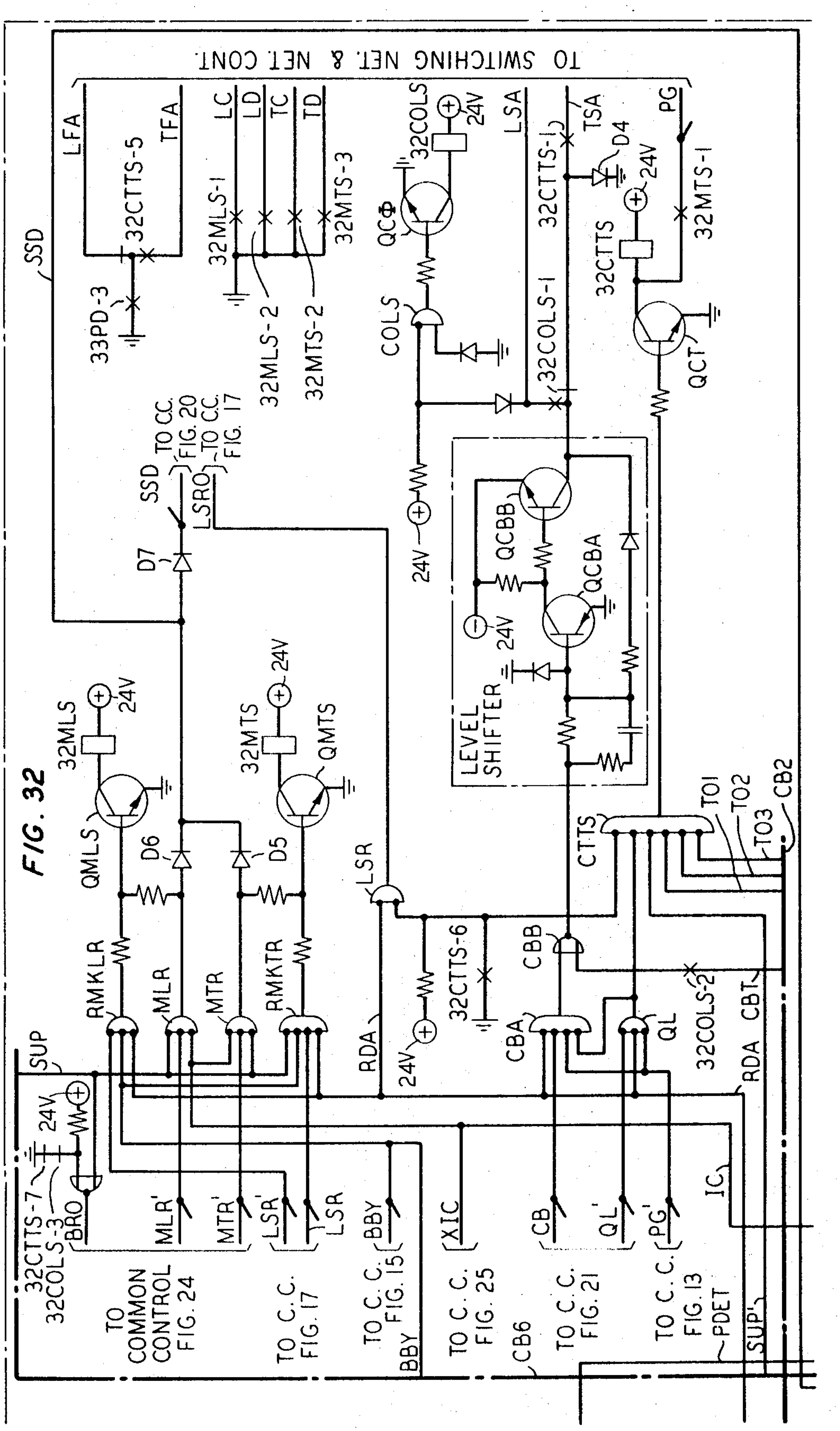

With that as a background for the ensuing detailed description, let us continue with the discussion of the dial tone connection. After the register-to-line circuit connection is established, network control sends a signal to the connected register indicating the establishment of the connection. As shown in FIG. 32 which depicts a portion of register circuit 0, network control grounds lead PG which is connected via operated contact 32MTS–1 to one end of the winding of relay 32CTTS. The latter operates and at its contact 32CTTS–1 connects ground via diode D4 to lead TSA. Lead TSA connects to the switching network wherein it is connected to lead LSA of the calling line circuit, as shown in FIG. 3. The ground signal on lead LSA is connected to an upper winding of relay 3CO and it operates.

Figure 30:
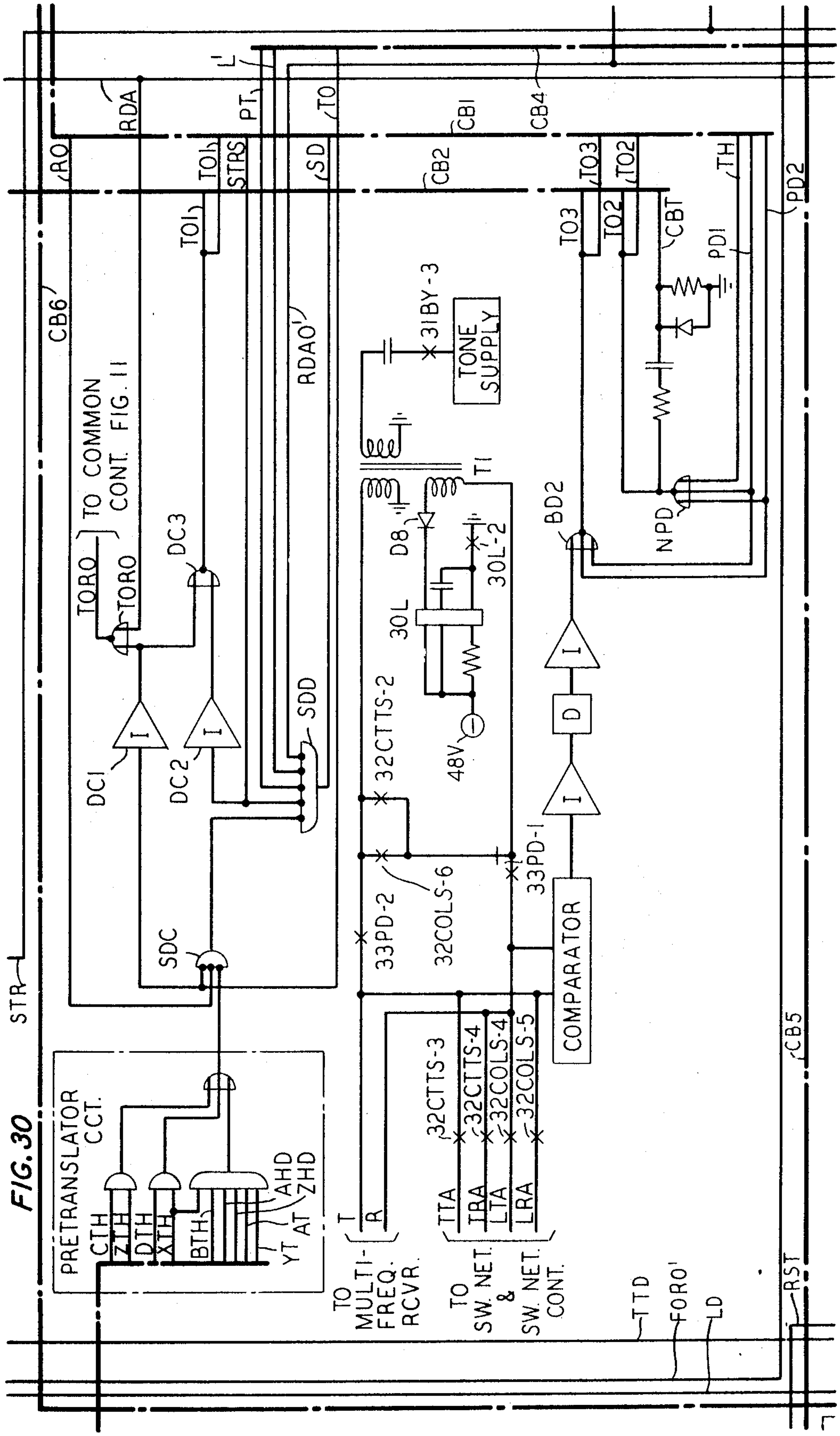

Relay 3CO in operating performs a so-called cutoff function and, importantly, extends the transmission path of the calling station through to a line terminal (not shown) of the audio switching system. The term cutoff as used herein refers to disconnecting the off-hook calling line indication from the audio-video switching system. With reference to FIG. 2, the break contacts of transfer contacts 3CO–2 and 3CO–4 isolate the off-hook detection network RLC3 from the calling line. At the same time the make contacts of those transfer contacts extend the calling line audio transmission path via leads LTA and LRA and the switching network to correspondingly designated register circuit leads (FIG. 30). In addition, the make contacts extend the calling line to the audio switching system via break contacts 3PS–1 and 3PS–3 and over leads TA and RA. The audio switching system responds to the off-hook condition of the calling line by connecting in a customary manner the calling line via leads TA and RA to a register (or to line finder switch if step-by-step equipment is provided). The audio switching system register returns dial tone and battery feed to calling line.

Register Circuit (FIGS. 27–34)

General

Figure 27:
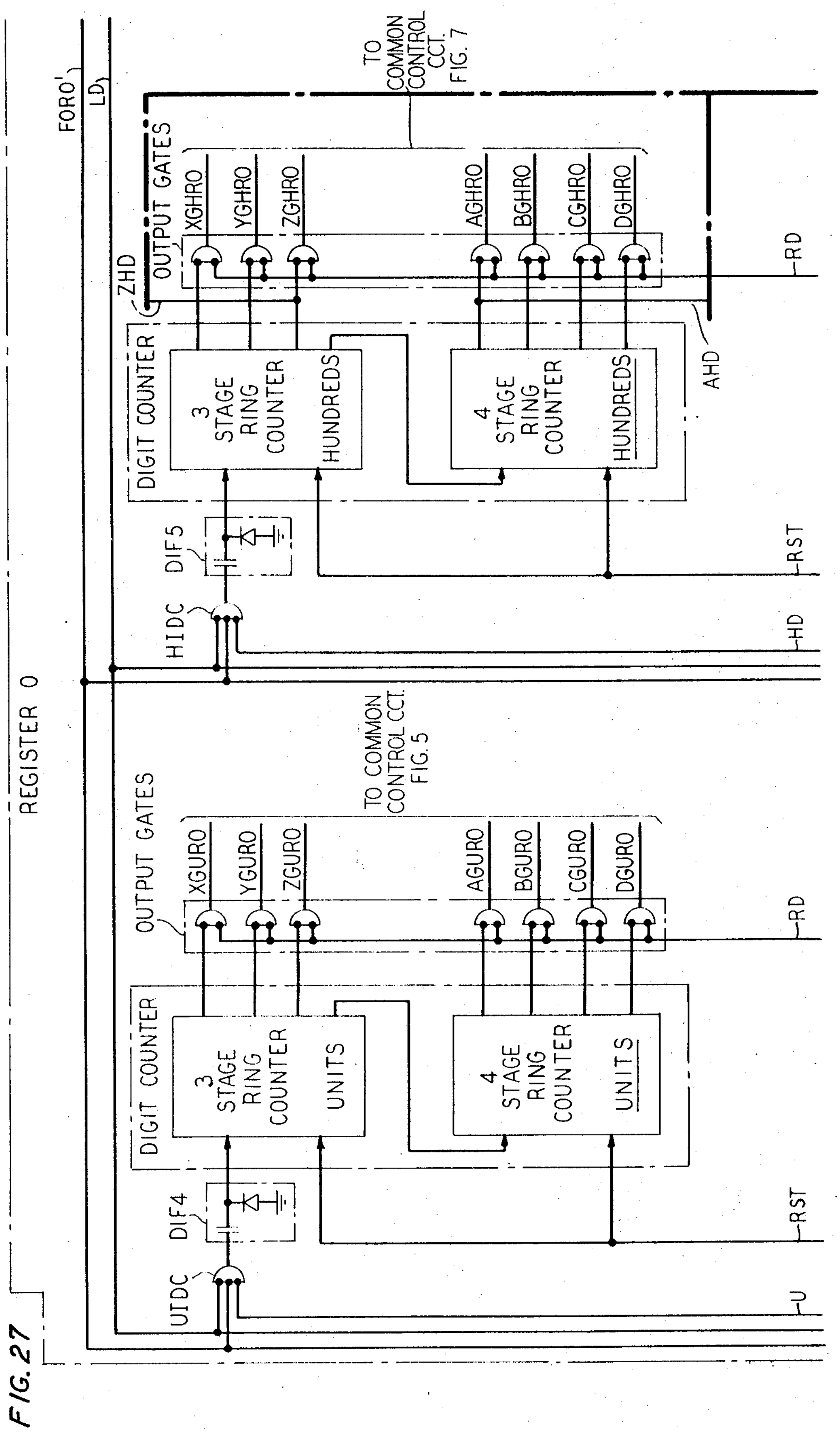
FIGS. 27–34 show the dial pulse or multifrequency register circuit.
Figure 28:
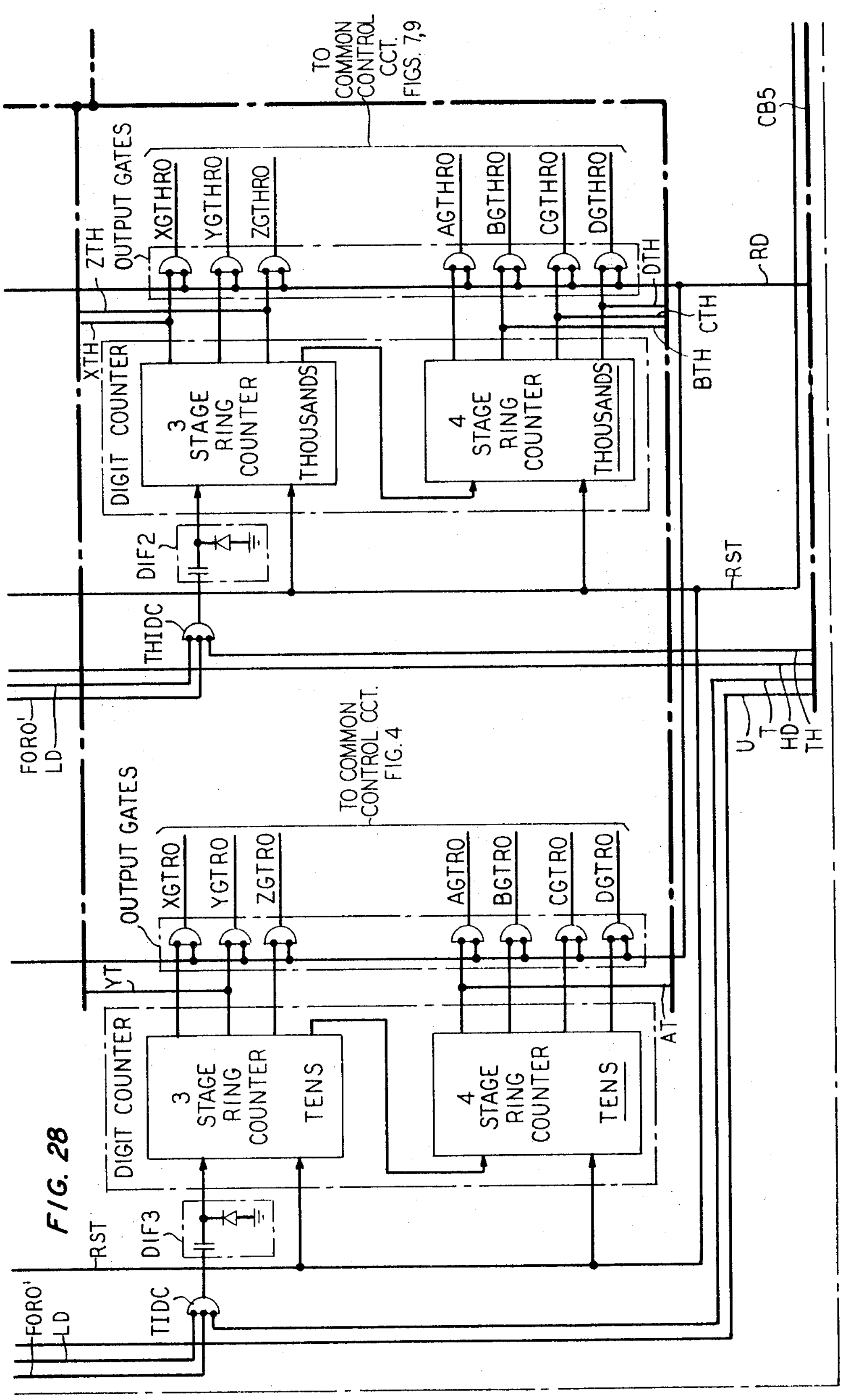

It is opportune at this point to consider in some detail the functions of the video system register before proceeding with a discussion of the circuit response to a customer dialed digit. FIGS. 27 and 28 disclose called or dialed digit registration units. As shown, the register can store up to 4-digit addresses. Eight separate ring counter stages (two per digit counter) make up the digit counter circuitry and each dialed digit is enclosed in a two-out-of-seven code for storage. The units directly respond to dial pulsed information and if the calling customer sends address information in the form of multifrequency pulses the data is first converted by a receiver and directly recorded in the units.

Figure 29:
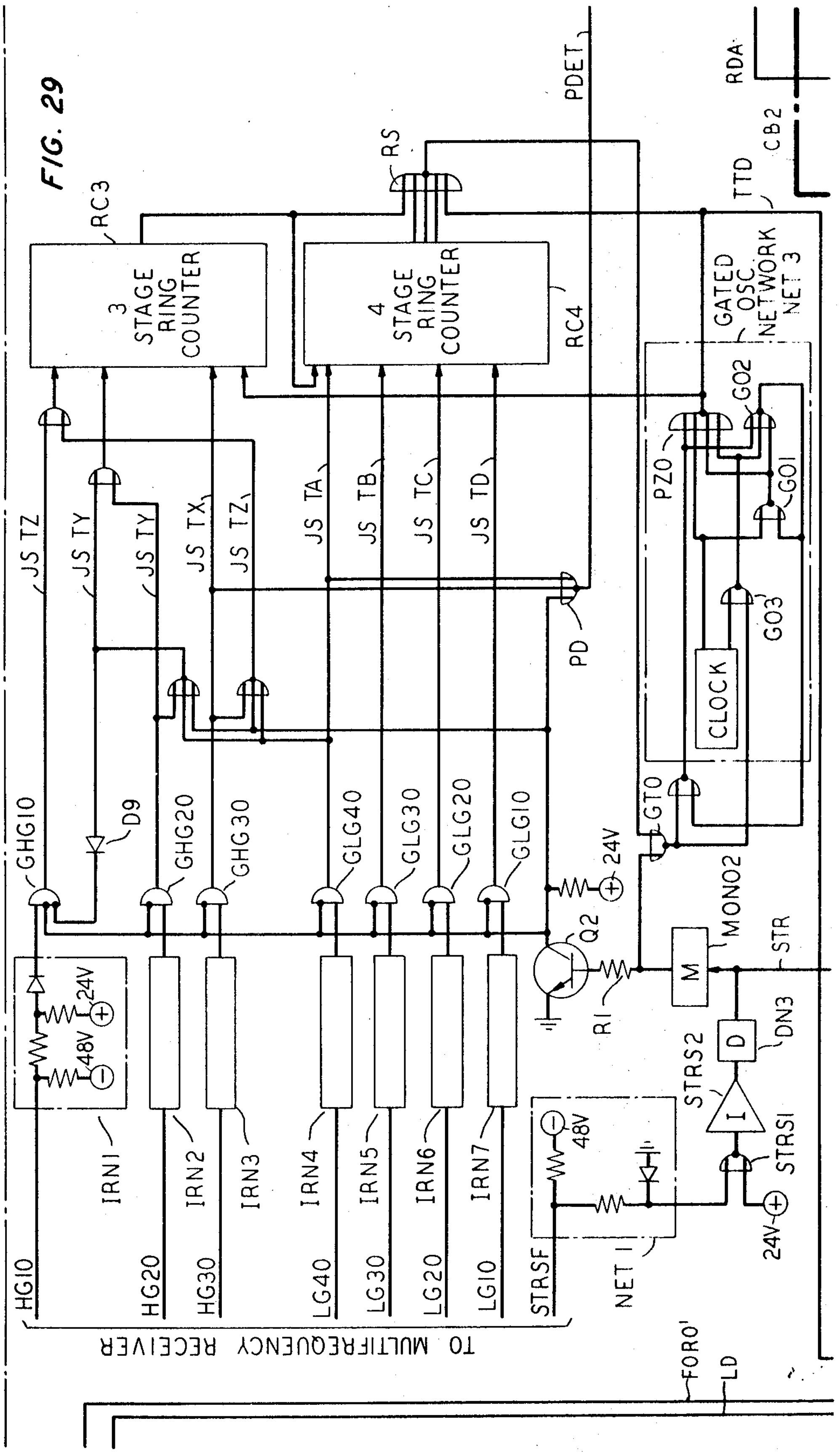

FIG. 29 shows essentially an interface circuit for coupling an output of the multifrequency receiver to the digit counter units shown in FIGS. 27 and 28. The output of the receiver is encoded in 3×4 coding when received and this is used to control a 500 Hertz dial pulse generator which drives the digit units until the address is recorded.

Figure 33:
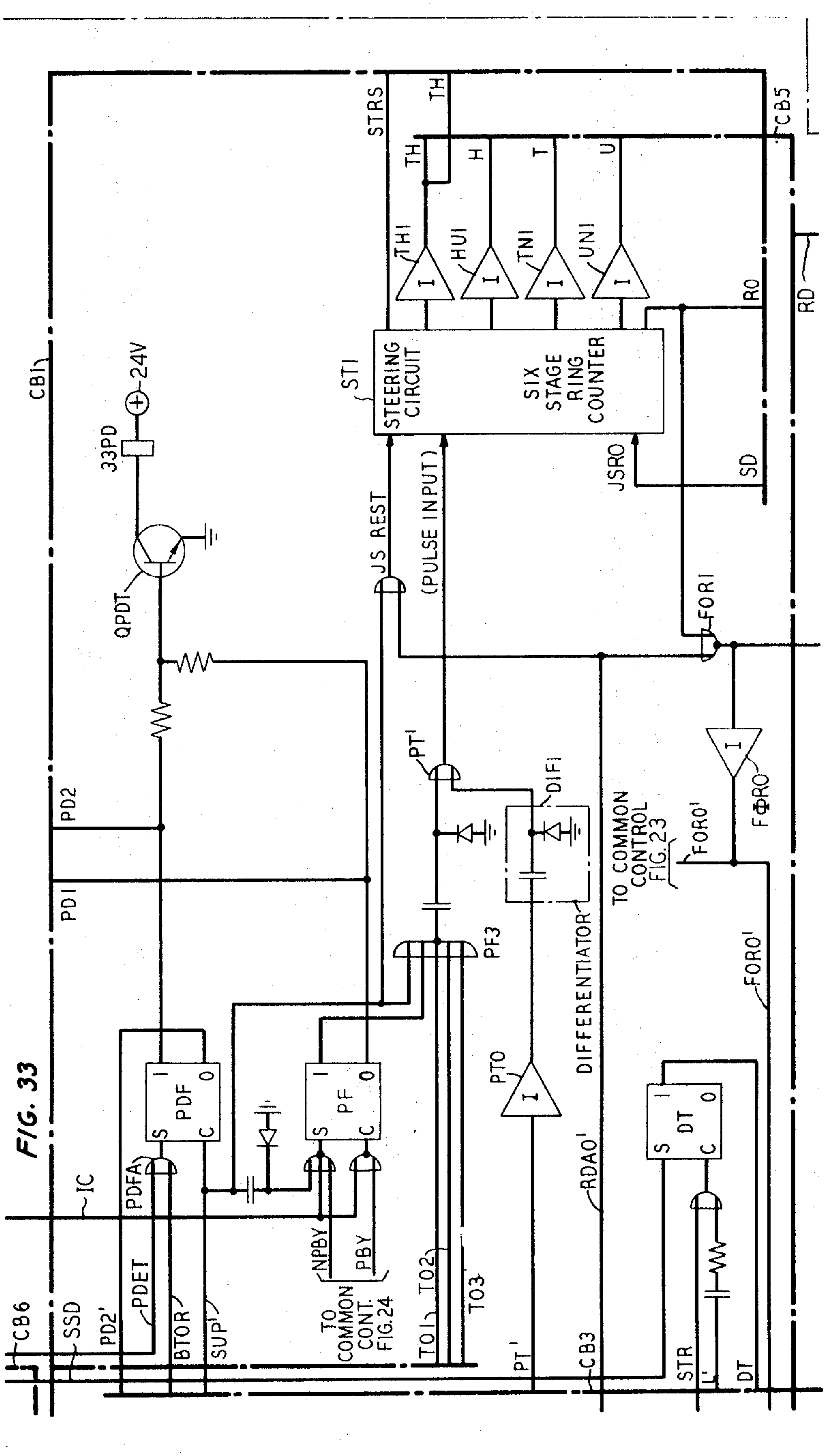

The circuitry of FIG. 33 plays an important role in one aspect of our invention. It discloses detection circuitry for what is termed a preregistration digit. That digit may indicate which system of the two systems connected to various customer requests for services such as the called line is to complete the call connection. Also, it discloses supervisory circuitry and tone application apparatus.

Figure 31:
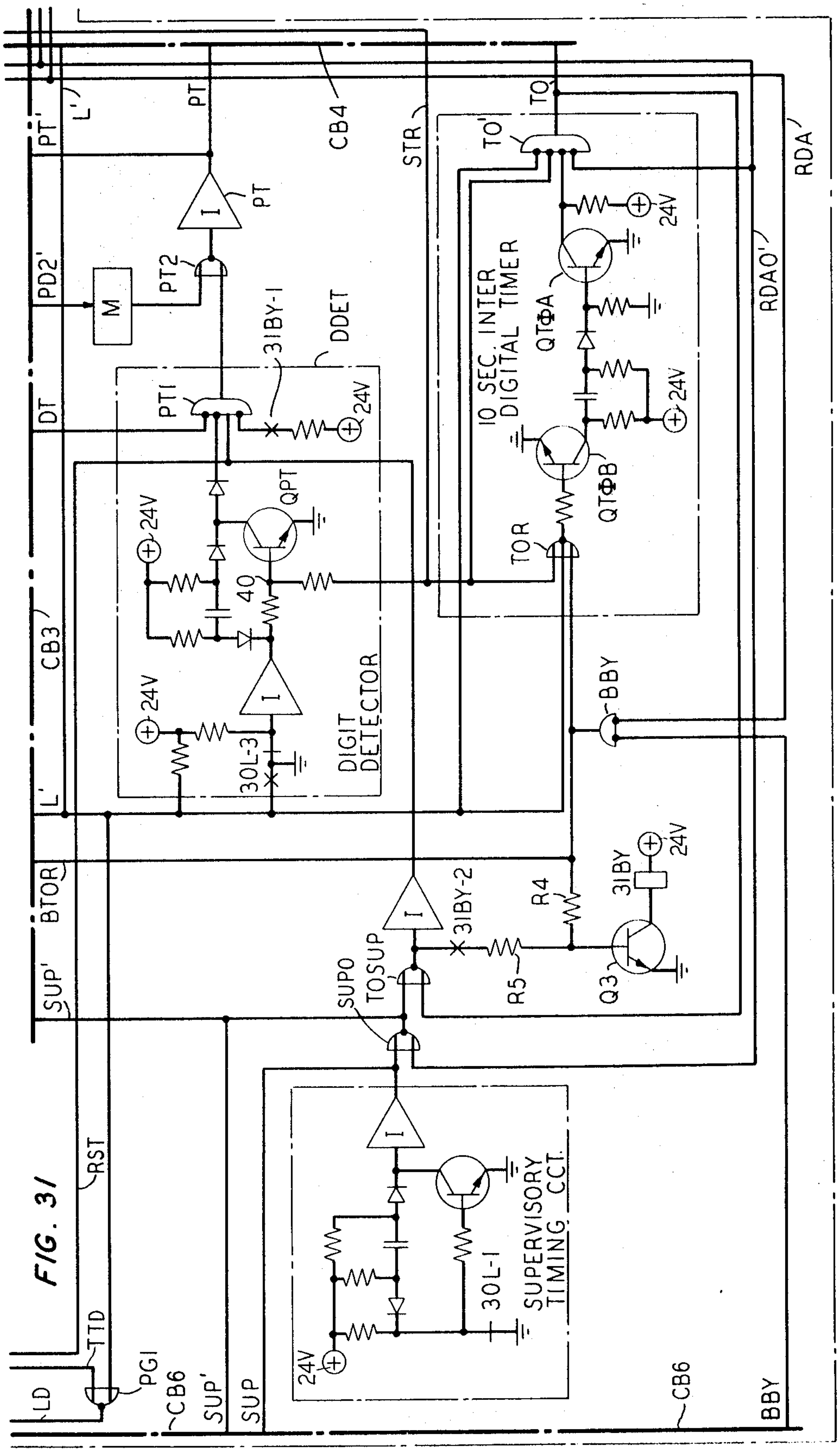

FIG. 31 depicts supervisory partial digit interdigital and overall circuit timing. These register circuit functions are in general conventional, however, details of the circuitry and specifics of its operations are believed unique and deserving of closer examination. Accordingly, they are discussed in greater detail in this section when apropos during subsequent discussions of the register circuit operation on the call.

FIG. 32 sets forth the mark circuitry which cooperates with the network control to locate the appropriate register circuit network appearance for establishing call connections to the register.

FIG. 33 shows a digit steering circuit for controlling which one of the digit counter units of FIGS. 27 and 28 are to record customer transmitted signals.

Figure 34:
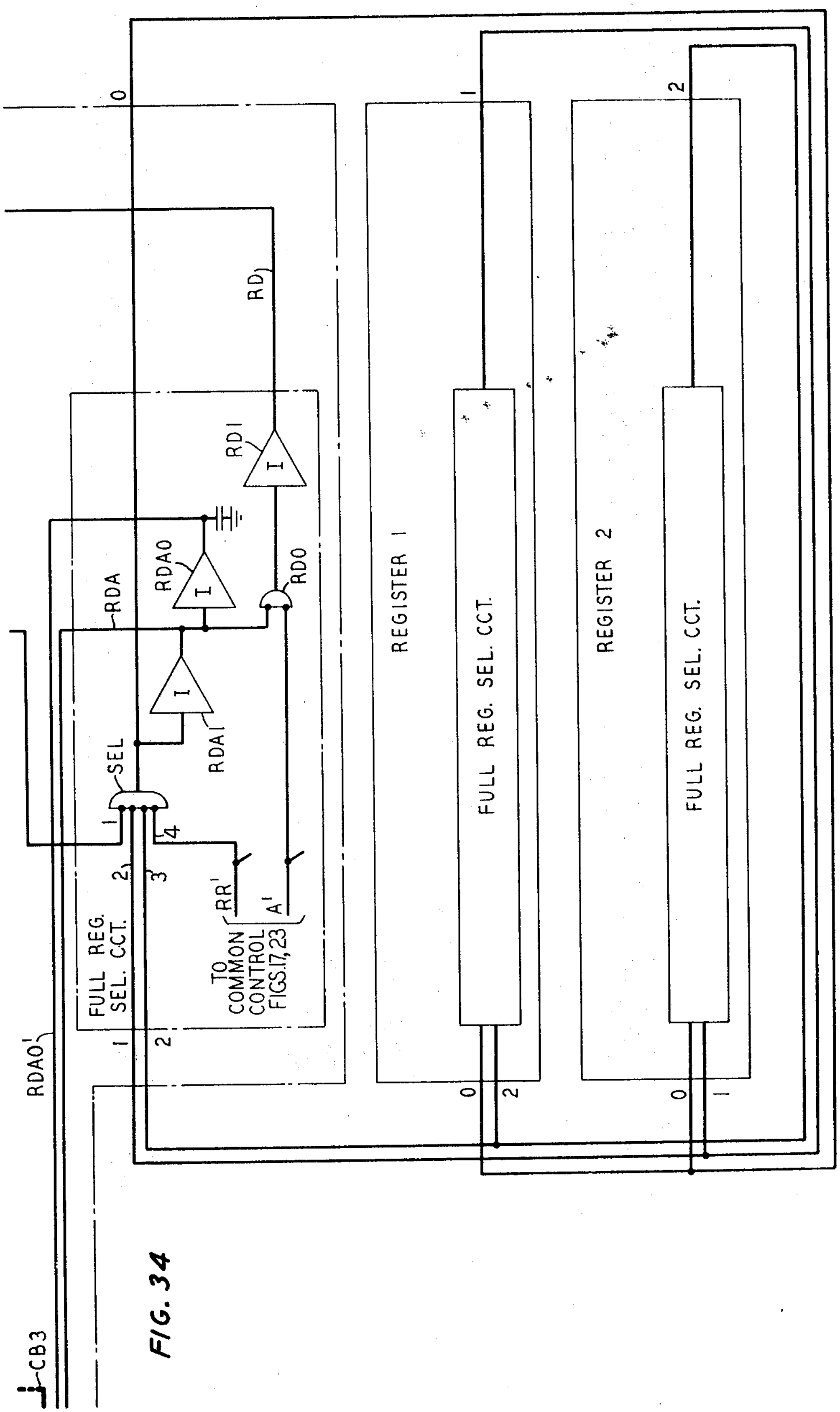

FIG. 34 shows in block outline form registers 1 and 2 and register selection circuitry. In addition, it depicts the circuitry for bidding for the service of control CC after all digits are recorded.

Selection by Control CC and Connection to Caller

Figure 24:
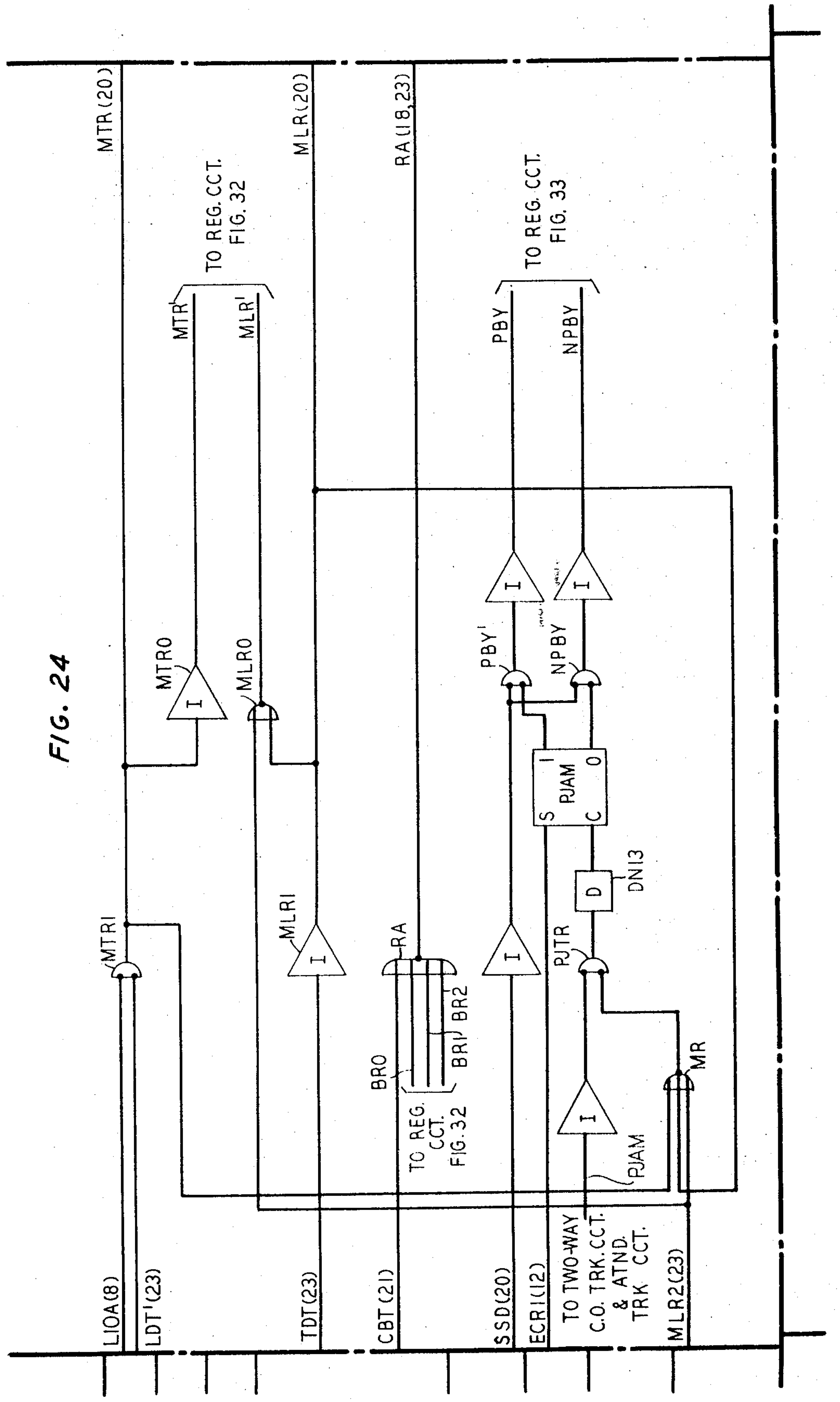
Figure 25:
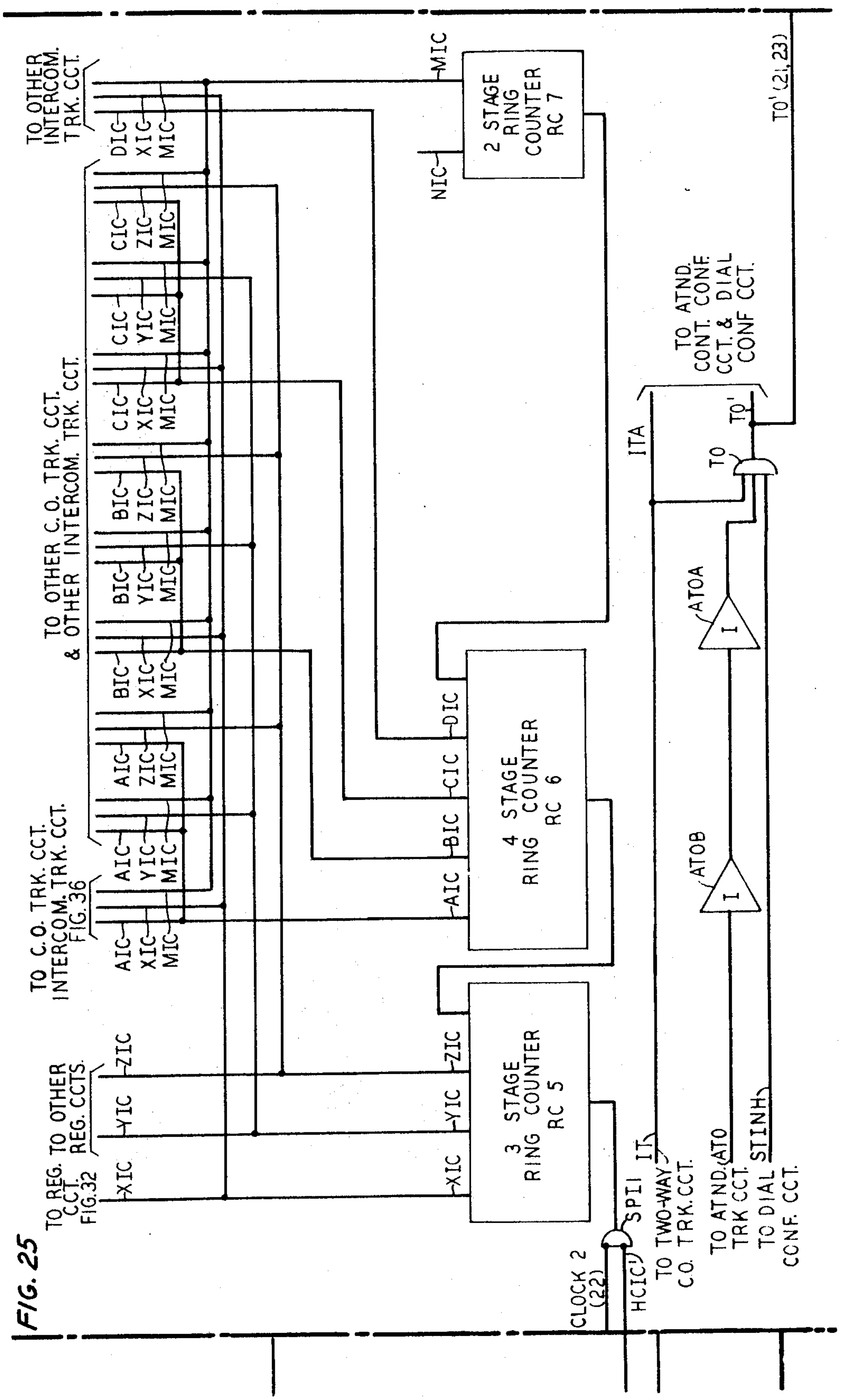
Figure 26:
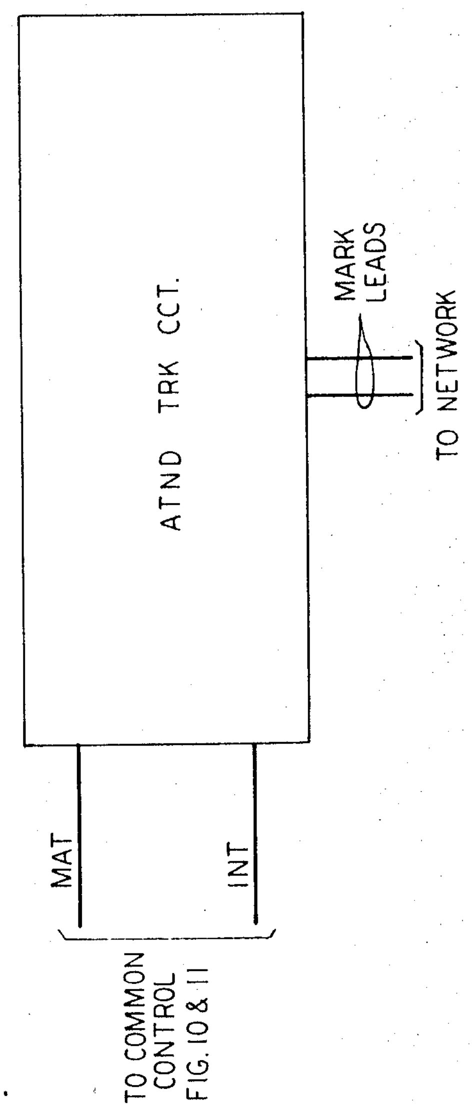
FIG. 26 shows an attendant trunk circuit.

Returning to the call sequence, it will be recalled that control CC requests the marking of an idle register to serve the call request (FIG. 24) by applying a low signal on lead MTR'. As shown in FIG. 32 lead MTR' connects to gate MTR of register 0 and also connects to similarly designated gates in registers 1 and 2. Connection to other registers is indicated by a multiple signal, a short line section connected to the lead. In addition, control CC initiates a scanning sequence to locate an idle one of the register circuits. The idle register circuit scanner is shown in FIG. 25. The scanner is actuated in the following manner. In FIG. 24 when gate MTR1 is switched, as described hereinbefore, a high signal is sent over lead MTR which may be traced to FIG. 20. Therein gates ICSC and ICSCC are switched producing a positive pulse at the output of gate ICSCC. The pulse actuates gates HCIC0, HCIC1 and HCIC resulting in the production of a low signal on lead HCIC'. The latter signal is coupled in FIG. 25 to gate SPI1 which generates pulses at its output in response to pulsed low signals on lead clock 2 for driving the ring counters in the scanner. The operation of the scanner is similar in many respects to the line scanner (FIGS. 4 and 5). The scanner of FIG. 25 serves also to scan trunk circuits in a search for an idle trunk during a different operating mode of common control CC. Although ring counters RC5 and RC6 of necessity are both operative in response to the output of gate SPI1, we are only concerned at this time with the operation of counter RC5. The outputs of the latter connect to registers 0, 1 and 2 respectively over leads XIC, YIC and ZIC. With reference to FIG. 32, lead XIC, for example, connects to gate MTR. When the circuit scanner interrogates register 0 a low signal is forwarded over lead XIC. If register 0 is idle gate motor switches and generates a high signal which is sent via diodes D5 and D7 and lead SSD to FIG. 20. As shown in that figure gates SSIC, HCIC1 and HCIC switch producing a high signal on lead HCIC' stopping the idle circuit scanner.

Returning once again to FIG. 32, gate MTR has three input circuits, two of which we have already considered. Namely, lead XIC over which control CC interrogates the register and lead MTR' over which control CC alerts all register circuits that the scanner is functioning. The remaining input circuit, lead SUP, is low if the register is idle. Lead SUP may be traced to FIG. 31 wherein it connects to a supervisory and timing circuit. The important element which should be noted in the circuit is contact 30L–1 of relay L (FIG. 30). The L relay and its associated winding control circuitry is conventional. It is a supervisory relay which monitors for the off-hook and on-hook status of circuits connected to the register via the network. If relay L is released, the register is idle and a low signal is present on lead SUP.

Register 0 does not return the customary battery feed voltages over the network connection to the calling line. Instead such voltages are furnished by the connected register circuit in the audio switching system. Relay L is, however, operated via a local register bridging circuit. Referring to FIG. 30, a path may be traced for operating relay L from battery, the winding of the relay, diode D8, a winding of transformer T1, break contact of transfer contact 33PD1, contact 32CTTS–2 and another winding of transformer T1 to ground. Because of the presence of contact 33PD–2 and a make contact of transfer contact 33PD–1 the bridging circuit is isolated from the calling line and the register circuit of the audio switching system.

At this point both system registers are prepared to record the first digit which indicates the particular one of the systems to complete the call connection. In register 0 the digit which is sent via the calling line in the form of frequency signals is coupled to a multifrequency receiver bridged onto the register network connection. Specifically, referring to FIG. 30, leads TTA and TRA from the network (connecting to leads LTA and LRA of the calling line, FIG. 2) are connected via contacts 32CTTS–3 and 32CTTS–4 and lead T and R to the multifrequency receiver.

Recording of Customer Dialed Release Signal and Release of the Audio System Connection Let it be assumed that the calling customer desires to establish a combined audio-video call connection and therefore sends a prescribed frequency signal to the register circuit of the video switching system for effecting the release of the call connection between the line and the register of the audio switching system. The prescribed digit is also referred to hereinafter as the digit P or release digit. The transmitted digit is translated by the receiver and in FIG. 29 a −22 volts is applied on leads HG30, LG40, and STRSF from the receiver. Leads HG10, HG20, LG10, LG20 and LG30 are maintained at −48 volts at this time. Each of the aforementioned leads connects to an input resistor network, IRN1–IRN7, which is part of the gate-enabling circuitry for the gate GHG(10,20,30) and GLG10, 20, 30 and 40. When −22 volts is applied to leads HG30 and LG40, gates GHG30 and GLG40 are actuated, or turned on. The −22 volts on lead STRSF triggers monostable multivibrator MONO2 via the path including network NET1, gate STRS1, inverter STRS2 and delay network DN3. The latter network delays the operation of monostable multivibrator MONO2 until gates GHG30 and GLG40 are actuated.

As a result of recording a P digit, gate PD is turned off generating a high signal on lead PDET which sets flip-flop PDF of FIG. 33. Specifically, the outputs of gates GHG30 and GLG40 connect to gate PD. The output of monostable multivibrator MONO2 is a short duration pulse which turns on transistor Q2. The collector of the latter connects to the inputs of gates GLG40 and GHG30 as well as gate PD. When transistor Q2 turns on, the aforementioned gates are actuated generating the set pulse on lead PDET. The latter may be traced to FIG. 33 wherein the pulse actuates gate PDFA for setting flip-flop PDF. The output of the latter at its terminal 1 connects to transistor QPDT which turns on operating relay 33PD.

Actuation of relay 33PD sends a signal to the video line circuit for releasing the audio switching system connection and also cuts through relay L (FIG. 30) to the calling line for recording a subsequently transmitted address code. The manner in which the release signal is forwarded is as follows. Referring to FIG. 32 lead TFA to the switching network (shown in upper right hand corner of the figure) is grounded via contact 33PD–3 and a make contact of transfer contact 32CTTS–5. Lead TFA also called a second sleeve lead, connects via the operated cross-point contacts of the network to the video line circuit (FIGS. 2 and 3) lead LFA. In FIG. 3, ground on lead LFA operates relay 3PS via diode D10. With reference now to FIG. 2, contacts 3PS–1 and 3PS–3 open leads TA and TR to the audio switching system and therein the switching facilities release. In substance, this action appears to the audio switching system as if the call is abandoned. However, the calling line appearance in the audio switching system is maintained busy to prevent call completions thereto. In FIG. 3, lead PBXS is grounded by a make contact of a transfer contact 3PS–6 to maintain the busy condition of the audio line in the audio system.

Release of the Audio-Video Switching System

In the vent the caller intends to establish an audio-only call connection, upon the receipt of the first digit of the called address which has not been prefixed by a P digit the video system register determines that the video facilities are not required and initiates the system release sequence. Since a P digit is not received at the register, flip-flop PDF in FIG. 33 is not set and relay 33PD is not operated. Also at this time flip-flop PF, not previously discussed, is not set at this time. However, as a result of the receipt of the first digit of the called address, steering circuit ST1 also shown in FIG. 33 actuates inverter TH1 which places a low signal on lead TH. The outputs of flip-flops PF and PDF namely a low signal on leads PD1 and PD2, together with the low signal on lead TH may be traced via intercircuit cable CB1 to FIG. 30 and therein to gate NPD which is turned off. As a result the output of gate NPD is a high signal which is forwarded via lead TO2 and intercircuit cable CB2 to an input of gate CTTS in FIG. 32. The high signal turns on gate CTTS producing a low signal at its output, turning off transistor QCT and releasing relay 32CTTS. In FIG. 30 at contact 32CTTS–2, the holding bridge circuit for relay L is opened and it releases, restoring the register circuit to normal. The register is thereafter available to serve other calls.

At the line circuit (FIGS. 2 and 3), the release of the video system register is manifest by removal of ground from lead LSA, shown in FIG. 3. With reference to FIG. 32, this obtains because the make contact of transfer contact 32CTTS–5 is open removing ground from lead TFA. (It is to be noted that lead TFA of the register is connected via the network to lead LFA of the line circuit). However, the 3CO relay of the line circuit is maintained in the operated condition via its secondary winding to hold the line circuit connection between the calling line and the audio switching system. The audio system places ground on lead PBXS (FIG. 3) which is coupled via a break contact of transfer contact 3PS–6 and pulse conversion and amplification network NET2 to the lower winding of relay 3C0. The call connection is thereafter established via the audio system in the customary manner.

Incoming video-audio calls are prevented from being connected to the video line circuit so long as the audio system connection is established by the presence of a high signal on lead LB1 (FIG. 2). Normally, lead LB1 is low and during the actual test it is made high if the circuit is busy. The output of gate LA is high while the calling line is busy and this high signal is coupled via diode D1 and a make contact of transfer contact 3C0–1 to lead LB1. On each attempted connection to the line circuit lead LB1 is first tested, as will hereinafter be described in greater detail, and if control CC detects the high signal, busy tone is returned to the caller.

Recording the called station Address in the Video-Audio Switching System

Returning to the call connection, after the caller has forwarded the P digit, the address code of a called line or of a central office trunk is signalled, the latter code is detected by the multifrequency receiver and stored in the register. When a sufficient number of digits is received, the register requests control CC to establish the connection between the calling line and the requested terminating circuit.

When relay 33PD operates, as previously described, the dial pulsing relay L (FIG. 30) is connected in the calling station loop for detecting conventional dial pulses. Thus, the register circuit is prepared after the receipt of the P digit to record the address code of the called terminal whether DC pulsed or frequency encoded. This arrangement enables the telephone station to be equipped with a conventional rotary dial subset and a separate key for sending the P digit.

Before discussing the operation of register 0 in response to received digits some preliminary remarks are in order. When the P digit or any digit is thereafter received and recorded in the multifrequency receiver, the latter along with the dialed information also sends what is termed as a "steer" pulse. This is received over lead STRSF shown in FIG. 29. It is the function of this pulse to control the selection of the proper digit counter of FIGS. 27 and 28 to record the transmitted digit. It also recycles the 10 second interdigital timer depicted in FIG. 31.

Specifically, as hereinbefore described, the receipt of a steer signal on lead STRSF results in the generation of a high signal on lead STR. The latter is shown in the lower left-hand corner of FIG. 29. Lead STR may be traced to FIG. 31 wherein it connects to the interdigital timer and to digit detector DDET. In the former, gate TOR is turned on actuating transistor QT B and recharging the capacitor timing circuitry. In digit detector DDET gate PT1 is turned off. As a result, gate PT2 turns on, its output is inverted by inverter PT and a high signal is coupled to lead PT'. Lead PT' may be traced to FIG. 33 via cable CB3 therein steering circuit ST1 is pulsed. Circuit ST1 comprises a conventional six stage ring counter which is pulsed in response to the signal over lead PT' as follows. The high signal is inverted by inverter PTO, differentiated by differentiator DIF1 and applied as a short duration pulse via gate PT'OR to circuit ST1. In response to these pulses leads TH, H, T, U, and RO are consecutively made low.

If the called address is DC pulsed as from a rotary dial subset (or a register sender via a foreign exchange line), the steering circuitry functions substantially the same but with exception, that instead of a high signal on lead STR actuating circuit ST1 and the interdigital time, contacts of relay L provide this function. Specifically, referring to FIG. 31 and to detector DDET, transfer contacts 30L–3 respond to each pulse of the digit. During the pulsing interval the resistor-capacitive circuitry of detector DDET provides a high signal at point 40. This effectively substitutes for the steer signal and the circuit functions thereafter are the same as hereinbefore described.

Let us proceed at this time with a description of the register action in response to the receipt of the thousands digit. It is noted at this point that the register circuit action is substantially the same for recording the hundreds, tens and units digits. For brevity and convenience, details of such register circuit functions have been omitted. For each recorded digit transmitted by the receiver to the register in FIG. 29 one of the leads HG10,20 and 30 as well as one of the leads LG10, LG20, LG30 and 40 has −22 volts thereon. The steer signal actuates monostable multivibrator MONO2 and transistor Q2 which controls gates GHG10–30 and GLG10–40 to record the received digit in ring counters RC3 and RC4. It is noted that the wiring from gates GHG— and GLG— to counters RC3 and RC4 provides a translation of the encoded digital information into a three-by-four code. The importance of this translation will be apparent from a close reading of the ensuing description in which the information recorded in counters RC3 and RC4 is read into the thousands digit counter of FIG. 28.

The information in counter RC3 and RC4 is read into the digit counter in the following manner. At the end of the pulse output from monostable multivibrator MONO2 one input to gate GT0 is low. Also as a result of recording the information in counter RC3 and RC4, the counters are no longer at their so-called rest state, i.e., when all counter outputs connected to gate RS are low. Gate RS is turned on and the other input to gate GT0 is low turning gate GT0 off. This signals gates oscillator network NET3 to start pulsing counters RC3 and RC4 toward the rest state. At the same time the pulse output of NET3 is coupled to lead TTD which may be traced to gate PG1 in FIG. 31. The latter gate responds to each pulse and pulses lead LD which connects to the digit counter circuitry of FIGS. 27 and 28. When counters RC3 and RC4 are driven to the rest state gate RS turns off directly turning gate GT0 on for stopping the pulse output of network NET3. It is to be noted that the output of gate PZ0 of network 3 connects to a separate input of gate RS. This assures that after gate GT0 turns off the immediately following first pulse is one having a full width.

Lead LD conveying the pulses generated initially by network NET3 is multiplied in FIGS. 27 to 28 to inputs of gates UIDC, HIDC, TIDC and THIDC. The latter gates effectively direct the pulses to the proper digit storage counter. In the present example the digit is to be recorded in the thousands digit counter (FIG. 28) and thus the inputs to gate THIDC are low. This obtains since lead TH which may be traced via cable CB5 to FIG. 33 is low. (It will be recalled that after receipt of the P digit circuit ST1 generates a low signal on that lead in response to the steer signal). Lead FORO' which also multiples to each input gate is low at this time and until the last digit is received and common control CC is summoned to complete the connection.

The thousands digit counter comprises customary ring counters which respond to the pulses repeated by gate THIDC and differentiated by differentiator DIF2. When four such digits are recorded the last steer pulse received by circuit ST1 (FIG. 33) causes the generation of a high signal on lead R0 which connects to gate FOR1. The latter sends a high signal on lead FOR0' to control CC requesting that the latter enter a Read Register Mode of operation.

Connection to Called Customer
(Read Register Operating Mode)

Figure 23:
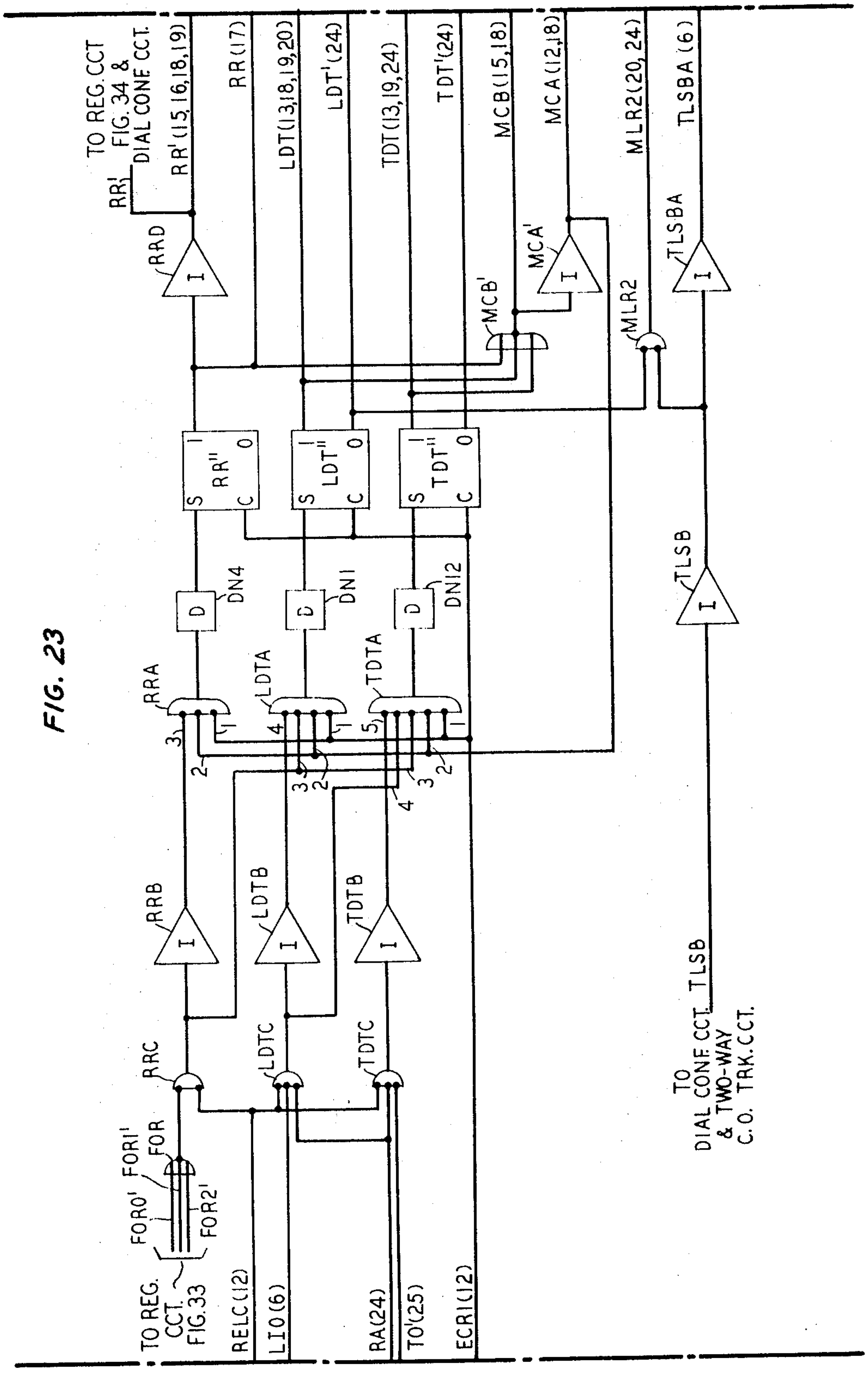

If control CC is idle when register 0 makes its request to be served, a high signal is present on input terminals 1 and 2 of gate RRA shown on FIG. 23. When register 0 places a high signal on lead FOR0', gate FOR is turned on. In turn, the high signal output of gate RRC is inverted via inverter RRB and gate RRA is turned off producing a high signal at its output. The high signal output of gate RRC is connected to input terminal 3 of gates LDTA and TDTA for preventing their actuation in response to a dial tone connection or trunk request for service. To further insure that simultaneous requests for service do not seize control of control CC, the high output of gate RRA is delayed by network DN4 before flip-flop RR'' is set. Thus, spurious operations of gate RRA are prevented from prematurely seizing control of control CC. With the operation of flip-flop RR'' and the generation of a high signal at its terminal 1, control CC begins what is termed the read register mode of operation. The output of flip-flop RR'' is connected via gate MCB' and inverter MCA' for coupling a low signal to input terminals 2 of gates RRA, LDTA and TDTA to prevent alteration of this operational mode by subsequent requests.

Having been set in the read register mode, control CC next determines which one of the registers is requesting this service. This determination is made as follows. In FIG. 23, a low signal is placed on lead RR' and it may be traced to register circuit FIG. 34 wherein it connects to an input of gate SEL. Digressing momentarily, only the details of the full register selection circuitry for register 0 are shown but it will be understood that the circuitry is identical with that of registers 1 and 2. The low signal on lead RR' is multiplied (as shown by short line segment connected to lead RR') to like numbered terminal (No. 4) of all SEL gates. There is a race thereafter initiated between the registers requesting service which occurs as follows. Terminal 1 of each SEL gate for each register requesting readout is low since no gate SEL is turned off (assuming none of the registers are being served) low signal on lead RR' attempts to turn off all SEL gates for registers requesting service. However, since the outputs of each gate SEL is connected to the inputs of the other SEL gates, the stable circuit condition is one SEL gate turned off at a time. Assuming that gate SEL for register 0 turns off its output is inverted via inverter RDA1 to produce a low signal on lead RDA of register 0 which enables the input circuits of gates LSR (FIG. 32), TOR0 (FIG. 30) and BBY (FIG. 31). The significance of the low signal on lead RDA will be more apparent from the ensuing discussion.

Since initial connections to a register circuit may be established via either one of two network appearances, i.e., trunk side or line side thereof, the register circuit in anticipation of the establishment of a completing connection forwards a high signal on lead LRS—(LRSO for register 0) indicating that the caller is situated on the line side of the network. Referring now to FIG. 32, gate LSR is turned off by the coincidence of a low signal on lead RDA and at its other input (a low signal generated by ground via contact 32CTTS–6). Accordingly, lead LSR0 conveys a high signal to control CC and it may be traced to FIG. 17 and therein to gate LSRF. The latter forwards a set pulse to flip-flop LSR which produces a high signal at terminal 1 and a low signal at terminal 0. The set state of flip-flop LSR records the fact that the caller is connected to the line side of the network.

At about the same time, control CC requests that the address of the called line or trunk stored in the digit counter (FIGS. 27 and 28) of register 0 be read into its circuitry. Referring once more to FIG. 23, the high signal output on terminal 1 of flip-flop RR'' is connected via lead RR to terminal C of flip-flop A shown in FIG. 17. This resets flip-flop A and a high signal generated at its terminal 0 is conveyed via inverter AAB and lead A' to register circuit FIG. 34. As shown in the latter figure gate RD0 has two low signal inputs and turns off. It may be recalled that gate SEL is turned off generating a high signal output. The signal is inverted in inverter RDA1 and applies a low signal to one input of gate RD0. The output of gate RD0 is inverted by inverter RD1 and thus a low signal is forwarded on lead RD to the digit counters of FIGS. 27 and 28. More specifically, the RD lead goes into cable CB5 which may be traced to the bottom of FIG. 28. Lead RD connects to the digit counter output gates for enabling the particular ones of them having their other input also low which indicates a stored digit. The register counter outputs connect directly to the line scanner output gates (also termed code lead amplifiers) XT', YT', ZT', etc. in FIGS. 4 and 5. If, for example, the address coded corresponds to a line circuit, the line scanner outputs go directly to the LA gate of that circuit. For example, if we assume that FIGS. 2 and 3 depict the called line circuit, the line scanner output connects in FIG. 2 lower left-hand corner to gate LA via the leads designated (*a*)T, (*b*)T, (*c*)U and (*d*)U. (The latter are cross connected to the line scanner outputs (*x*)T, (*y*)T, etc. (FIGS. 4 and 5) as hereinbefore described.) At this time the inputs to the LA gate are low and if the line circuit is idle the output (high signal) of gate LA is coupled to lead LI1 via diode D1, break contact of transfer contact 3CO–1 and diode D2. However, if the called line is busy relay 3CO of the line circuit is operated and the aforementioned path is opened and the make contact of transfer contact 3CO–1 couples the high output of gate LA to lead LB1. The circuit operation in the latter event is discussed hereinafter under the separate heading "Called Customer Busy."

Assuming that the called line circuit is idle the output on lead LI1 in FIG. 6, as hereinbefore described turns on gate LINRO1, turns off gate LINRO0 and turns on gate LIO1. As a result a low signal is generated at the output of gate LIO1 which is coupled via lead LIO to FIG. 14 and therein to gate IDL1. At this time the output of inverter BO is low and, accordingly, gate IDL1 turns off generating a high signal output. The output of gate IDL1 is inverted and connected to gates TSI and ICTA. Since the existing register to calling line connection utilizes the trunk side network appearance for register 0, lead LSR' contains a high signal so gate TSI remains unaffected. Lead LSR is, however, low at this time as in the third input to gate ICTA and the latter generates a set signal for setting flip-flop ICT'.

Figure 14:
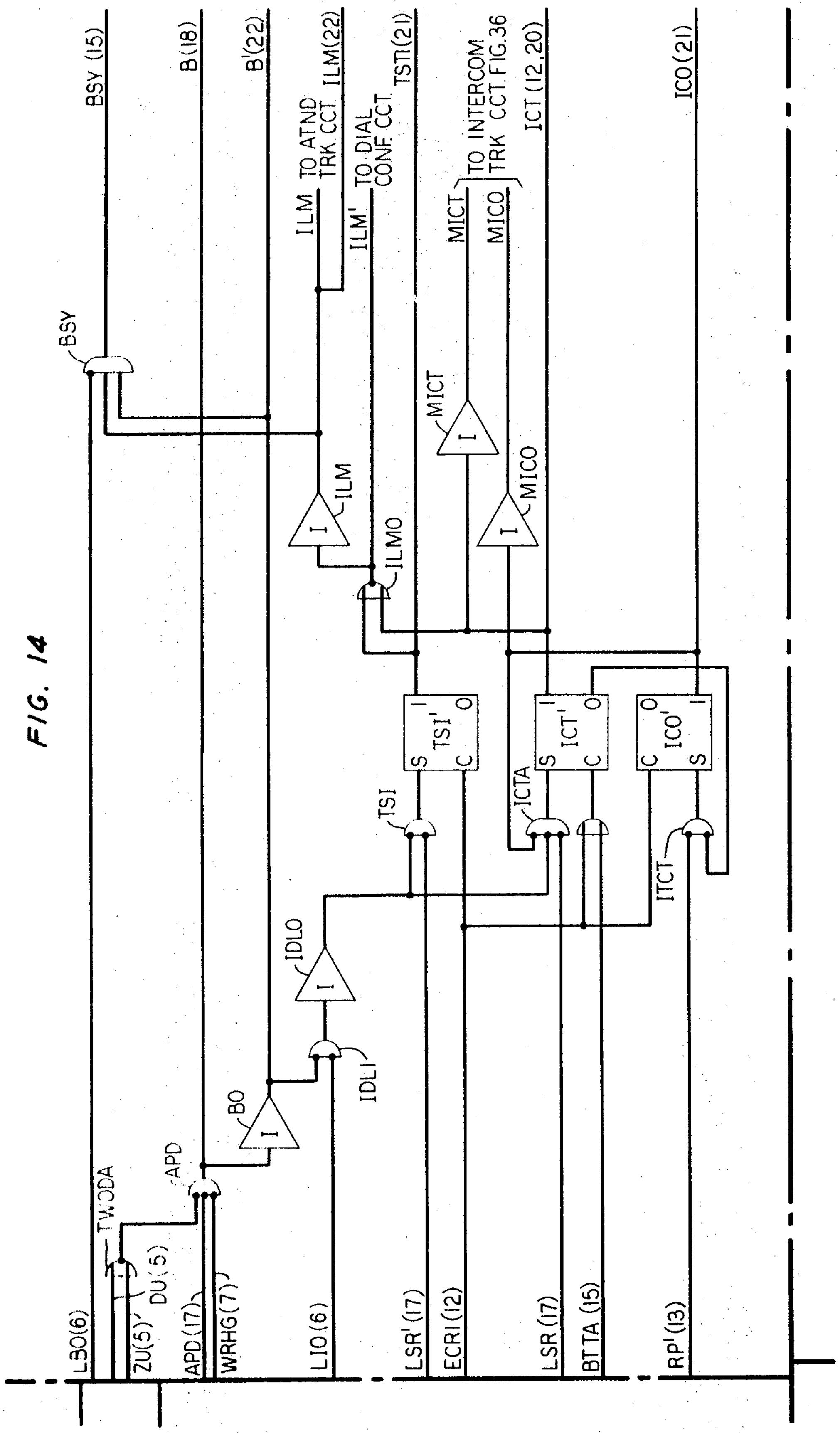
Figure 20:
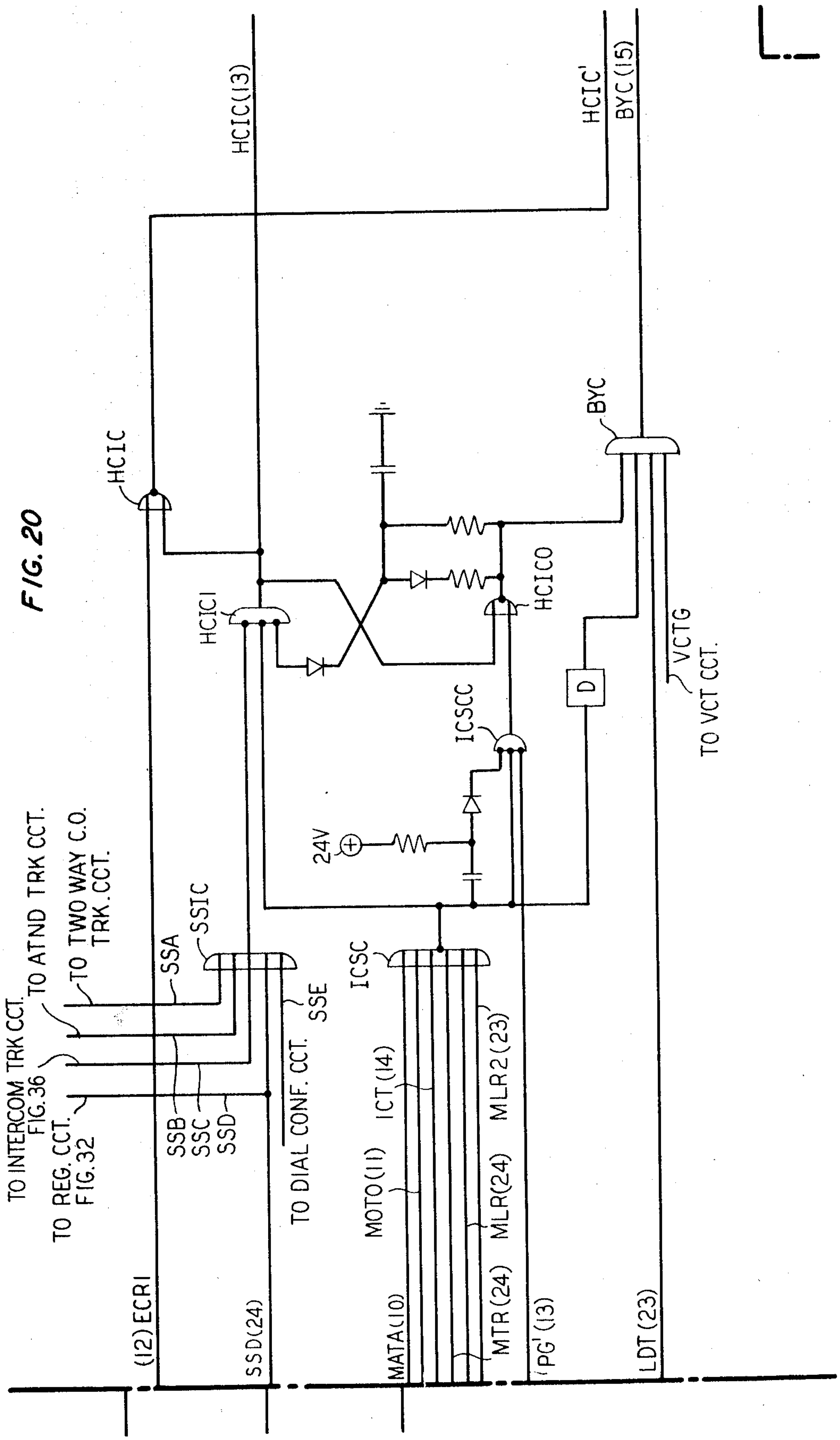

Control CC at this point begins a scan operation looking for an idle intercom trunk circuit (FIGS. 35–37) which is available to interconnect the audio portion of the call connection. The operation in many ways is similar to the aforedescribed scanning operation in search of an idle register. In fact the same scanner, shown in fig. 25, is employed to search for the trunk circuit as well as the register circuit. The search for the intercom trunk circuit is implemented as follows: The high signal output of flip-flop ICT is connected via lead ICT to FIG. 20 wherein gate ICSC is turned on for producing a low signal at its output. As previously disclosed, this action actuates the circuitry including gates ICSCC, HCIC0, HCIC1 and HCIC and a low signal is forwarded over lead HCIC' to gate SPI1 of FIG. 25. The latter gate in response to clock pulses over lead CLOCK 2 pulses counter RC5 and RC6 and begins the scanner operation. Importantly, each intercom trunk circuit is marked and thereby enabled so that the scanner outputs (leads AIC, XIC, MIC) affect only intercom trunk circuits. With reference to FIG. 14, the high signal output at terminal 1 of flip-flop ICT' connects to inverter MICT where it is inverted and coupled to each intercom trunk circuit via lead MICT. As shown in FIG. 36, lead MICT connects to one input of gate MICT. Two inputs connect via leads AIC and XIC to the line scanner. The fourth input is low if the particular trunk is idle. When an idle intercom trunk circuit is located gate MICT (FIG. 36) is turned off which produces a high signal on a lead common to all such circuits. With reference to FIG. 20, the lead is designated SSC and the high signal thereon turns gate SSIC on, producing a high signal at its output for stopping the scanner. Specifically, the output connects to gate HCIC1 which in turn couples to gate HCIC and the low signal is removed from lead HCIC'.

Figure 17:
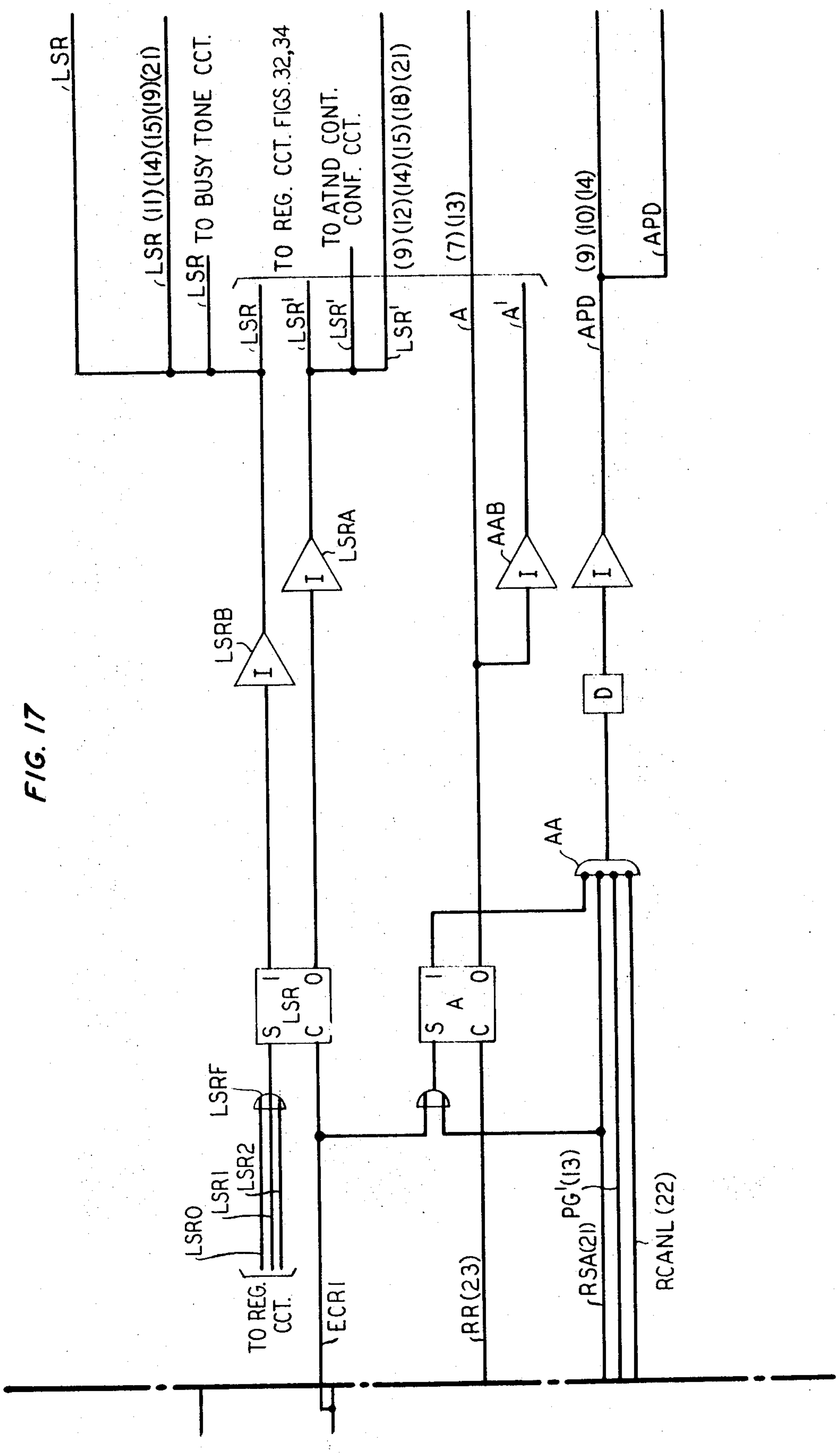

To summarize the operation to this point, the called line circuit is identified and an intercom trunk circuit is located. The terminating end of the trunk circuit (not shown) automatically forwards a signal to the network control circuit to mark its location in the switching network. Particularly, in FIG. 35 transistor QMT is turned on by the output signal from gate MICT. As a result relay 35MT operates. At operated contacts 35MT–1 and 35MT–2 ground is connected via leads TCT and TDT, respectively to the network control circuit marking the circuit network appearance. Similarly, the called line circuit, assuming for purposes of discussion is shown by FIGS. 2 and 3, marks its network location. Specifically, the output of gate LA is coupled via network RLC3 and transistors Q1 to operate relay 2LM. At its contacts 2LM–3 and 2LM–4 via respective leads LD and LC the line circuit marks its network location. On command from control CC the network control circuit pulses the network between the marked ends thereof. This occurs as follows. With reference to FIG. 17 it will be recalled that flip-flop A is reset and therefore a high signal is generated at its terminal 0 and forwarded over lead A. The latter may be traced to FIG. 13 and therein lead A connects to gate NETINHA which is turned on by the high signal. The output of gate NETINHA, a low signal, together with the low signals on the remaining inputs to gate NETINH turns the latter gate off to produce a high signal on lead NETINA. This lead connects to the network control circuit which is subsequently activated to generate the network connect pulse.

After the network connection is made the network control circuit sends a low signal via lead PGC in FIG. 13 to control CC. This signal is inverted by inverter PGCA and coupled via lead PG' to the intercom trunk circuit wherein relay 36CTT operates. specifically, the signal on lead PG' sets flip-flop CB to produce a high signal at its terminal 1. In turn transistor QCTT is turned on and relay 36CTT operates. The latter locks up via a path including the winding of relay 36CTT, diode D11, a make contact of transfer contacts 35MT–3 and a make contact of transfer contacts 36CTT–1.

Figure 35:
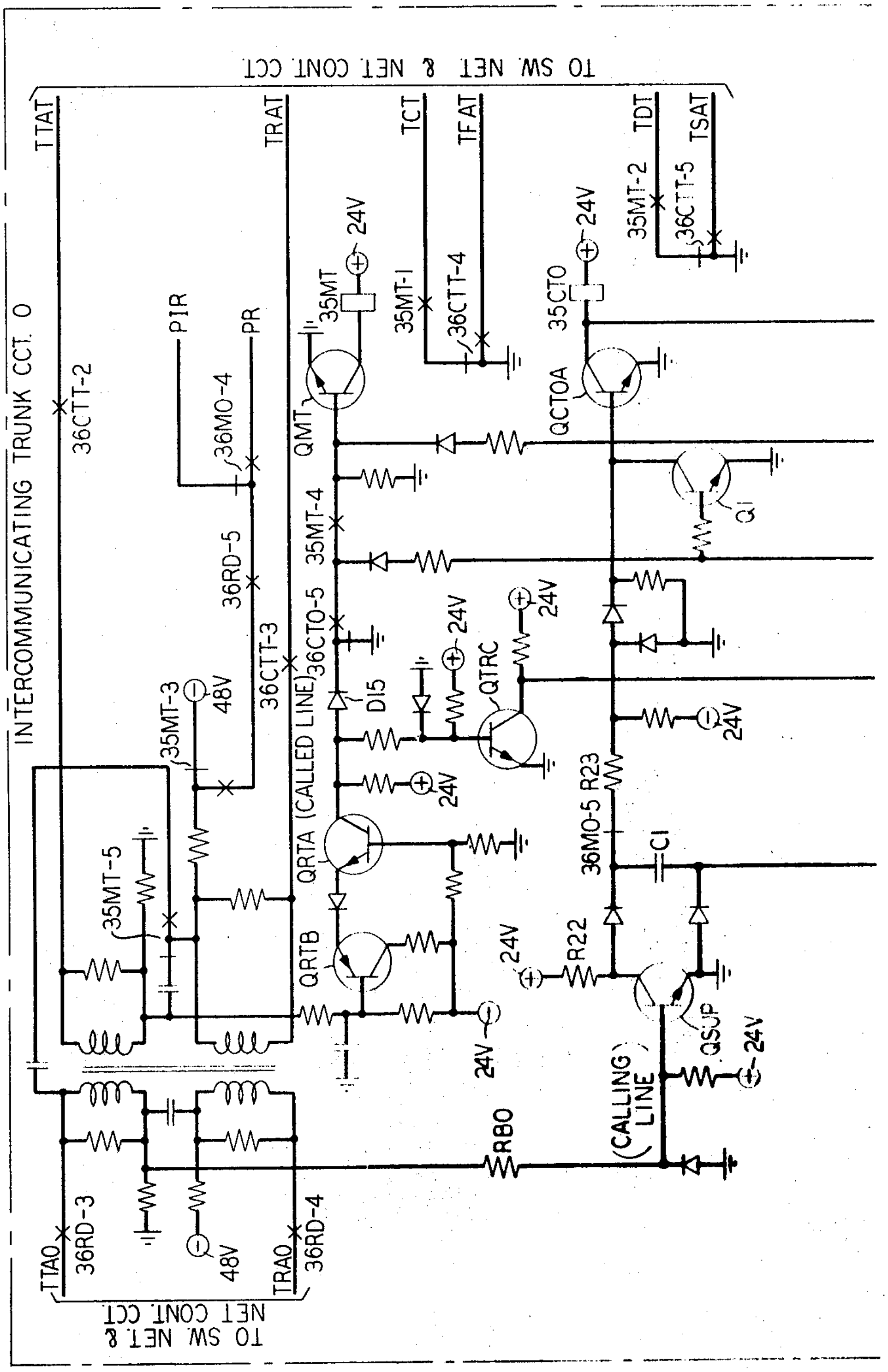
FIGS. 35–37 show an intercommunication (intercomm) trunk circuit.
Figure 36:
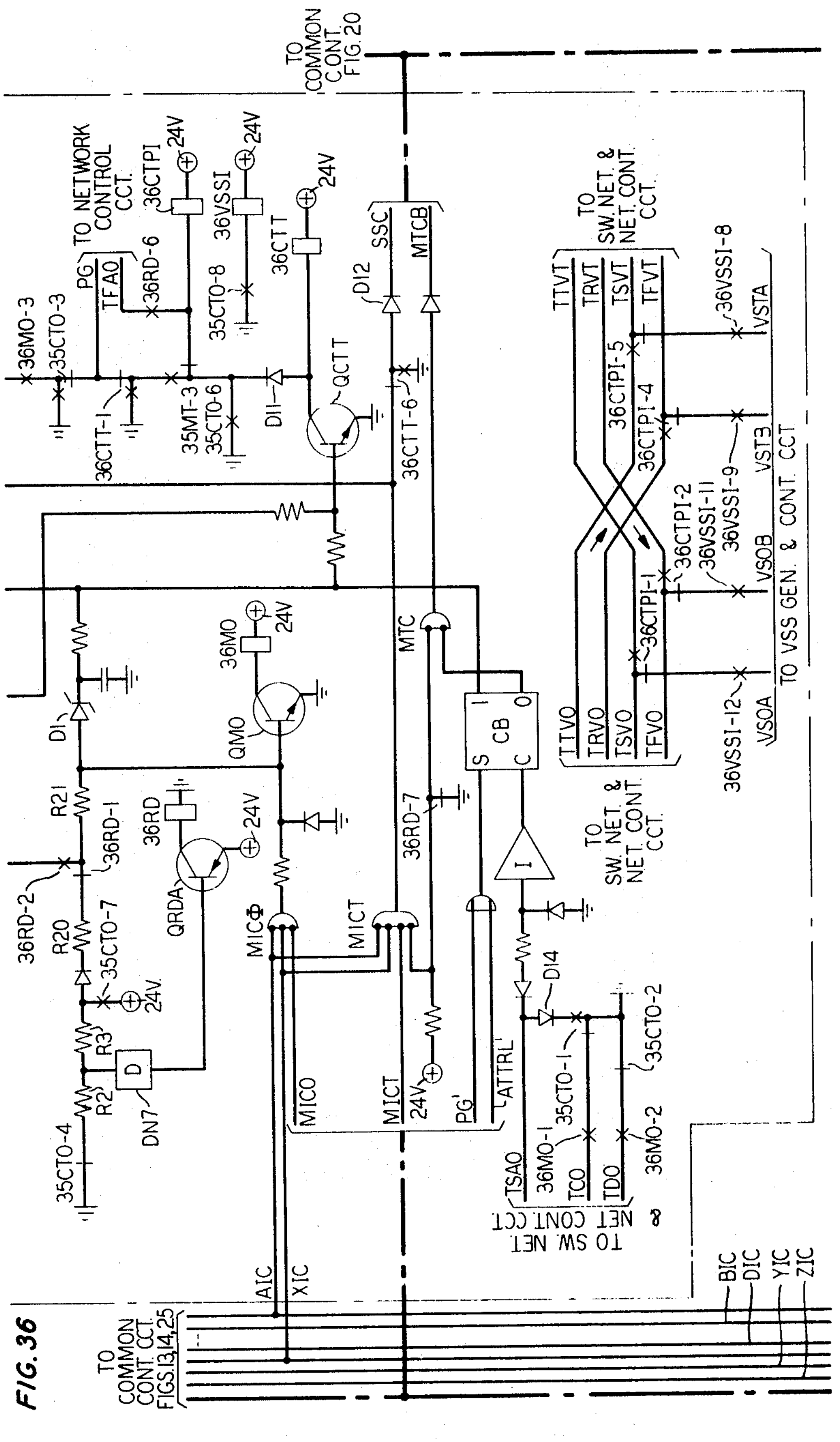
Figure 37:
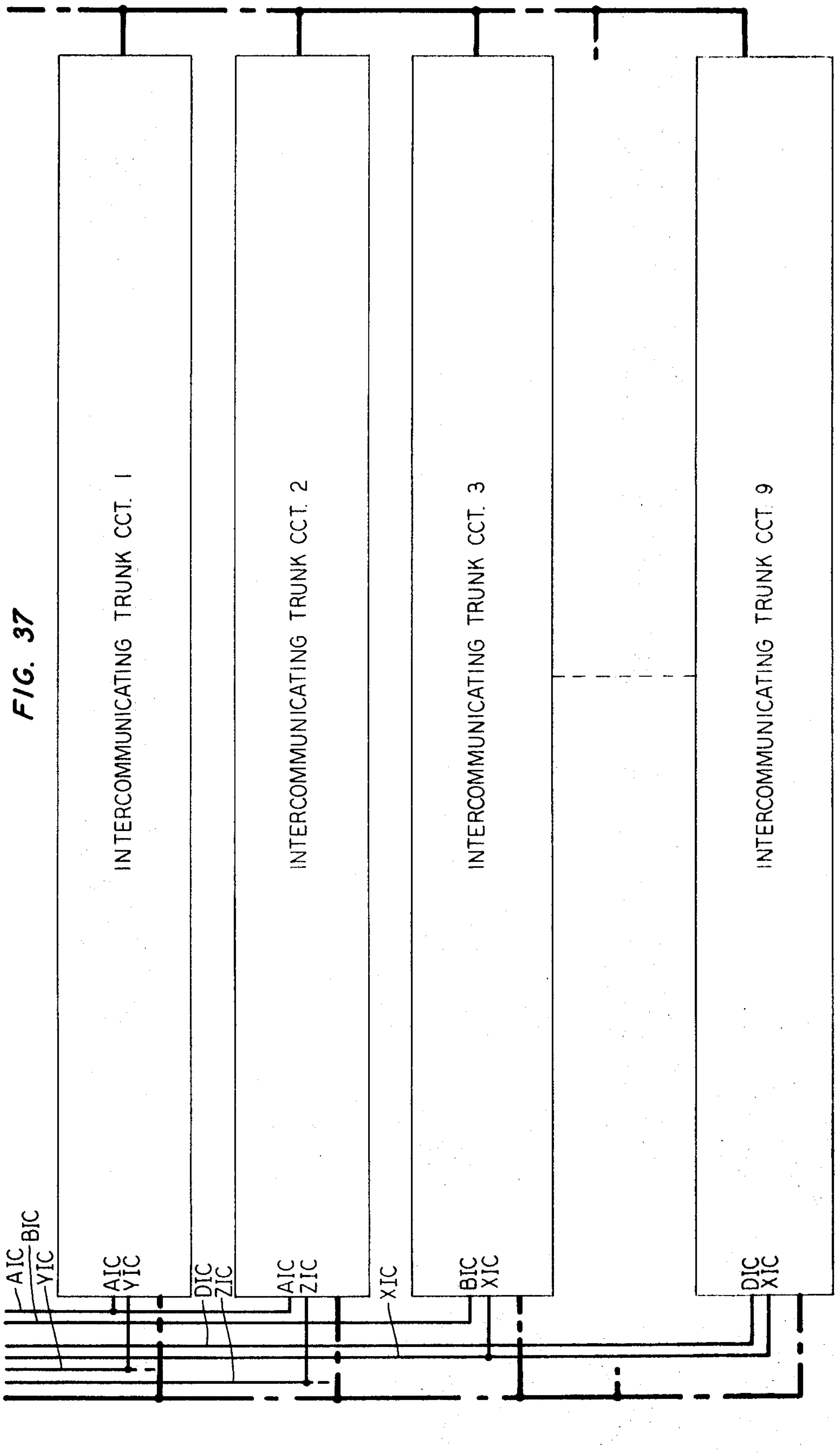
Figure 38:
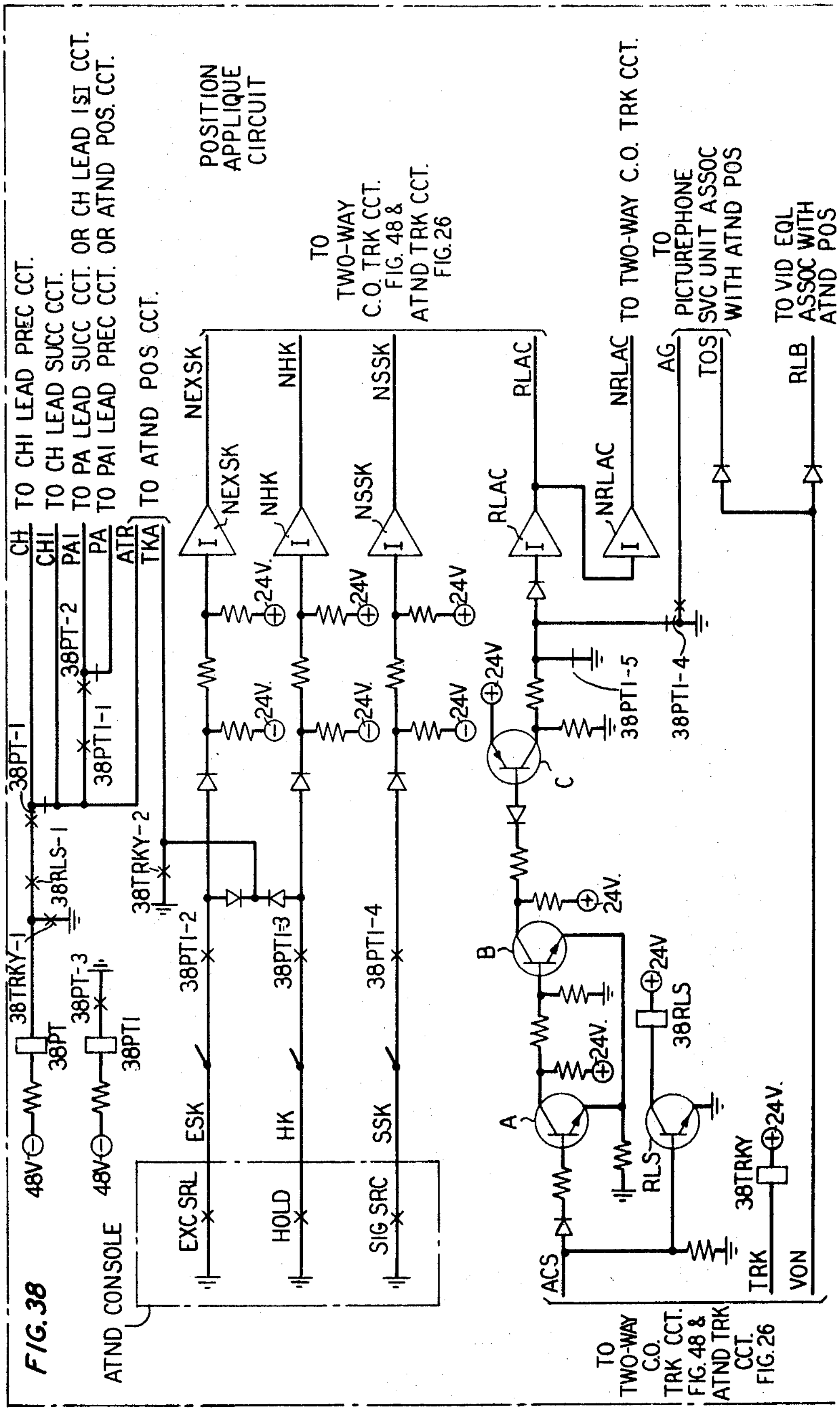
FIGS. 38 and 39 show the attendants position applique circuit.
Figure 39:
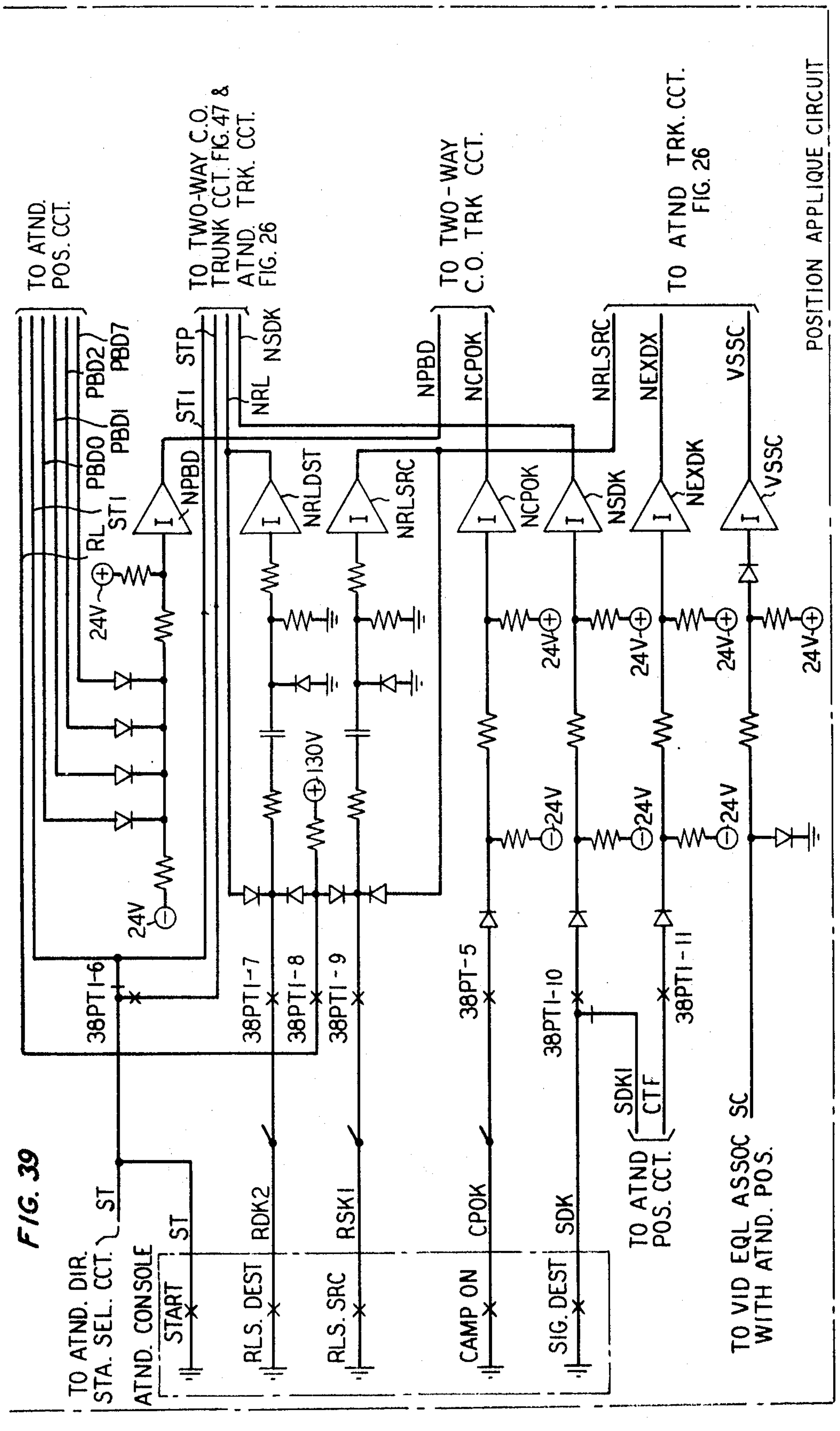

As a result of the operation of relay 36CTT in the intercom trunk circuit:

a. with reference to FIG. 35, a supervisory and battery-feed circuit is cut through via leads TTAT and TRAT and contacts 36CTT–2 and 36CTT–3 to the called line circuit,
b. the network marks via leads TDT and TCT are removed by respective contacts 36CTT–4 and 36CTT–5,
c. supervisory sleeve leads TFAT and TSAT are grounded, and
d. in FIG. 36 lead SSC to control CC is grounded by a make contact of transfer contacts 36CTT–6.

At the called line circuit (FIGS. 2 and 3), leads TFAT and TSAT from the intercom trunk circuit connect via the network to leads LFA and LSA, respectively. The ground on lead LSA operates relay 3CO while the ground on lead LFA operates relay 3PS. The latter relay locks up and indicates to the line circuit that a video call connection is being established. Contacts 3PS–1 and 3PB–3 cut off the line circuitry of the audio only switching system connected via leads TA and RA. It is noted that the bypass networks across those contacts comprising a resistor and capacitor furnish AC paths for busy verification tests and conveying camp-on signal from the audio switching system.

Returning now to the establishment of the remainder of the network connection under control of common control CC, when in FIG. 13 network control sends a high signal over lead PGC the output of inverter ECRA is a low signal. Thus lead RP' which may be traced from FIG. 13 to FIG. 14 actuates gate ITCT which turns off and sets flip-flop ICO'. This action results in a signal to the attached register circuit indicating that the readout function is completed and that the digit counters of the register circuit may be disconnected from the common control CC line scanner output gates (code lead amplifier). Following this control CC and register 0 enter what is known as a call back sequence in which the identity of the calling line circuit is determined. Continuing now with a description of how the register digit counters are disconnected from the code leads, terminal 1 of flip-flop ICO' is high and that signal is coupled via lead ICO which is traceable from FIG. 14 to FIG. 21 turning gate CBLO on. The low signal output of gate CBLO is inverted by inverter RSA and applied to lead RSA which may be traced from FIG. 21 to FIG. 17 and therein the set flip-flop A. It will be recalled that the low signal on lead A' which connects via inverter AAB to terminal 0 of flip-flop A controlled the register circuit connection of the store number to control CC. When flip-flop A is set, a high signal is produced on lead A' and the register disconnects the digit storage units. In FIG. 34 the high signal on lead A' turns on gate RDO causing the generation of a high signal on lead RD which turns off all actuated digit counter output gates.

Turning now to the call back sequence, common control CC begins a sequence after which the calling line network appearance is marked for establishing a connection from that line circuit to the intercom trunk circuit. In this discussion let us assume that the calling line circuit is represented by FIGS. 2 and 3. Broadly, control CC places a unique combination of voltages on the Fe and Ge lines of every video line circuit. At the same time a callback signal is routed via register circuit 0 over the established network path to the calling line circuit biasing line circuit network RLC3 thereof. Thereafter the line scanner of FIGS. 4 and 5 are actuated and its output appears at each line circuit consecutively. When the calling line is located, gate LA of the line circuit turns off and it forwards a signal to control CC to halt the line scanner.

Considering the foregoing operation in greater detail, the F— and G— voltage are established at +24 volts and ground respectively preparatory to line scanning as follows. It will be recalled that a high signal is present on lead APD of FIG. 17 and that lead may be traced to FIG. 14 and therein to gate APD. The latter is turned on producing a low signal on lead B which is traceable to FIG. 18 and to an input of gate FC. It may be observed on inspection of FIG. 18 that the various F— (leads Fa,Fb) and G— (leads Ga,Gb) voltage control circuits for lines, trunks and other miscellaneous circuits are shown. Since lead QL is also low at this time, the low signal on lead B causes gate FC to turn off and via voltage amplifiers FCA and FCB the production of a +24 volt signal on leads Fa and Fb. With reference to FIG. 2, every Fe lead from every line circuit connects in accordance with a preplanned power distribution arrangement to either lead Fa or Fb.

Figure 18:
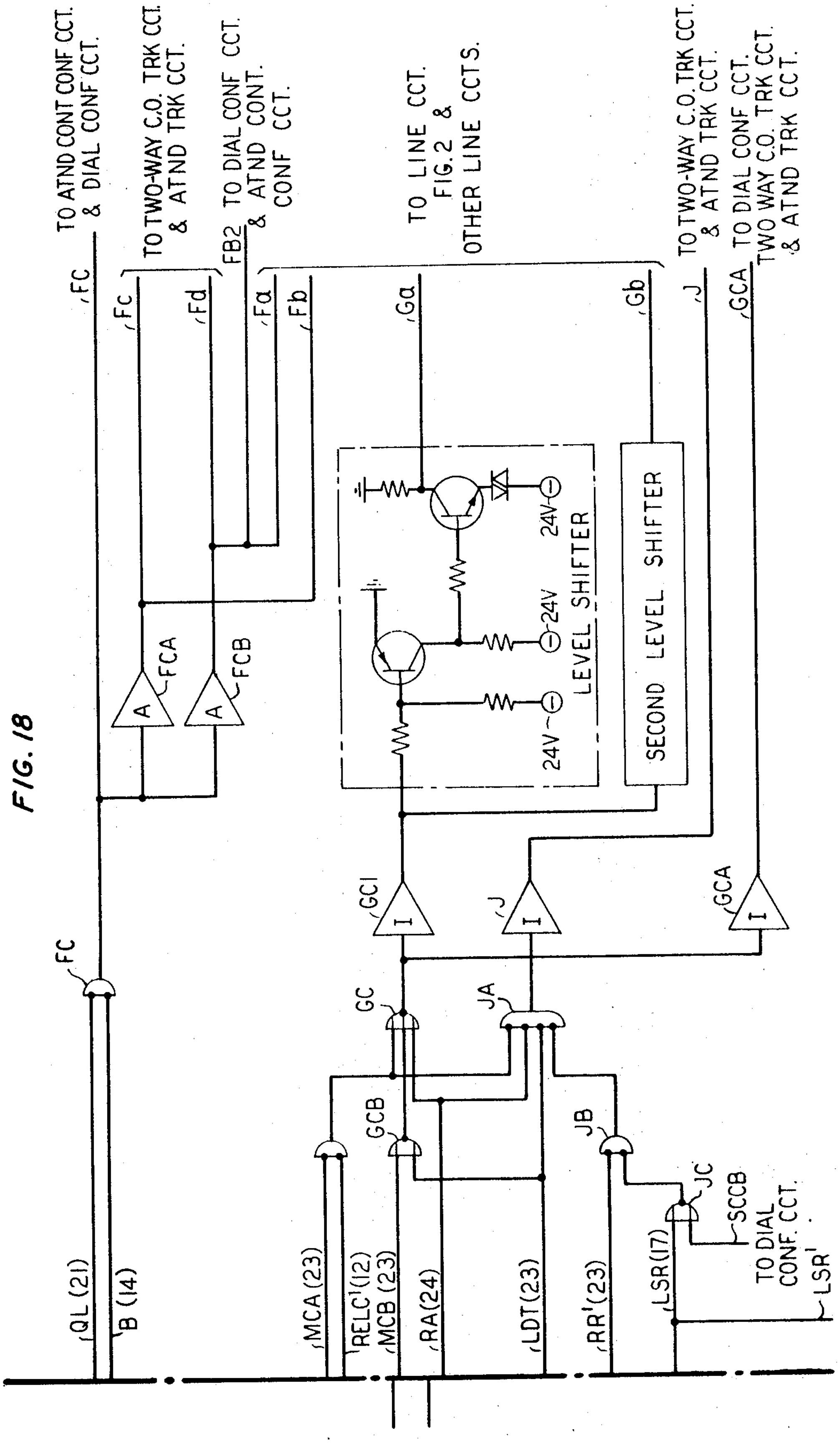

The G— voltage (lead Ge in FIG. 2) of each line is placed at ground potential during the call back sequence to prevent requests for service (it will be recalled causes gate LA of the circuit to turn off) from interference with the search for the calling line circuit by the common control line scanner. In particular, it will be recalled that gate GCB in FIG. 18 is turned off at this time since low signals appear on its inputs. The output of gate GCB turns on gate GC and in turn the output of gate GC, a low signal, is inverted by inverter GC1 and applied to the level shifter. It is of conventional design and therefore will not be considered in detail. It is sufficient to describe it as responsive to a high signal at its input for generating a ground at its output, lead Ga. A second level shifter is furnished for concurrently grounding lead Gb. Either lead Ga or Gb is connected in some ordered distribution to leads Ge of every line.

Figure 21:
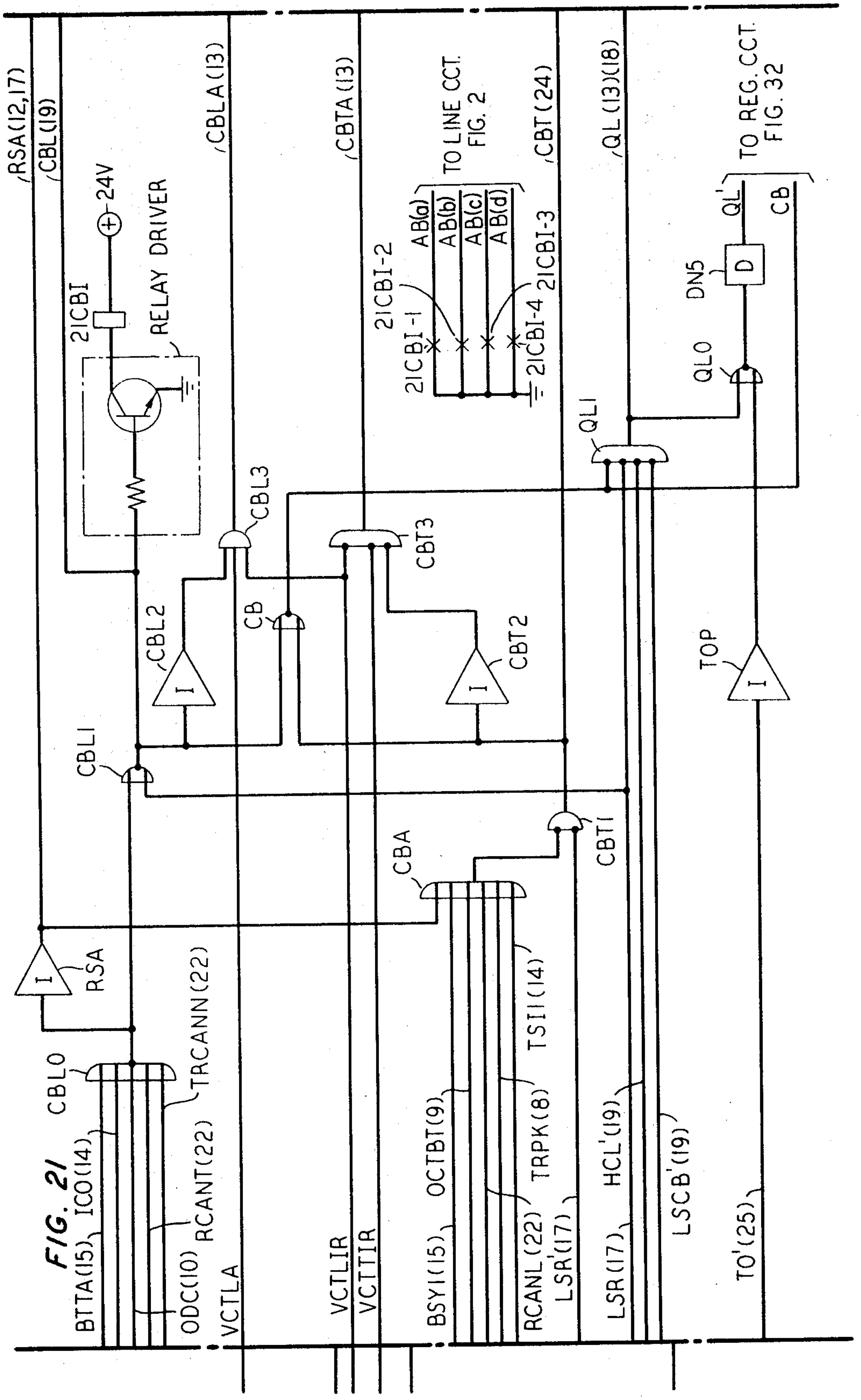

With reference to FIG. 21, relay 21CBI is operated at this time as the result of turning on gate CBLO. At its contacts 21CBI(1–4) ground is connected to lead AB(*a*), AB(*b*), AB(*c*), and AB(*d*) which are distributed over the line circuit and connected therein to lead AB(*f*). This action maintains each priorly operated relay 3PS operated during the call back sequence and thereby prevents changes in the line circuits which may interfere with the testing sequence.

The common control marks the calling line circuit as follows. In FIG. 21, as a result of turning on gate CBLO, gates CBL1 and CB are actuated and a low signal is sent to register 0 over lead CB. With reference to FIG. 32 of register 0 lead CB connects to gate CBA. Since all other inputs to gate CBA are low at this time gate CBA turns off, gate CBB turns on and a ground is forwarded to the level shifter. The output of the latter, −24 volts is forwarded via contacts 32COLS–1, 32CTTS–1, lead TSA, the switching network connection to the line circuit. Therein the −24 volts connects to lead LSA and via diode D–13 to network RLC3. As a result, the Fe lead voltage, +24 volts, is negated and effectively a low signal is connected to terminal 1 of gate LA of the calling line circuit. Accordingly, when the line scanner applies a low signal to leads (*a*)T, (*b*)T, (*c*)U and (*d*)U all inputs to gate LA are low and it turns off producing a high signal which is coupled via diode D1, contacts 3CO–1 and lead LB1 to control CC for halting the line scanner.

Control CC responds to the detection of the calling line circuitry in the following manner. The signal on lead LB1 actuates in FIG. 6 gate LBO1, inverter LBO0 and gate LO1 generating a low signal on lead LO. The latter may be traced from FIG. 6 to FIG. 19 and therein to inverter LO0. The output of inverter LO0, a high signal, as hereinbefore described, stops the line scanner on the calling line. More particularly, flip-flop HCL'' is set via gate HCLA and its output, a high signal on lead HCL, inhibits gate SPU1 of FIG. 5.

Having located the calling line, control CC sends a signal to register 0 for controlling the removal of the call back signal (−24 on lead LSA of the line circuit) and for releasing register 0. In addition, control CC changes the F− voltage from +24 volts to ground, placing the line circuit gate LA entirely under control of the line scanner and causing the marking relay (2LM) for the calling circuit to operate. Thereafter, control CC forwards a signal to the intercom circuit for causing it to mark its originating terminal appearance in the network.

Specifically, in FIG. 19 the low signal output of flip-flop HCL'' at its terminal 0 is conveyed via lead HCL' from FIG. 19 to FIG. 21. As a result, gate QL1 turns off and gate QL0 turns on. The output of gate QL0 is delayed in network DN5 and subsequently forwarded over lead QL' to FIG. 32 of register 0 turning off gate QL. This action, as will be apparent from the ensuing discussion, causes register 0 to release from the calling line circuit and also the removal of the call back signal. The latter is effected by the high signal output of gate QL which couples to gate CBA turning it on. Also, the output of gate QL is connected to gate CTTS which turns on releasing relay 32CTTS. The release of the latter relay restores the majority of register 0 circuits to normal and at its contact 32CTTS–5, shown in the upper right-hand corner of FIG. 32, removes ground from lead TFA (interconnects to lead LFA of the calling line).

The line circuit F− voltage is restored to ground as a result of the high signal imposed on lead QL of FIG. 21 when gate QL1 is turned off. Lead QL may be traced to FIG. 18 and therein to gate FC which turns on causing the change in the F− voltage.

With reference to FIGS. 2 and 3, relay 3CO releases when register 0 removes ground from line circuit lead LSA. This sets the stage for the operation of the line mark relay 2LM. Since the line scanner is stopped on this circuit, gate LA is turned off and its output operates relay 2LM. In particular, this path may be traced from gate LA, via diode D1, contact 3CO–1 and network RLC3 turning on transistor Q1 for operating relay 2LM. In FIG. 3, at operated contacts 2LM–3 and 2LM–4, the line circuit marks (ground) leads LC and LD to network control for identifying the calling line network appearance.

Turning our attention next to the intercom trunk circuit, control CC signals that circuit to provide an originating side network mark to the network control circuit. In addition, the intercom trunk circuit is alerted to furnish supervision and talking battery upon the establishment of the connection to the calling circuit. Specifically, control CC as shown in fig. 14, sends a low signal via lead MIC0 to the intercom trunk CKT. This signal is a result of the set condition of flip-flop ICO' which it will be recalled was set when the network control circuit signalled that the first connection to the called line terminal is completed. Referring to FIG. 36, lead MIC0 connects to gate MIC of the intercom trunk circuit. Since the scanner shown in FIG. 25 is at rest and set on this trunk circuit, the other inputs, leads AIC and XIC, to gate MIC are low turning off gate MIC . Transistor QMO therefore turns on and relay 36MO is operated. As shown in the lower left-hand corner of FIG. 36, ground is connected via lead TCO and TDO to the network control via operated contacts 36MO– 1 and 36MO–2, respectively. Since the calling line is marked, as well as the originating side of the intercom trunk, the second connection may now be established.

In FIG. 21, it will be recalled that gate QL1 is actuated and therefore a high signal is present on lead QL. The latter may be traced from FIG. 21 to FIG. 13 wherein it connects to delay network DN6 and in turn to inverter QLD. The output of inverter QLD is a low signal which allows gate NETINH to turn off producing an enable signal, a high signal, on lead NETINA. In response thereto, the network control circuit establishes a connection from the calling line circuit to the intercom trunk circuit.

Upon the establishment of the connection, control CC resets and is available to serve other requests for service. In particular, the network control circuit returns a low signal via lead PG shown in the upper right-hand side of FIG. 36. This signal may be traced via contacts 35CTO–3 and 36MO–3 to operate relay 35 CTO in FIG. 35. The latter locks operated via contact 35MO–3 and the make contact of transfer contacts 35CTO–3. As shown in FIG. 36, leads TCO and TDO are opened at contacts 35CTO–1 and 35 CTO–2 removing the mark from the trunk side of the network. In addition, a make contact of transfer contact 35CTO–1 applies ground via diode D14 to lead TSA0 which connects via the established network path to the line circuit, FIG. 3, lead LSA for operating relay 3CO. The latter in operating releases relay 2LM and this action removes the network marks for the calling line side. With either mark removed, the network control circuit places a positive voltage on lead PGC and circuitry of FIG. 13 is actuated as follows. Monostable multivibrator MONO1 is triggered and flip-flop ECR is cleared or reset momentarily. The output of flip-flop ECR, a high signal, is connected to gate ECRA which in turn generates a high signal on lead ECR1 for resetting the entire system to normal, the idle state.

Establishment of Video Portion of Intercom Call

The video network path between the calling and called line circuits are established via the video audio system network and intercom trunk circuit concurrently with the establishment of the audio network path over the same network. Eight wires are switched via the network between the intercom trunk circuit and both the calling and called line circuits. In the prior discussion we were principally concerned with the audio path conductors (TTAO, TRAO to calling circuit and TTAT, TRAT to called circuit as shown in FIG. 35) and with the sleeve conductors (TSAO to calling circuit shown in FIG. 36 and TSAT to called circuits in FIG. 35). Although the four conductors comprising the video network path are established by the network control circuit at the time the audio and sleeve conductors are interconnected, for convenience in presentation, the establishment of the video path is considered under this section separately from the audio path conductors.

With reference to FIG. 2, the station video equipment is connected via four conductors which are designated TTV−, TRV−, TSO−, and TFO− to the switching network and also to network control circuit. As shown by arrow indications, leads TTV− and TRV− convey signals representing the images picked up at the station video equipment while leads TSO− and TFO− convey signals which are to be converted and projected on the station video screen. With reference to FIG. 36 (lower right corner) the video conductors from the calling line circuit connect to conductors TTVO, TRVO, TSVO and TFVO. The video conductors from the called line circuit connect to conductors TTVT, TRVT, TSVT, and TFVT. It is noted that pairs of these conductors are transposed so that there is a proper connection between the video receiving and sending equipments at each location.

Before the station video equipments are cut through, the intercom trunk circuit forwards a video signal to both stations for synchronizing the respective video stations facilities and for turning on the facilities. This is accomplished as follows.

Upon the operation of relay 35CTO which it will be recalled operated upon receipt of a signal from the network control circuit via lead PG, relay 36VSSI shown in FIG. 36 is operated. Contacts 36 VSSI–12 and 36VSSI–11 connect the VSS generating and control circuit via leads TSVO and TFVO to the video receiving equipment of the calling station. Similarly, contacts 36VSSI–9 and 36VSSI–8 connect the circuit to the equipment of the called station. Shortly after the synchronizing signals are sent, ringing is applied via the audio path to alert the called customer.

Synchronizing video signals continue to be forwarded to both station video facilities until the called station answers by removing the handset from its cradle. Supervisory circuitry detects the answer and operates relay 36CTPI. Specifically, in FIG. 35, when the called station answers transistor QRTA and QRTB turn on in response to negative battery connected via the station loop to the base of transistor QRTB. As a result, transistor QMT is turned off and relay 35MT releases. This obtains because the collector of transistor QRTA is near ground potential and via diode D15, contact 36 CTO–5, 35MT–4 it clamps the base of transistor QMT to ground. Your attention is directed to the right-hand side of FIG. 36, showing an operating path for relay 36CTPI comprising its winding, break contact of transfer contact 35MT–3 and contact 35CTO–6 to ground. Operated contacts of relay 36CTPI disconnect the VSS generator and control circuit. In addition, operated contacts 36CPTI–(1,2,4,5) close the video path conductors for interconnecting the calling and called video equipments.

Called Customer Busy

Let us assume in the foregoing described call that the called line terminal tests busy instead of idle. In this event, control CC locates an idle busy tone circuit, causes it to mark the network and signals for a network connection between the calling line circuit and the busy tone trunk circuit. If the called line circuit is busy, relay 3CO is operated. Thus when the line scanner (FIGS. 4 and 5) stops on the circuit causing gate LA to turn off, the output of gate LA, a high signal, is connected via diode D1, make contact of transfer contact 3CO–1 and lead LB1 to a cross-connect punching in FIG. 6. If the called line is arranged for line hunting, lead LB1 is cross connected to lead HAn of another line circuit in the hunting order. Ignoring the hunting strap for purposes of this discussion, assume lead LB1 is instead connected, as shown, to lead LBA and therefore gate LBO1 turns on. This action causes a low signal to be generated on leads LO and LBO. The low signal on lead LO which may be traced to FIG. 19 stops the line scanner as hereinbefore described. The low signal on lead LBO which connects to gate BSY in FIG. 14 causes gate BSY to turn off and results in network marking of the busy tone trunk circuit if idle.

A low signal on lead MBT (shown in the lower right corner of FIG. 15) causes the busy tone trunk circuit, if idle, to mark the network. What follows is the gate operations necessary to produce that low signal. The output on lead BSY, a high signal, which is traceable to FIG. 15, sets flip-flop BSY via gate BSYT. The output of terminal 0 of flip-flop BSY turns gate BSYA off and gate BTOB on. By what may be considered an unorthodox procedure, the low output of gate BTOB resets flip-flop BT by grounding its terminal 1 and forcing it to switch states. Accordingly, at terminal 0 of flip-flop BT, a high signal is produced and inverted by inverter MBT producing a low signal on lead MBT.

Having marked the busy tone circuit, the calling line circuit is marked by a call back sequence which was described heretofore. When gate BTOB (FIG. 15) turns on, its output inverted by inverter BTTA is applied to lead BTTA. The latter can be traced from FIG. 15 to FIG. 21 wherein gate CBLO is turned on to initiate the call back sequence. Subsequently, control CC sends a signal to register 0 which releases and in turn signals the calling line circuit via the network to mark the network.

The common control CC once again enables the network control circuit via lead NETINA to pulse the network for establishing the connection between the calling line and the busy tone trunk circuit. When the connection is completed, the network control circuit sends a release signal via lead PGC of FIG. 13 initiating a release sequence of control CC.

Figure 15:
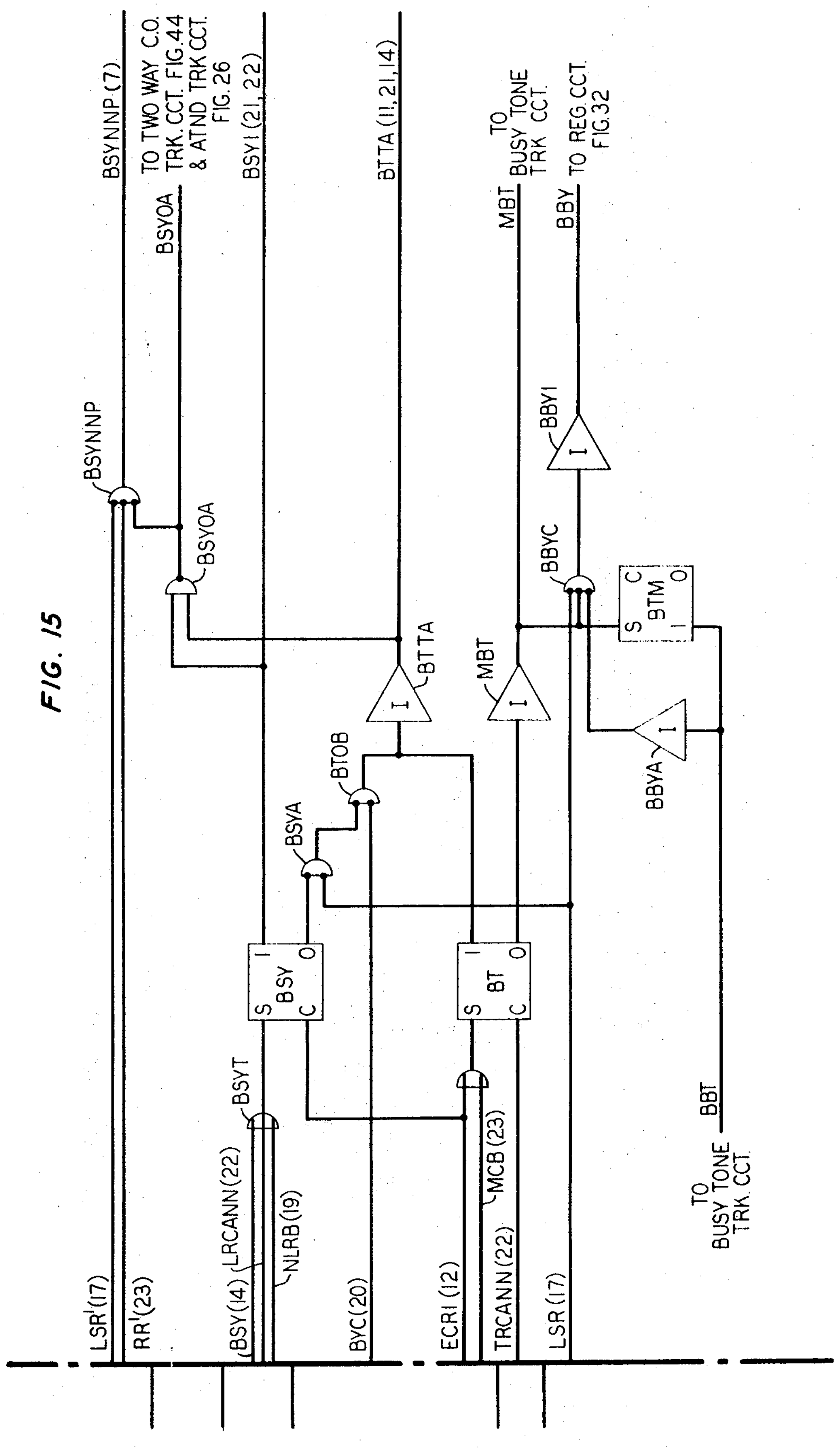
Figure 16:
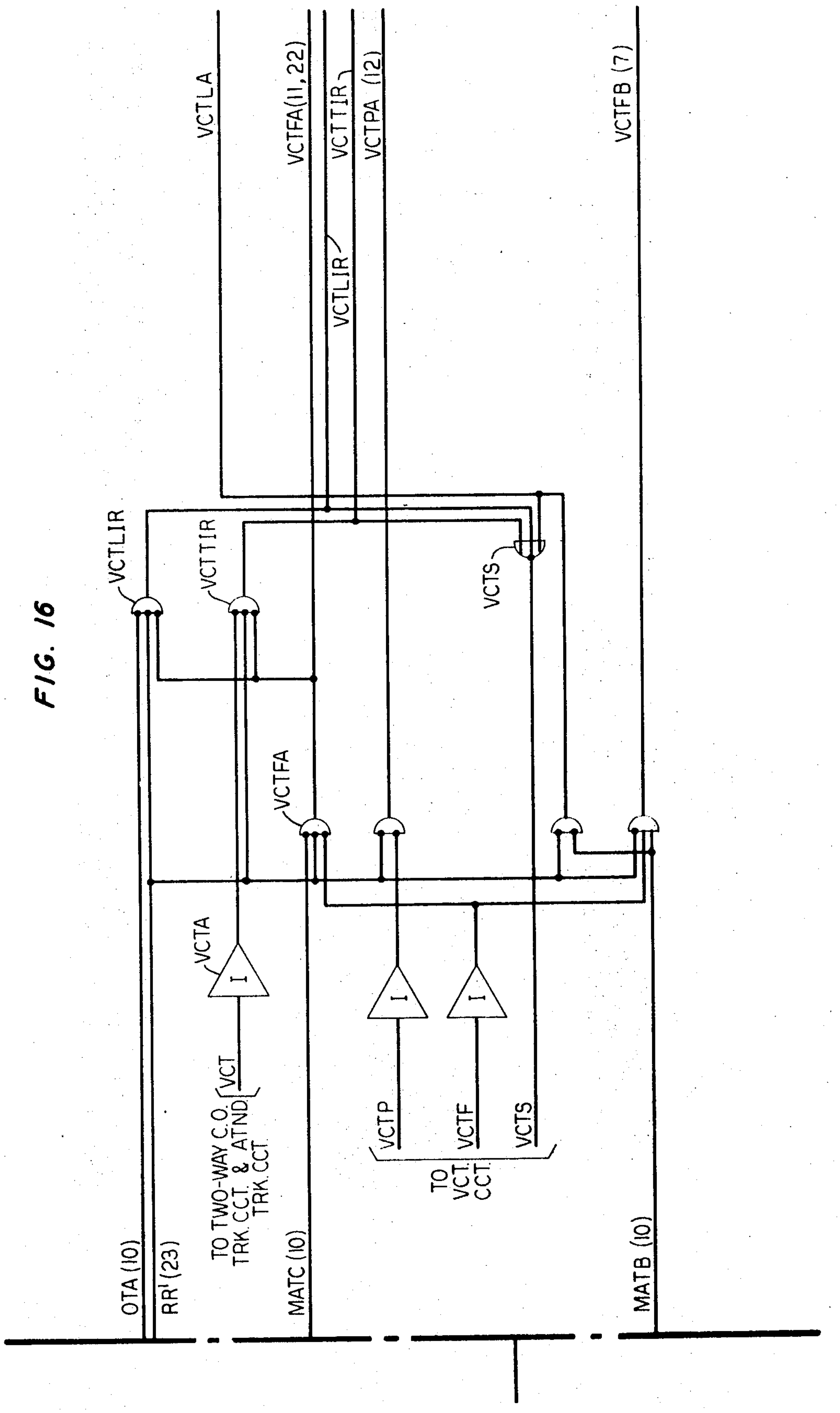

If the busy tone trunk circuit is unavailable at this time, control CC forwards a signal to register 0 which returns busy tone instead. With reference to FIG. 15, as shown in the lower left-hand corner, a high signal is present on lead BBT if the busy tone trunk circuit is busy. Under these conditions the circuitry of the busy tone trunk circuit is arranged to ignore the low signal on lead MBT. Also, gate BBYC turns off producing a low signal on lead BBY via inverter BBY1 to signal register 0 that it is required to return the busy tone signal.

It is noted that the call back sequence automatically progresses even though the busy tone trunk circuit is busy. To obviate the necessity for furnishing inhibiting circuitry and the necessity for thereby slowing the overall operate time of control CC, we have choosen to reestablish the calling line circuit-to-register connection. With reference to FIG. 32, gate RMKTR is turned off when lead BBY from control CC conveys a low signal and as a result relay 32MTS reoperates via transistor QMTS. As described hereinbefore, operated contacts of relay 32MTS mark the network for the connection. Thereafter, control CC enables the network control circuit and subsequently releases from the connection.

With reference to FIG. 31, register 0 returns busy tones as a result of the operation of relay 31BY. Lead BBY in FIG. 32 may be traced via intercircuit cable CB6 to FIG. 31 wherein it connects to gate BBY for turning it off. The high signal output of gate BBY connects via resistor R4 to transistor Q3. The latter turns on operating relay 31BY. The base of transistor Q3 connects via resistor R5 and contact 31BY–2 to the output of the supervisory and timing circuit. In this manner, relay 31BY is held operated so long as the caller remains off-hook. Your attention is next directed to FIG. 30 wherein contact 31BY–3 connects busy tone to the secondary winding of transformer T1 for conveying the busy tone to the caller.

In the event the caller does not release the register connection within approximately 10 seconds, register 0 calls in common control CC to make a disposition of this connection. As shown in FIG. 31, the interdigital timer times out applying a high signal on lead TO. In FIG. 31, the output of gate TO' may be traced to gate TOSUP which turns on releasing relay 31BY for removing busy tone from the calling connection. Also the output of gate TO may be traced via cable CB4 to FIG. 30 and therein to gate SDC which turns off. In turn, gate SDD is turned off to preset (jam set) the steering circuit ST1 of FIG. 33. Specifically, a high signal is generated on lead SD which may be traced via cable CB1 to FIG. 33. The high signal is connected to lead JSRO of circuit ST1 forcing it to advance to a high signal output on lead RO. It will be recalled that lead RO connects via gate FOR1 and inverter FORO to lead FORO' and calls common control CC to dispose of this connection.

Time Out of Register Circuit

In the event the caller remains off-hook for more than 10 seconds without forwarding at least one digit, the video system automatically disconnects giving the audio system preference in handling the permanent signal condition. Timer gate TO of FIG. 31 turns off after 10 seconds. Its output may be traced via lead TO and cable CB4 to FIG. 30 and therein to inverter DC1. The output of inverter DC1, a low signal, couples to gate DC3. Referring next to FIG. 33, lead STRS from circuit ST1 is high so long as no digits have been received. Lead STRS connects to cable CB1 which can be traced from FIG. 33 to FIG. 30 and therein to inverter DC2 which converts the received signal to a low signal. Gate DC3 turns off producing a high signal on lead TO1 which may be traced via cable CB2 to gate CTTS which turns on for releasing relay 32CTTS. This action, as shown in the left-hand side of FIG. 30, opens the audio network paths at contact 32CTTS-3 and 32CTTS-4 and causes register 0 to restore to normal.

If the caller forwards the P digit, at least before time out, the video switching system disposes of the partial dial condition by calling control CC which routes the call to attendant facilities via an attendant trunk circuit (not shown). When lead TO is made high by a time out condition, steering circuit ST1 is preset to a readout mode and thus a request for service signal is sent to control CC. In particular, with reference to FIG. 33, the preset state of circuit ST1 causes a high signal via FORO′ to be sent to control CC requesting a read-register mode of operation. As explained hereinbefore, if the register is preferred for service, control CC returns a signal to register 0 and accordingly, in FIG. 34, lead RDA is made low. Lead RDA may be traced from FIG. 34 to FIG. 30 and therein to gate TORO. The other input to gate TORO is also low since the timer has timed out. Thus, a high signal is forwarded to control CC for appropriate action on this call.

Control CC responds to the signal on lead TORO by directing the establishment of connection from the calling line circuit to an attendant trunk circuit. Specifically, in FIG. 11 receipt of a high signal on lead TORO (leads TOR1 and TOR2, respectively, connect to registers 1 and 2) turns on gate TOR and produces a low signal at the input of gate ICPI. The latter, in turn, sets flip-flop ICPT.

Figure 10:
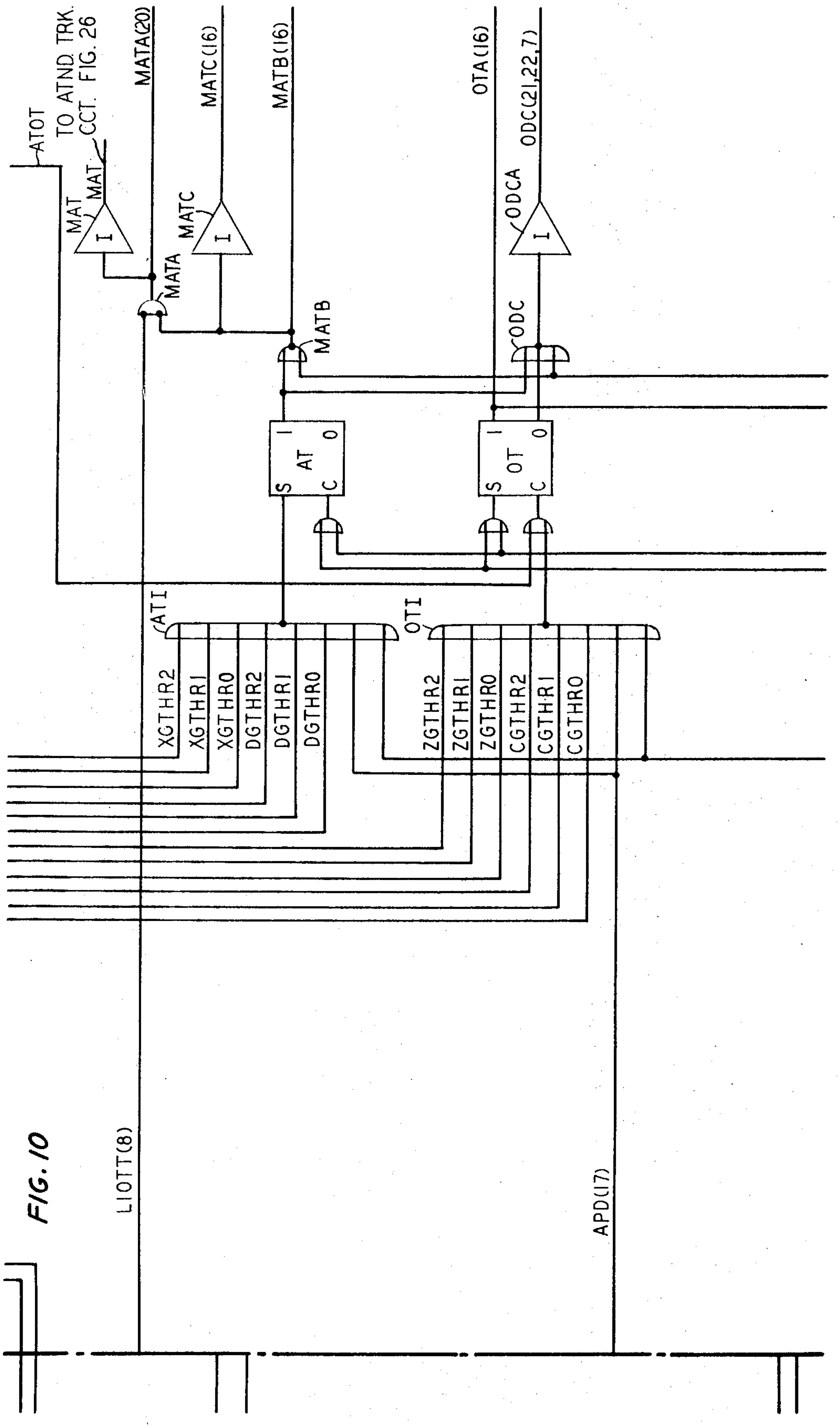

A high signal at terminal 1 of flip-flop ICPT causes a. the attendant trunk circuit to be marked,
b. the initiation of a call back sequence and
c. the forwarding of a signal to the attendant trunk circuit indicating that this is an intercepted call. In FIG. 10, gate MATB is turned on conveying a low signal which may be traced to gate MATA and to inverter MATC. The output of gate MATA is inverted and forwarded via lead MAT to the attendant trunk circuit shown in FIG. 26. The attendant trunk circuit marks its network location for the subsequent connection.

The output of flip-flop ICPT also actuates in FIG. 10 gates ODC and ODCA for initiating the call back sequence. In particular, a high signal is generated on lead ODC which may be traced to FIG. 21 for turning on gate CBLO. It will be recalled that gate CBLO controls the call back operation.

Figure 11:
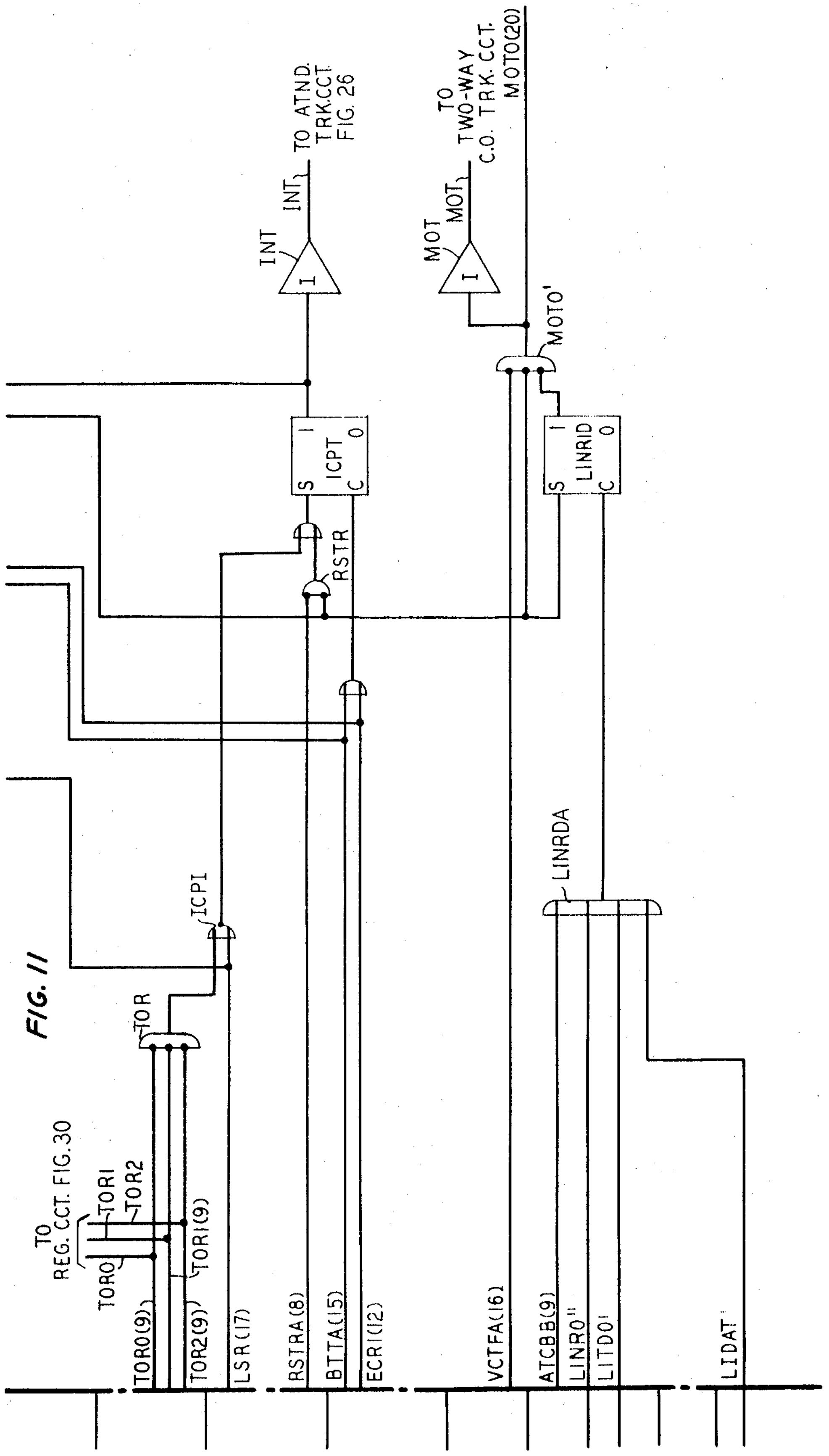
Figure 12:
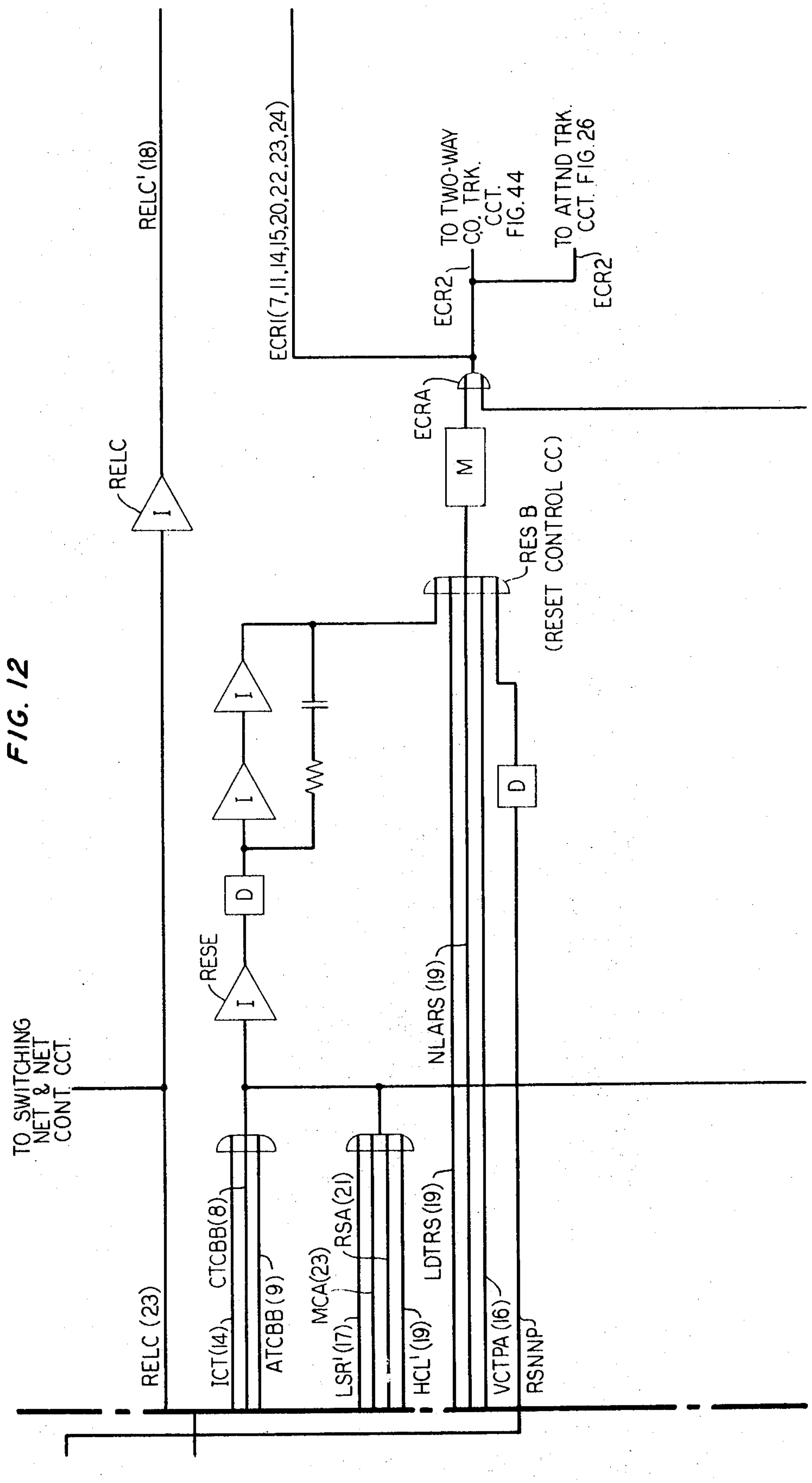

The output of flip-flop ICPT connects in FIG. 11 to inverter INT which forwards a signal over lead INT to the attendant trunk circuit (see FIG. 26) altering the attendant that this is an intercept type of call.

Nonexistent Codes

Figure 7:
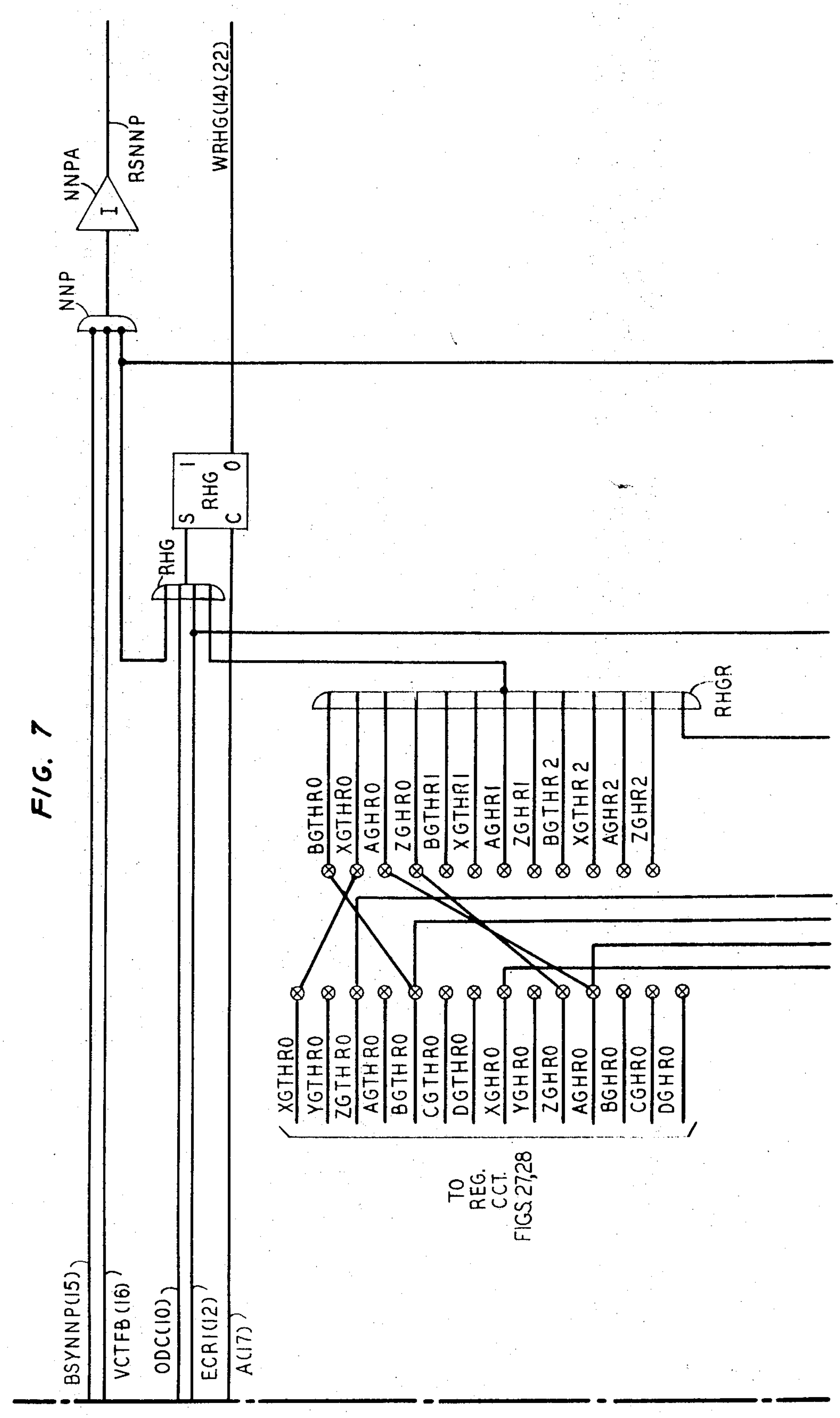
Figure 8:
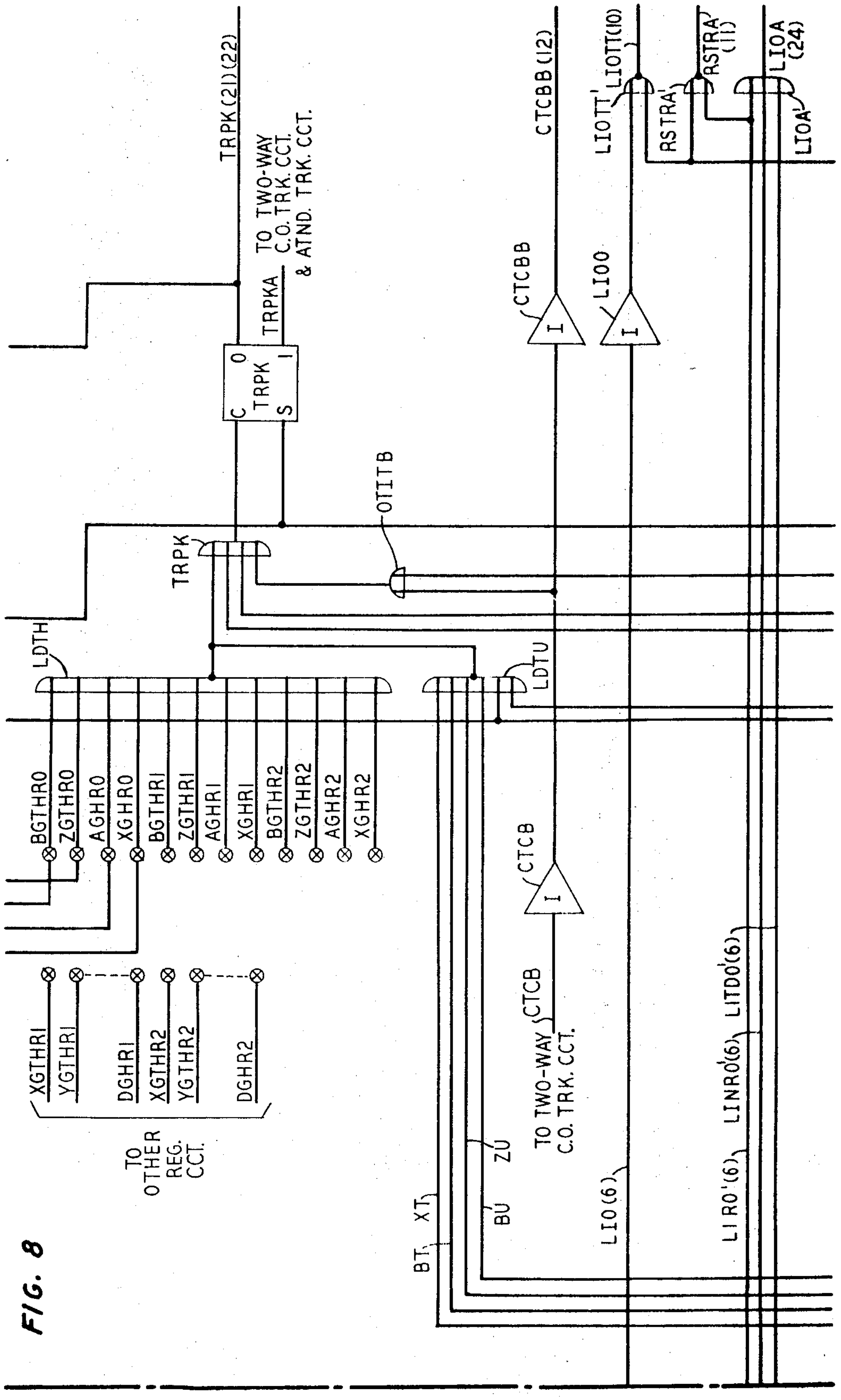
Figure 9:
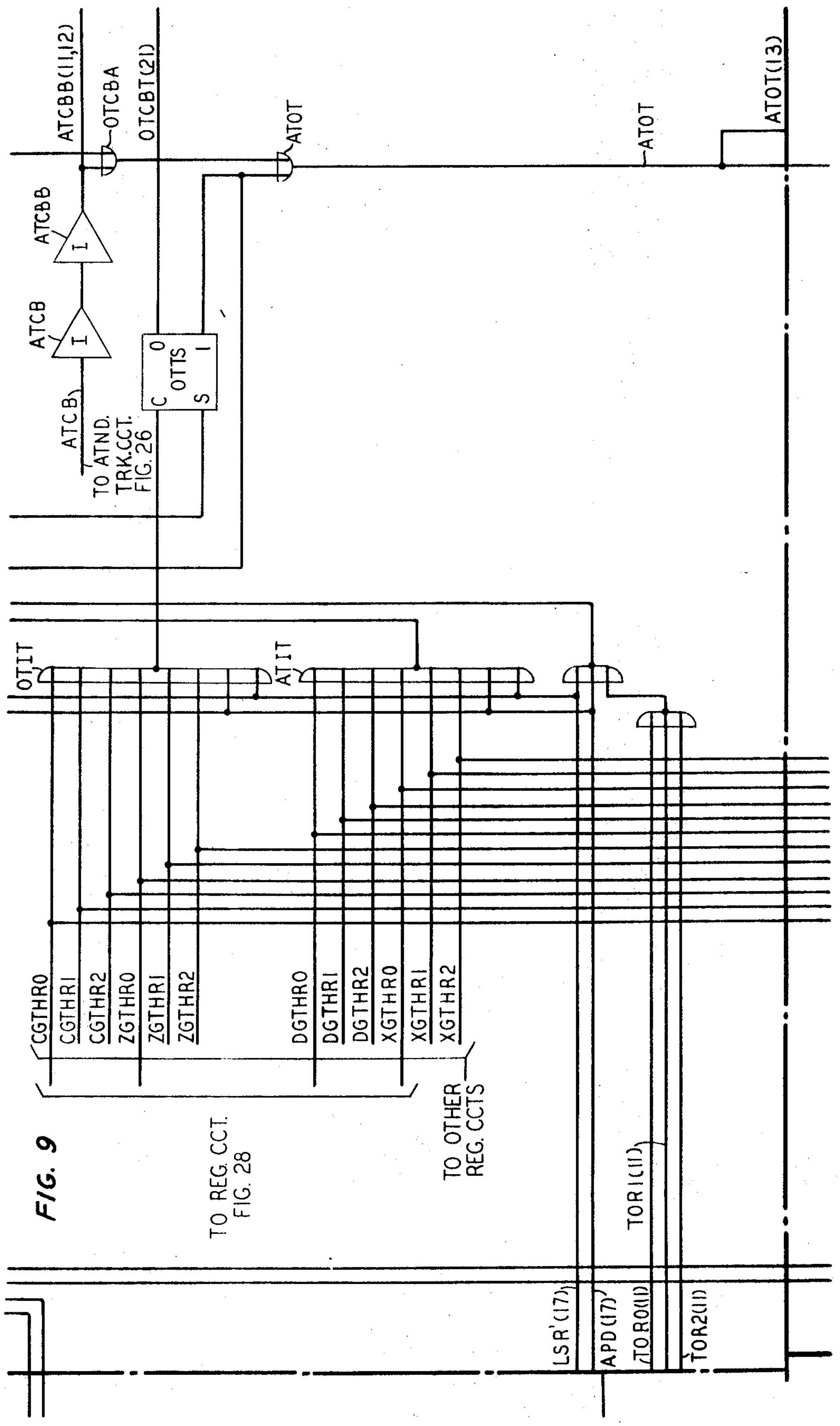

In the event the caller misdials a thousands, hundreds, tens or units digit and as a result a nonexistent code is recorded in the register, control CC upon gating the contents of digit counter thereunto detects the wrong code. As shown in FIGS. 7 and 8 leads XGTHRO, etc., are cross-connectable to gate RHGR. If the correct code is dialed, gate RHGR is turned off and flip-flop RHG is reset.

If an unequipped hundreds group (thousands and hundreds) digit is received, control CC causes the call to be routed to a recorded announcement facility. Specifically, gate RHGR remains on forcing flip-flop RHG to stay cleared and lead WRHG to stay high. The latter may be traced to FIG. 22 wherein after a delay interposed by the operation of delay network DN8 gate WLV turns on. In turn, gate RLCA is actuated and flip-flop RECA is cleared, or reset. The output of flip-flop RECA enables gates RCANT and RCANL. If the trunk circuit is available, lead RCANAV is low. Accordingly, the so-called three state flip-flop consisting of gates RCANL, RCAM and RCANT are held in the state wherein lead RCANT is alone high.

The recorded announcement trunk responds to the high signal on lead RCANT by marking its network appearance. Gate TRCANN is also turned off at this time producing a high signal on lead TRCANN which may be traced to FIG. 21 turning on gate CBLO and beginning the call back sequence. As soon as the calling line circuit is marked, the network is pulsed and the call connection is complete.

Figure 22:
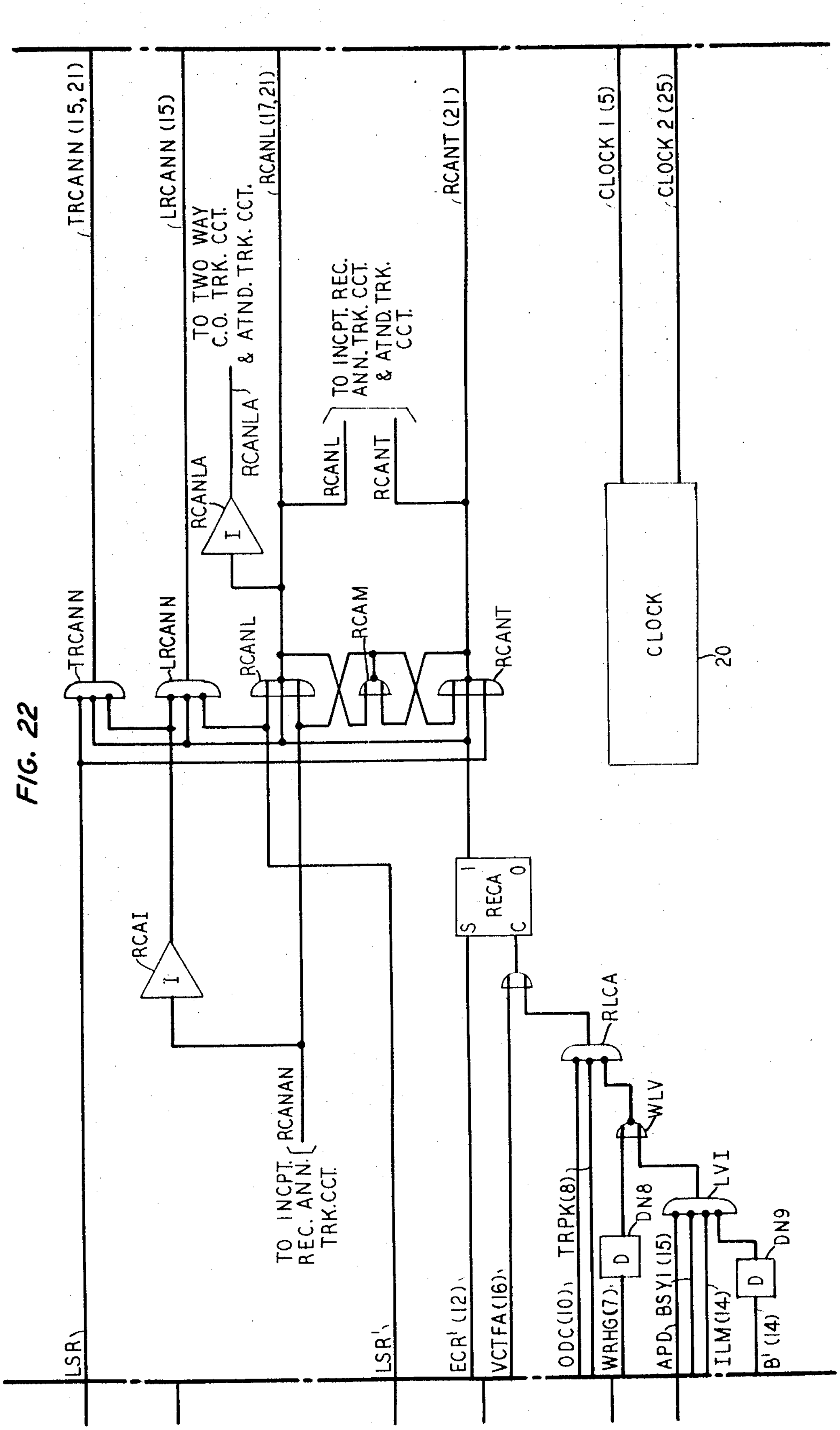

If the correct hundred digit is recorded, flip-flop RHG of FIG. 7 is set and the correct F— and G— voltages are applied during the line test. However, if the tens and units digits, for example, are incorrect, the gate LA of line circuit does not function since it is nonexistent. With reference to FIG. 22 lower left-hand corner after a period network DN9 allows the signal on the lead B′, low signal, to turn off gate LVI. The output of the latter turns on gate WLV and initiates the above-described sequence whereby a recorded announcement trunk circuit is connected to the calling line circuit.

Video Call to Outgoing Video Trunk Circuit

This call connection proceeds in much the same manner as the previously described connection to video line circuit. When the caller goes off-hook both the video switching system as well as the audio switching system independently connect respective register circuits to the calling line. The caller keys the P digit indicating that a video call connection is desired and, as previously described the video switching system controls the release of the audio switching so that the video switching system has complete control of the call. Thereafter the caller dials a single digit which is customarily the digit 9 to indicate this request for a connection to an outgoing video trunk circuit.

As soon as the digit 9 is stored in the register circuit, it requests a connection to control CC for disposition of the call. The dialed digit is recorded in the thousands digit counter shown in FIG. 28. The counter output is connected to a pretranslator circuit of FIG. 30 via leads XTH, ZTH, BTH, CTH and DTH. That circuit detects the presence of the digit 9 and in such event turns on gate SDC and turns off gate SDD. The output of the latter gate presets digit steering circuit ST1 as previously described via lead SD and cable CB1.

Turning next to control CC, it responds to the receipt of digit 9 by immediately initiating a call back sequence which it will be recalled marks the calling line circuit network appearance. In addition, it verifies that the calling line class of service to determine whether or not the caller is entitled to this type of connection. If the line is nonrestricted, allowed to originate such calls, the idle circuit line scanner is activated to look for an idle video trunk circuit and finding one, to cause it to mark its network location.

Specifically, FIG. 10 depicts the control CC circuitry including gate OT1 and flip-flop OT for determining that this request is for a video trunk circuit and initiating a trunk connect sequence. If a digit 9 is forwarded by the register to control CC, gate OT1 is turned off and flip-flop OT is cleared. This action produces a high signal on lead ODC via gate ODC and inverter ODCA. Lead ODC may be traced to FIG. 21 wherein gate CBLO is turned on for initiating the call back sequence as previously described. When the calling line circuit has been identified, assuming FIGS. 2 and 3 depict that circuit, a high signal is produced on lead LI1 which connects in FIG. 6 to a cross-connect punching. As shown, the circuit is cross connected to gate LINRO1 which is nonrestrictive service. Accordingly, lead LINTO″ conveys a high signal generated by gate LINROO and it may be traced to FIG. 11 wherein flip-flop LINRID is reset.

The output of flip-flop LINRID places an identity mark on each video trunk circuit and activates the idle circuit scanner of FIG. 25 looking for one idle video trunk circuit. In particular, the output at terminal 1 of flip-flop LINRID turns off gate MOTO′ since all other inputs are low at this time. Thus, a high signal is generated on lead MOTO which may be traced to FIG. 20 turning on gate ICSC which, as hereinbefore disclosed, activated the idle circuit scanner. The output of gate MOTO′ is inverted by inverter MOT and therefore a low signal is sent to each video trunk circuit such as for example the one shown in FIGS. 40–51.

Figure 43:
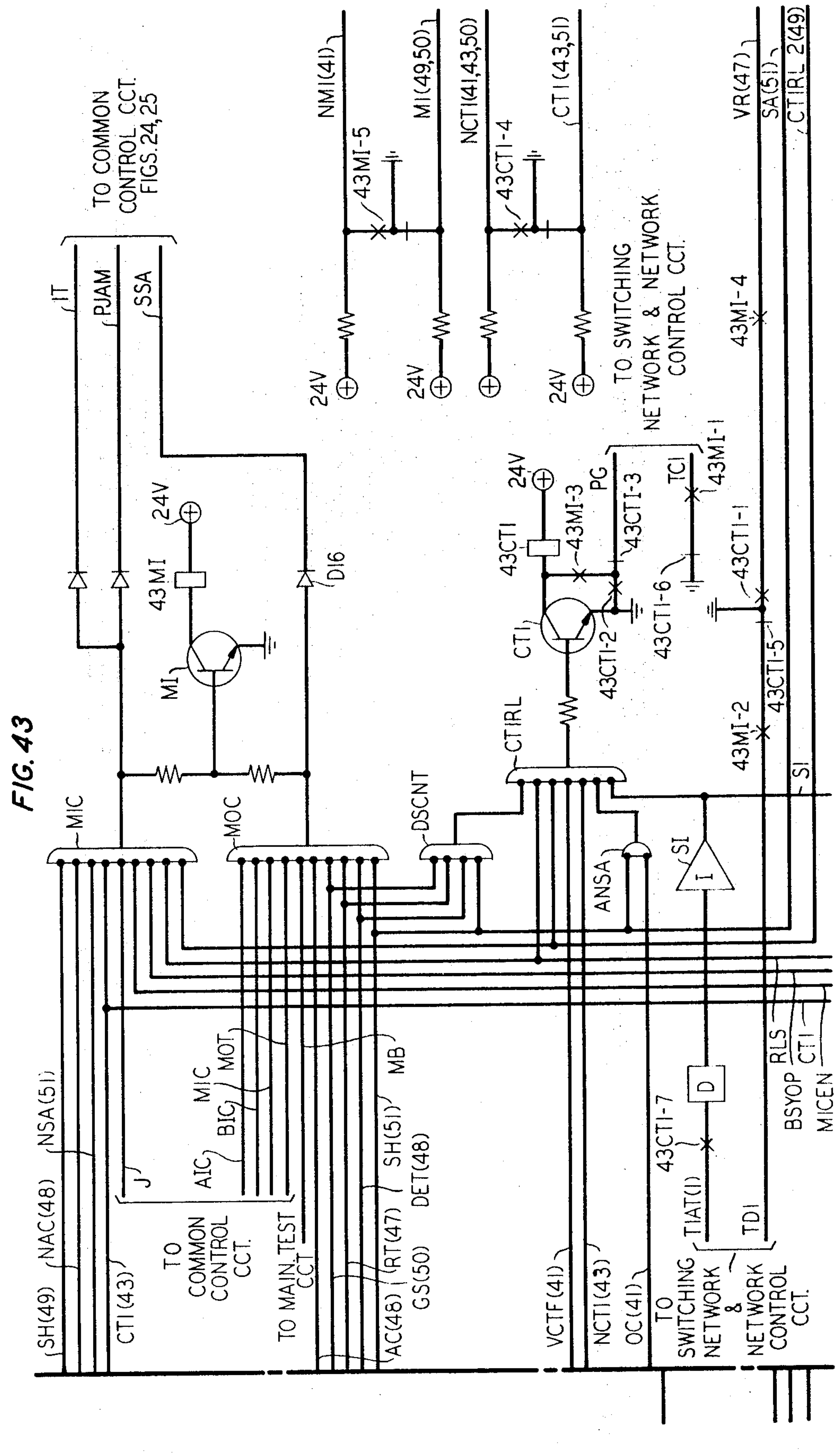
Figure 44:
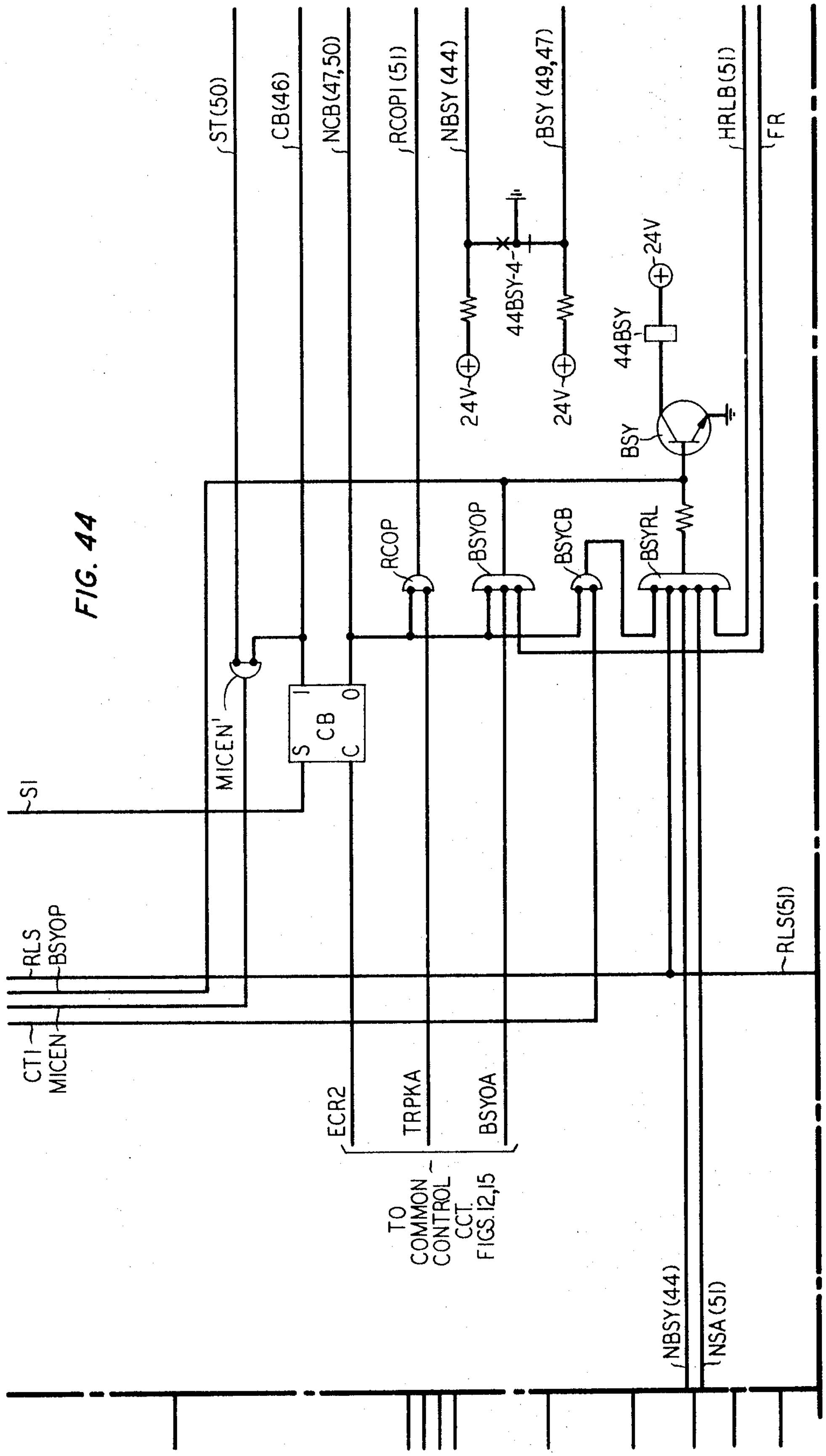

We turn out attention now to the video trunk circuit to discuss its response to receipt of the signal on lead MOT as well as to the idle circuit scanner search for an idle trunk circuit. Referring to FIG. 43, gate MOC turns off if the trunk circuit is idle when the idle circuit scanner stops momentarily on this particular circuit. This produces a high signal on lead SSA which connects to control CC stopping the scanner. In particular, leads AIC, BIC and MIC connect directly to unique output terminals of the scanner. These leads are low when the scanner interrogates this circuit. If the trunk circuit is idle at this time, leads MB, AC GS, RT, DET and SH are also low at this time allowing gate MOC to turn off.

The trunk circuit marks its network appearance as soon as gate MOC turns off. The output of the latter gate turns on transistor MI and operates relay 43MI. With reference to the same figure contacts, 43MI–1 and 43MI–2 connect ground respectively to leads TC1 and TD1 and mark the network appearance. It is noted that the aforementioned grounds are connected via break contacts of relay 43CTI which operates after the connection is established to remove the network marks.

At this point two appearances in the network are marked and control CC proceeds to order that a network connection be established as discussed hereinbefore by turning off gate NETINH shown in FIG. 13. However, unlike the intercom call connection and other connections hereinbefore discussed, control CC does not release when the network control circuit pulses lead PGC. Instead control CC initiates a video continuity test and waits for the results of that test before releasing.

The video continuity test is designed to test the video transmission capability of the established video quad connection between the calling line circuit and the video trunk circuit. If the test indicates a good connection, control CC releases and the video trunk circuit sends a seizure signal forward via the interoffice facilities to alert the far end video trunk circuit. On the other hand, if the test indicates the video quad transmission is poor or nonexistent, the video trunk circuit is released and the call is routed to a recorded announcement circuit.

It will be recalled, from our prior discussion, that flip-flop OT in FIG. 10 is reset. Therefore, a low signal is produced on lead OTA which may be traced to FIG. 16. Gate VCTLIR is turned off and gate VCTS is turned on. This produces a low signal on lead VCTS which connects to a video continuity test (VCT) circuit for actuating it. If the test is successful, the VCT circuit returns a signal via lead VCTP which is coupled internally to lead VCTPA. The latter can be traced to FIG. 12 wherein gate RESB is turned on causing control CC to restore to normal. If the test fails, a signal is returned via lead VCTF which couples internally to lead VCTFA. The latter may be traced to FIG. 22 where flip-flop RECA is set beginning the sequence whereby a recorded announcement trunk circuit is network marked for connection to the calling line circuit as hereinbefore described. Moreover, lead VCTFA may also be traced to FIG. 11 wherein gate MOTO' is turned on removing the signal on lead MOT which results in the release of the trunk mark relay 43MI.

Turning to the trunk circuit, when the network connection to the calling line circuit is established, the network control circuit sends a signal via lead PG to the trunk circuit for operating cutthrough relay 43CTI. The latter is shown in FIG. 43 and its operating path may be traced from battery, through its winding, contacts 43MI–3 and 43CTI–3 to lead PG. In turn, gate CTIRL is turned off via input lead NCT1 which may be traced in the same figure via the intercircuit cable to contact 43CTI–4 and from thence to ground. This action turns on transistor CT1 for holding relay 43CTI operated.

Figure 45:
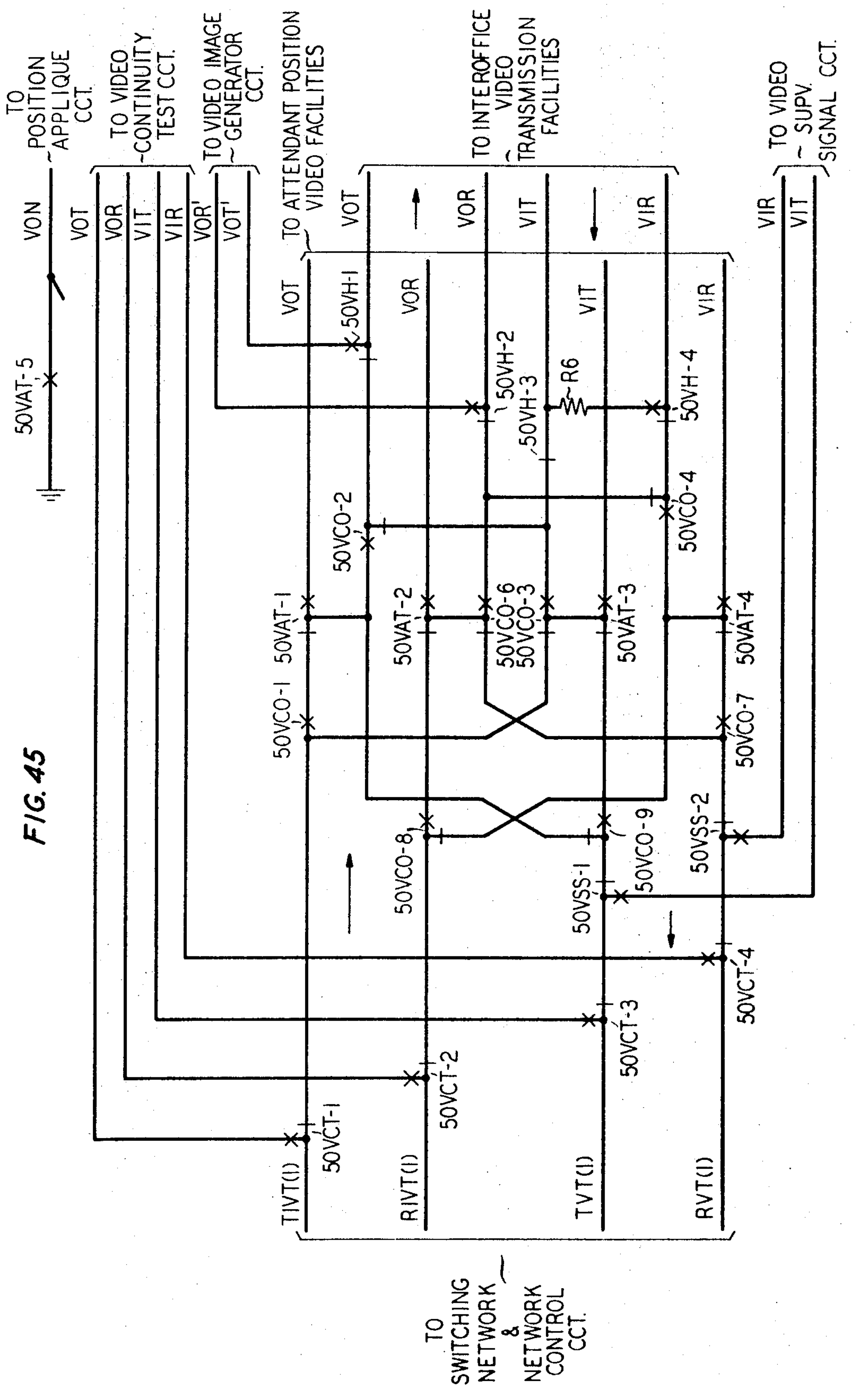

The video quad connection to the network, to the VCT circuit as well as to the transmission facilities which connects to the central office is shown in FIG. 45. The operation of relay 43CTI during the time that relay 43MI is operated causes the network quad appearance to be connected directly to the VCT circuit for the continuity test. With reference to FIG. 43 and therein near the bottom of the sheet, ground is connected via contacts 43CTI–1 and 43MI–4 and lead VR to the intercircuit cable. Lead VR connects in FIG. 47 to gate VCT C which is turned off. In turn, gate VCTST is turned on. The output of gate VCTST is connected to gate VCTOP of FIG. 50 via lead VCTST. This results in the operation or relay 50 VCT via gate VCT P. Referring once again to FIG. 45, it is manifest that the operation of relay 50VCT connects the network quad appearance to the VCT test circuit.

If the test is satisfactory, the VCT circuit returns a signal to the trunk circuit directly and relay 50VCT releases. With reference to the upper left-hand corner of FIG. 50, the VCT circuit connects a high signal to lead VCTND which is coupled via contact 50VCT–5 for turning on gate VCTRL. The latter in turn clamps the base of transistor VCT P to ground causing relay 50VCT to release and the network quad appearance (FIG. 45) to be disconnected from the VCT circuit.

Figure 40:
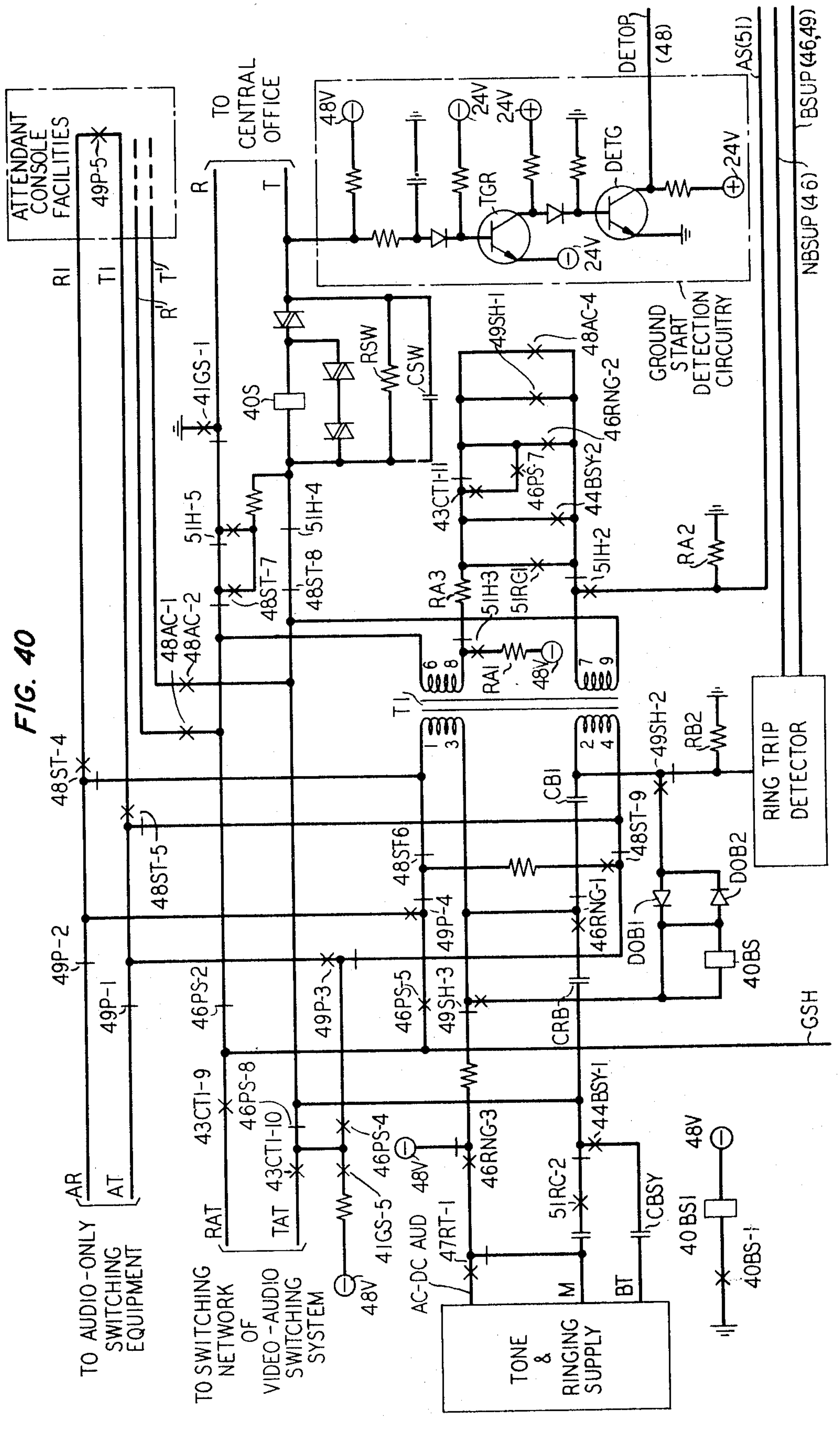
Figure 4I:
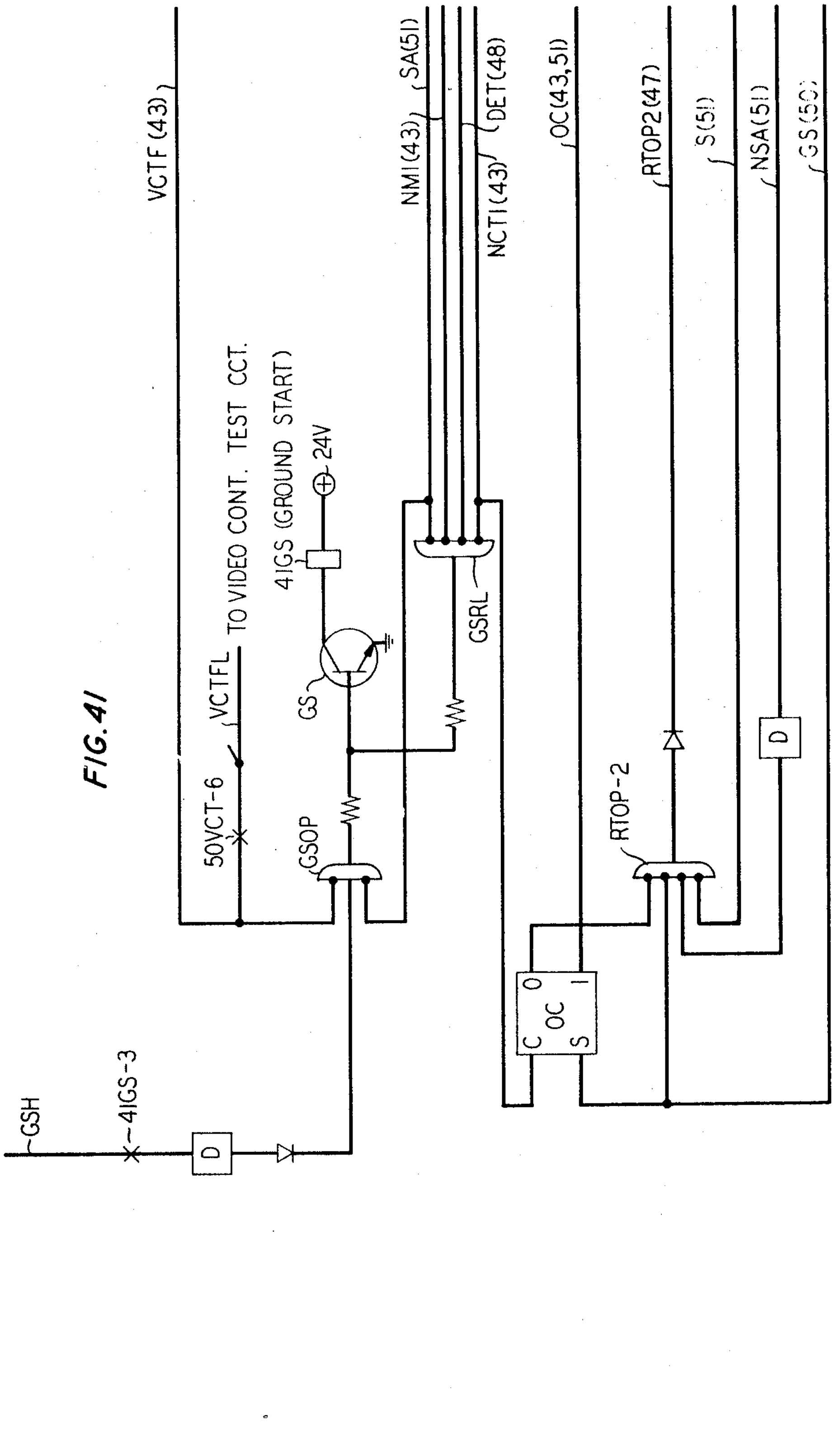
Figure 42:
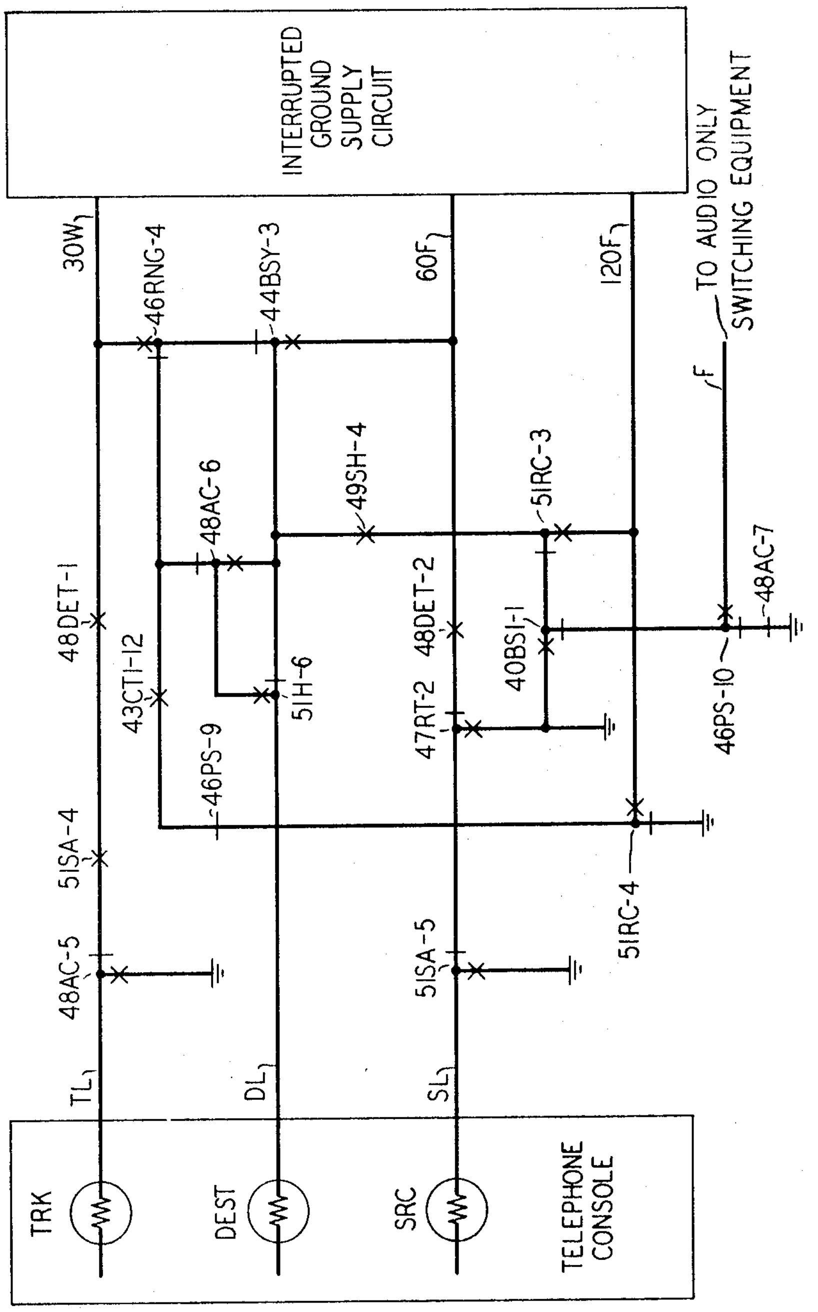

The trunk circuit also forwards a customary ground start signal to the central office and cuts through the video quad between the network appearance and the facilities. Specifically, in FIG. 41, relay 41GS is actuated when gate GSRL turns off. The latter is at this time essentially controlled by the operation of relays 43MI and 43CTI. As shown in FIG. 40, operated contact 41GS–1 connects ground to the R lead of the audio transmission path signalling that office. In addition, in FIG. 50, relay 50 VCO is operated directly by the operation of contact 41GS–2. This connects the video quad with the proper transposition so that the receive and transmit channels are aligned to the central office.

When the office responds to the seizure signal a register is connected to the audio path and dial tone is returned to the caller. Dialing over the audio path may commence in the conventional manner.

Incoming Call over the Video Trunk Circuit

On all incoming calls, before the distant office forwards a seizure signal to alert the video trunk circuit, it performs a video continuity test of the interoffice video facilities. Referring to FIG. 45 it will be observed that when relays 50VCO and 50VH are not operated (the condition when the video trunk circuit is idle) the leads VOT and VOR which connect to the interoffice facility, are respectively coupled by nonoperated contacts of the aforementioned relays to leads VIT and VIR. Thus, the office video signals received on leads VIT and VIR are returned to the office over leads VIT and VIR. In this manner, the office can verify the quality and continuity of the interoffice video quad before selecting this trunk circuit to extend the call. When the circuit is in fact seized, as will be subsequently discussed, this video loop-back is removed and the quad is cut through to the attendant video facilities.

If the continuity test indicates that the video path can be used, the distant office grounds the T lead of the audio path and this signal is detected by the ground detection circuitry indicated in FIG. 40. That circuitry produces a high signal output on lead DETOP which operates relay 48DET shown in FIG. 48. The operating path may be traced via lead DETOP and the intercircuit cable from FIG. 40 to FIG. 48 wherein transistor DET is turned on for operating relay 48DET. Operated contacts (not shown) on relay 48DET cause a signal to be forwarded to the attendant facilities indicating the trunk seizures.

Each video trunk circuit has an individual key and various supervisory lamp appearances (FIG. 42) in the attendant console. When relay 48DET operates, a source supervisory lamp (SCR) flashes at 60 interruption per minute. Since much of this lamp control circuitry is conventional, it is not discussed in detail herein. However, we have shown the lamp control circuitry in its entirety in FIG. 42.

Figure 48:
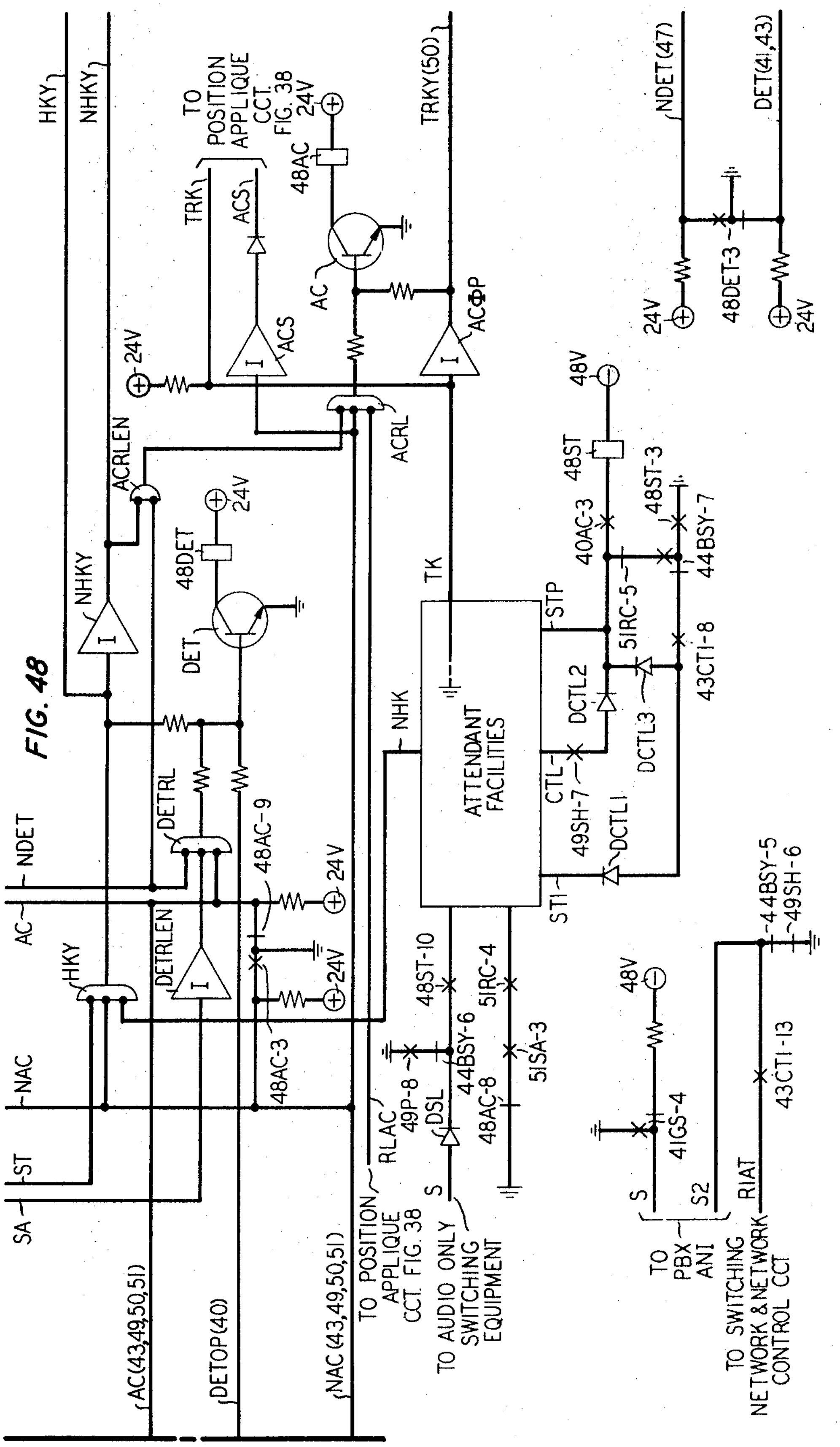
Figure 49:
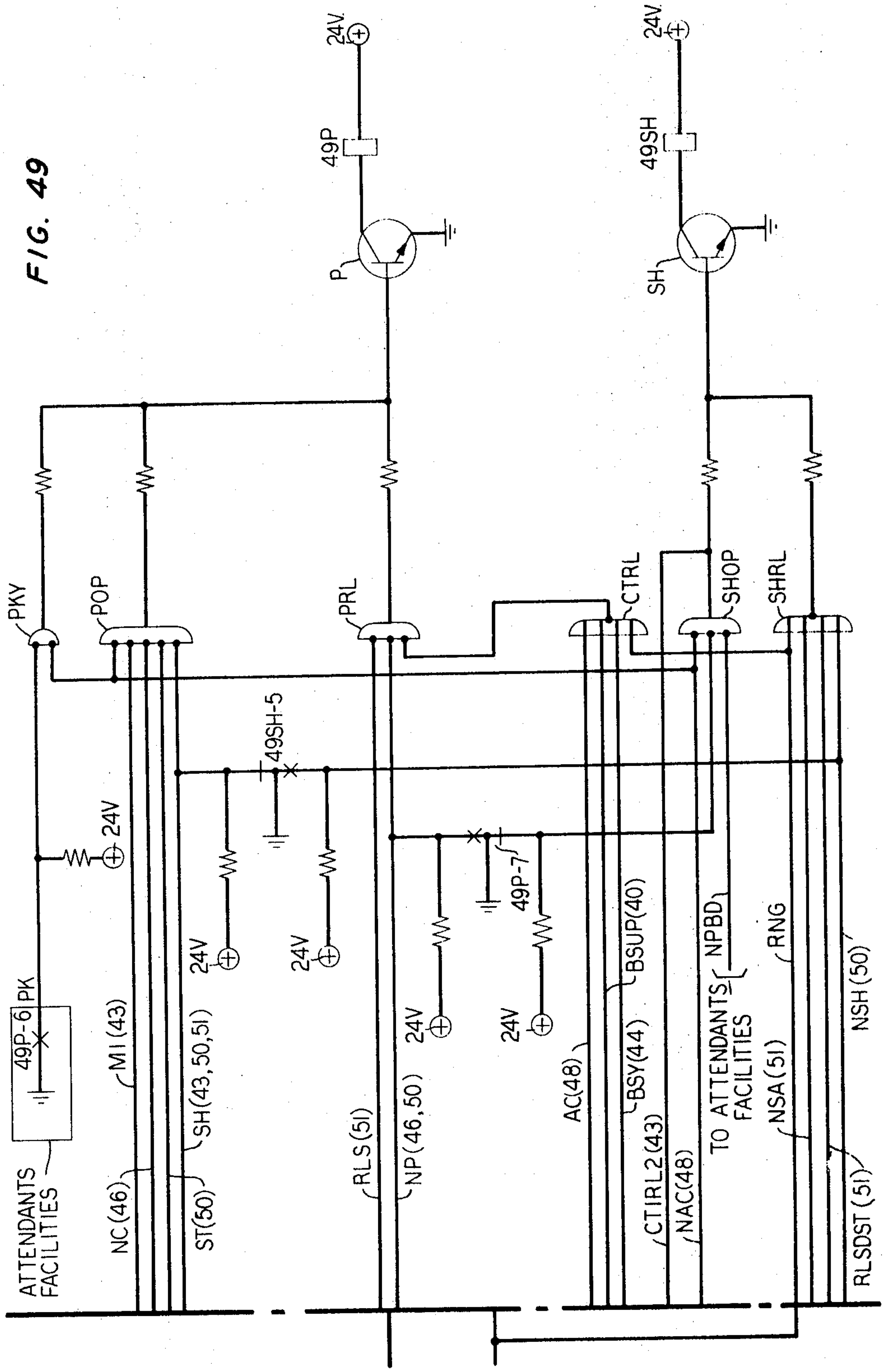

When the attendant answers the call, relay 48AC shown in FIG. 48 is operated. Operated contacts of this relay connect the attendant console control circuitry as well as the attendant audio facilities to the trunk circuit. Since the connection of the attendant audio facilities closes the loop comprising leads T and R to the distant office, supervisory relay 40S shown in FIG. 40 operates. This activates two relays, 50VCO and 50VAT, which couple the video quad from the interoffice facilities to the attendant console video facilities. At this point, the attendant has both audio and visual contact with the calling customer.

Figure 50:
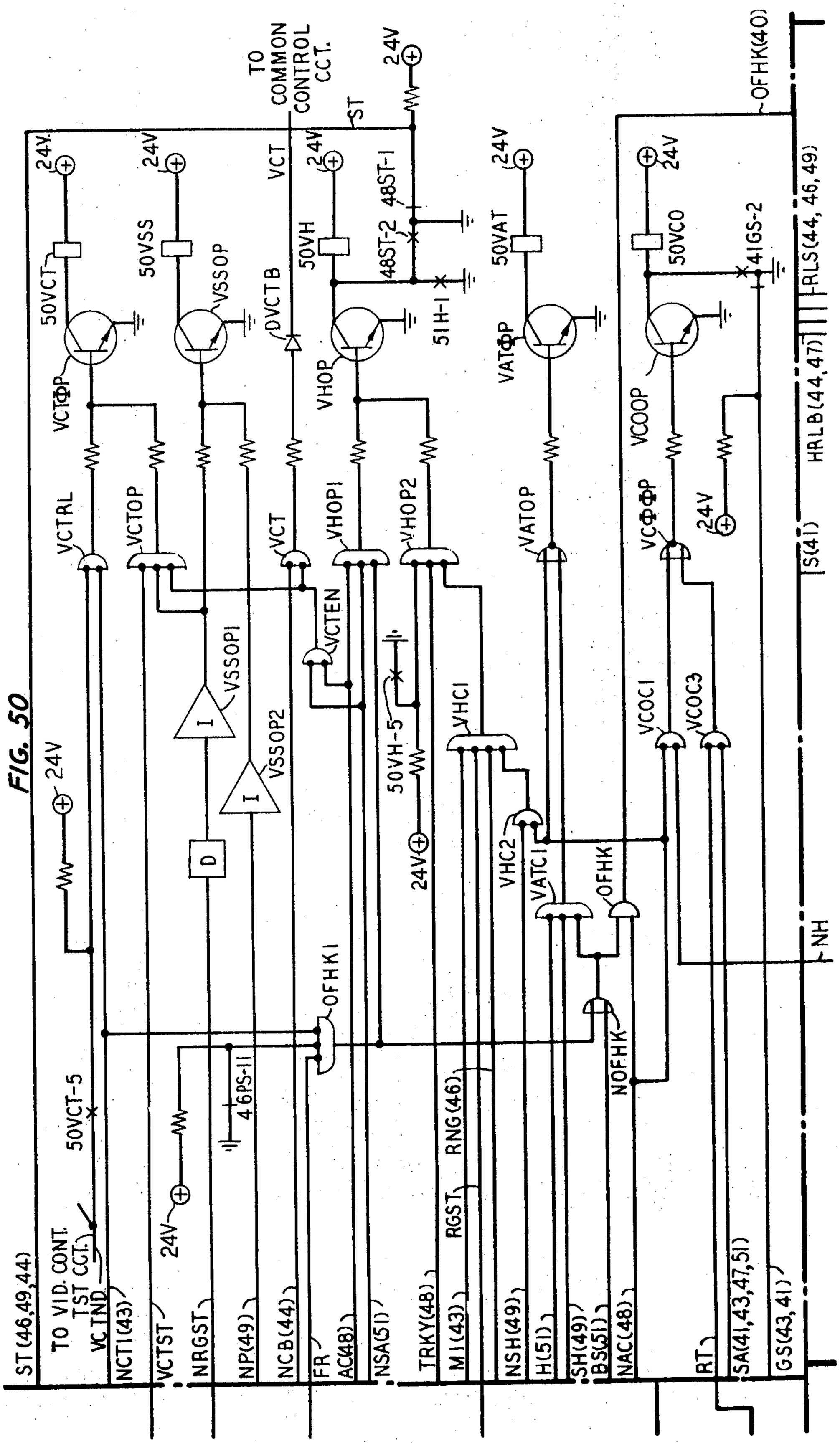
Figure 51:
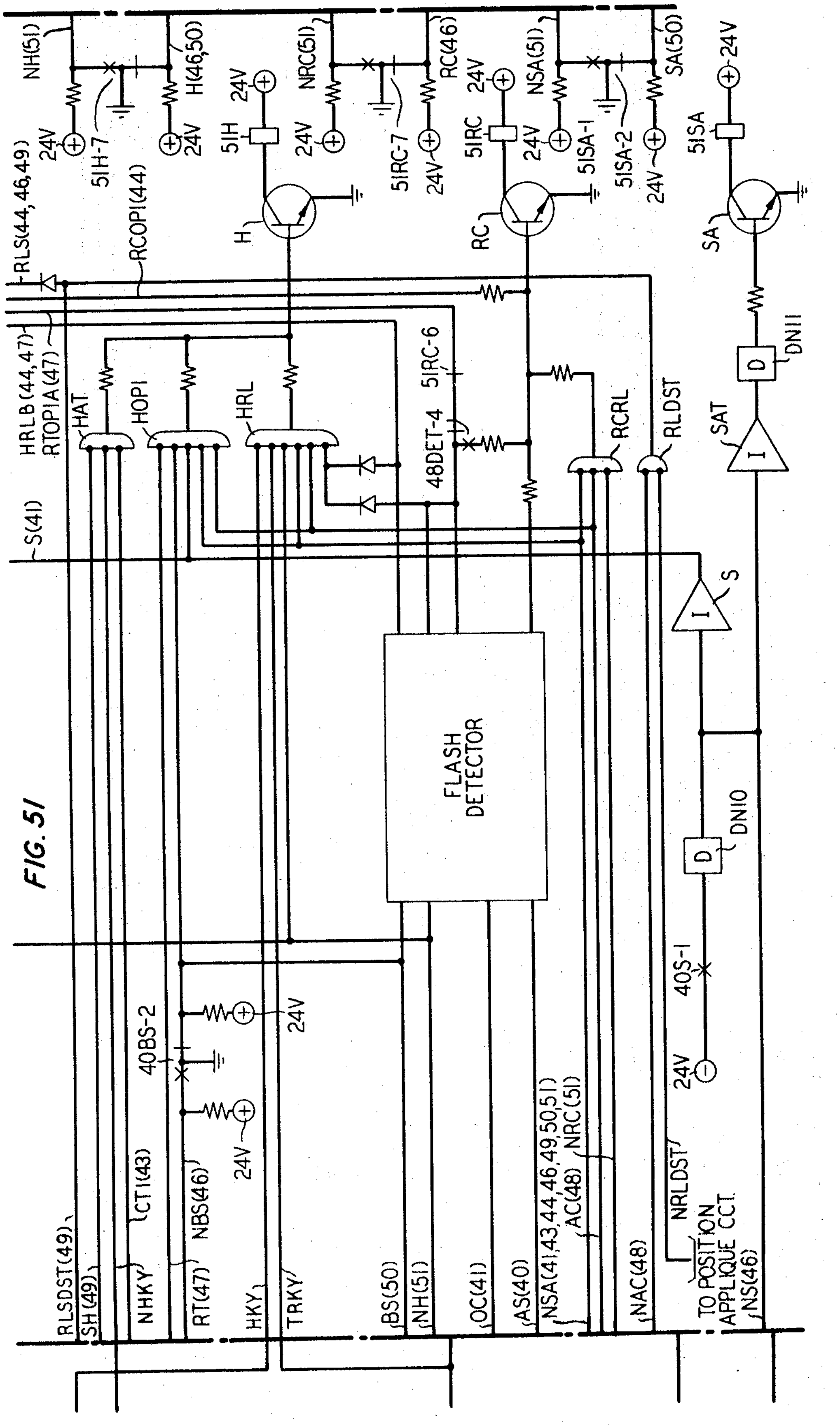

Considering the foregoing in greater detail, relay 48AC shown in FIG. 48 is operated when lead TK shown connecting to the attendant facilities in that same figure is grounded. The ground signal is inverted by inverter AC P and the output of the latter turns on gate AC operating relay 48AC. Referring to FIG. 40, the attendant console facilities are connected via leads T′ and R′ and contacts 48AC–1 and 48AC–2 to the central office audio path. This actuates relay 40S, the audio path supervisory relay. Relay 50VAT is operated by the operation of relay 48AC. With reference to FIG. 48 and to the left side thereof, ground is connected to lead NAC by operated contact 48AC–3. Lead NAC may be traced to FIG. 50 wherein gate VATOP is turned off and transistor VAT P is turned on for operating relay 50VAT. Turning next to FIG. 51, relay 51SA is operated in turn when contact 40S–1, shown in the lower left-hand corner of that figure is operated. The operation of relay 51SA is delayed by networks DN10 and DN11 located in the operating path. As shown above, the winding of relay 51SA, contact 51SA–2 removes ground from lead SA and as a result relay 50VCO operates. Lead SA may be traced from FIG. 51 to FIG. 50 wherein gate VCOC3 turns on and gate VC P turns off. In turn, transistor VCOOP is turned on and relay 50VCO operates. Thus, with relays 50VAT and 50VCO operated, as shown in FIG. 45, the interoffice video quad is connected to the attendant position video facilities over obvious paths.

Incoming Video Call on Hold

The attendant places the call on "hold" by depression of a console key and as a result the customary holding bridge is placed across the audio path from the distant office to maintain off-hook supervision. Importantly, during the hold condition, the incoming video signal path is terminated and a video image generator circuit is connected to the outgoing video signal path. Accordingly, the calling customer receives a commercial image, or the like, while on hold.

In FIG. 48, when the attendant depresses the hold key, lead NHK from the attendant facilities conveys a low signal which turns off gate HKY. The output of gate HKY, a high signal, is inverted by inverter NHKY and connected via lead NHKY to gate HAT shown in FIG. 51. Since all other inputs to gate HAT are low at this time, gate HAT turns off, transistor H turns on and relay 51H, the hold relay, is operated. In FIG. 50, relay 50VH is directly operated over an obvious path by operated contact 51H–1.

As shown in FIG. 45, leads VOT and VOR from the interoffice video transmission facilities are connected by make contacts of respective transfer contacts 50VH–1 and 50VH–2 to a video image generator circuit. Also, leads VIT and VIR from those facilities are bridged by resistor R6 via a make contact of transfer contact 50VH–4.

The hold condition is removed and the attendant is once again connected to the video trunk circuit by again depressing the trunk key unique to this circuit. As a result, the aforementioned low signal is removed from lead NHK and a low signal is applied once again to lead TK for reoperating relay 48AC. (The latter released when the hold key was operated.)

Extending Incoming Calls

It is to be noted that advantageously, the attendant may complete an incoming call over the video trunk circuit via the audio switching system or the video-audio switching system to the called terminal. Manifestly, since the incoming call is a video-audio call such calls are first attempted via the video-audio switching system and failing because switching facilities are not available or the called customer is unequipped for visual communication, the call may be retried via the audio switching system. This arrangement gives the attendant the necessary flexibility to substantially guarantee that at the least an audio connection path will be available to all incoming video-audio calls.

The video trunk circuit is connected both to the network of the audio switching system as well as to the network of the video-audio switching system in much the same manner as the video line circuit discussed hereinbefore. With reference to FIG. 40, which depicts the trunk circuit audio path supervisory circuitry and network appearance wiring, it is observed that leads RAT and TAT connect to the video-audio switching network. Also leads AR and AT connect to the audio switching system network. When the attendant depresses a so-called "-start" key after having connected her console facilities to the trunk circuit (operation of a trunk key) signals are forwarded to the video-audio switching system. The control CC is actuated for connecting a register circuit to the trunk circuit. It is to be noted that at this time the digit P is artificially generated in the register circuit and as a result the connected register is preconditioned to a video-audio call. The trunk circuit subsequently signals the audio switching system which also connects a register circuit to leads AR and AT. Dial tone is returned to the attendant and she may commence selection of the particular system for serving this call.

Artificially generating the P digit in the video-audio system register upon the connection of the register to a trunk circuit allows attendant to directly control the trunk circuit for releasing the audio system. If the attendant does not key a P digit before the address code, the trunk circuit is responsive to a signal from the position applique circuit (FIGS. 38 and 39) for releasing the video-audio system register. This entire procedure, it will be noted, is different in many essential respects from the video line circuit controlled release of audio-only or video-audio system register in response to or on the absence of a P digit. For example, the P digit is not forwarded to the video system register, translated there, and returned to the video trunk circuit to release the audio system, as is done if the call originated via a line circuit. Other differences and advantages of the trunk circuit arrangement will become apparent from a reading of the subsequent detailed description.

To extend the call, the attendant depresses the start key which, in FIG. 48, grounds lead STP from the attendant facilities. This causes relay 48ST to be operated over a path which includes the operated contact 40AC–3. The control CC is next signalled to enter a dial tone mode via leads IT and PJAM shown in the upper right corner of FIG. 43. Specifically, in FIG. 50, at about the right center of the figure, contact 48ST–1 removes ground from lead ST and a high signal is generated thereover. Lead ST connects to FIG. 44 wherein gate MICEN′ is turned on making lead MICEN low. In FIG. 43, lead MICEN together with numerous other leads which are low at this time, connect to gate MIC and it turns off producing the high signal on leads IT and PJAM. Included among the various inputs to gate MIC is lead J which connects to control CC. Lead J is low only when control CC is idle and thus gate MIC affords a first stage preference circuitry for control CC.

At this time, the trunk circuit marks its network appearance by operating relay 43MI. Referring once again to gate MIC, its output also turns on transistor MI and operates relay 43MI. As described hereinbefore, contacts 43MI–1 and 43MI–2 apply ground to leads TC1 and TD1, respectively, for marking the trunk circuit network appearance.

Turning next to the control CC response to the high signal on lead IT, as shown in FIG. 25, lead IT connects to gate TO which is turned on for forwarding a low signal via lead TO′ to gate TDTC of FIG. 23. If control CC is not busy serving a dial tone request (flip-flop LDT″ set) or operating in a read register mode (flip-flop RR″ set) flip-flop TDT′ is set giving preference to this call. In particular, gate TDTC is turned off and gate TDTA is actuated thereby for sending a "set" pulse via delay network DN12 to terminal S of flip-flop TDT″.

At terminal 1 of flip-flop TDT'', a high signal is produced and this enables circuitry of control CC for locating a register and marking its network appearance. The high signal may be traced via lead TDT from FIG. 23 to FIG. 24. Therein it is inverted by inverter MLR1 and applied to gate MLRO as well as to lead MLR. Gate MLRO applies a low signal to all register circuits via lead MLR'. In turn, those register circuits which are idle generate distinctive mark signals so that the idle circuit scanner (FIG. 25) can locate a register circuit for the call. The scanner is actuated via lead MLR which may be traced from FIG. 23 to FIG. 24. In FIG. 20, lead MLR connects to gate ICSC which turns off and enables the idle circuit scanner as hereinbefore described. When a register circuit is located, in FIG. 20, lead SSO is made high and gate SSIC turns on stopping the scanner. The register circuit marks its network appearance in anticipation of the trunk circuit-to-register circuit connection which is about to be completed.

Importantly, since this call is initiated by the video trunk circuit, control CC forwards a P DIGIT to the register circuit to precondition that circuit for a video-audio call. With reference to FIG. 24, as shown in the lower left corner, lead PJAM being high causes one input of gate PJTR to be low. Another input is also low at this time because of the presence of a high signal on lead MLR which turns on gate MR. The output of gate PJTR is applied via delay network DN13 resetting flip-flop PJAM. Thus, terminal 1 of flip-flop PJAM is low and since lead SSD is high, gate PBY' is turned off to generate a low signal on lead PBY to the selected register. In the register and with reference to FIG. 33, the signal on lead PBY clears flip-flop PF which in turn generates a high signal at its terminal 0 for operating relay 33PD and turning on transistor QPDT. Relay 33PD, it will be recalled from out prior discussion, advances the steering circuit ST1 for recording the remaining calling digits.

Summarizing briefly, a register circuit and the calling video trunk circuit are network marked in preparation for the call connection establishment. Also, the P digit, artificially generated, is recorded in the register circuit. Control CC, as discussed previously, sends a control signal to the network control circuit which completes the connection. Subsequently, control CC releases. In the trunk circuit, when the network control circuit pulses the connection, lead PG, shown in FIG. 43, is made low operating relay 43CT1. In operating, its contacts furnish a holding path (discussed earlier) by turning off gate CTIRL. Furthermore, in FIG. 48, lead ST1 to the attendant facilities is grounded resulting in the establishment of a second connection via the audio switching system. In particular, a path may be traced to ground beginning at lead ST1 via diode DCTL1 and operated contacts 43CT1–8 and 48ST–3. When the audio system connection is completed, the attendant receives a signal via one of her console lamps to commence dialing.

Let us presume, it is the intention of the attendant to establish a connection via the video-audio system. Initially, the attendant depresses a "P" key shown in FIG. 49 causing relay 49P to operate for releasing the audio system connection. The key operation grounds lead PK and gate PKY turns off. In turn, transistor P is turned on for operating relay 49P. In operating relay 49P:

1. opens leads AR and AT (FIG. 40) for releasing the audio switching system (contacts 49P–1 and 49P–2),
2. connects the attendant's pulsing circuitry to the audio path connection to the video-audio switching system, and
3. supplements the holding circuitry for maintaining the register circuit connection in the video-audio system (FIG. 40).

Thereafter, the attendant dials the customer address code and in response thereto control CC establishes a connection from the trunk circuit to the called line circuit, for example. It is to be noted that an intercom trunk circuit is not required in the exemplary connection since the video trunk circuit furnishes supervisory and battery feed functions directly.

If the attendant desires to establish the connection via the audio-only system then the connection to the video-audio system is released. When any digit is dialed, in FIG. 49 lead NPBD to gate SHOP conveys a low signal and gate SHOP is turned off. As a result, a relay 49SH operates and relay 43CTI releases opening leads RAT and TAT to the video-audio system register. More particularly, the high signal output of gate SHOP is coupled via lead CT1RL2 from FIG. 49 to FIG. 43 wherein it connects to gate CT1RL. The latter turns on and relay CT1 loses its holding circuit via transistor CT1 and releases. Leads RAT and TAT are opened by released contacts 43CT1–9 and 43CTI–10.

Called Station Answers Incoming Trunk Call

Figure 47:
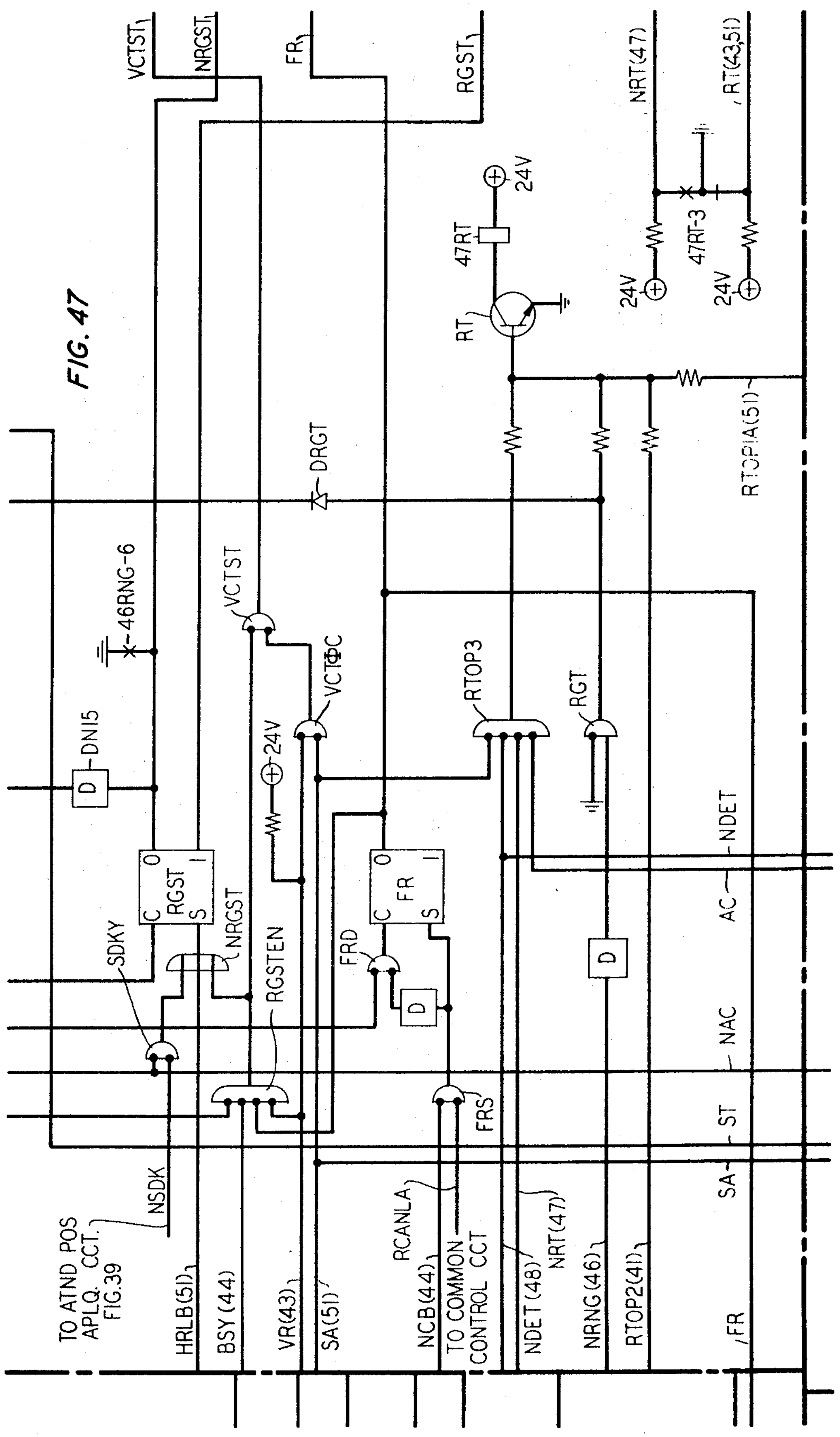

Control CC reads the code out of storage in the register circuit for locating and network marking the called line and initiates a callback sequence (line scanner activated) to mark the trunk circuit network appearance. When both marks are present, the connection is established. It is to be noted that the connection comprises both an audio as well as a visual part. Moreover, further note that a video continuity test is performed during the establishment of this connection. In particular, after the trunk circuit-to-line circuit is established, in FIG. 43 lead PG is low and relay 43CTI operates. The latter cuts through the audio transmission path. Gate MIC is turned on, momentarily grounding lead VR of FIG. 43 via contacts of relay 43MI and 43CT1. In FIG. 47, gate RGSTEN turns off and flip-flop RGS is set. Also gate VCTST turns on and gate VCTOP turns off for operating relay SOVCT. The latter connects the VCT circuit to the connection for the test.

The trunk circuit functions to provide a video supervisory signal as well as customary ringing of the called station. The supervisory signal is in the format of a video signal and turns on the called customer's visual equipment. The supervisory signal is sent at least 100 milliseconds before the customary ringing signal so that station equipment can detect the video call sufficiently in advance of customary ringing signal to furnish a distinctive local ringing signal. In particular, relay 50VSS, shown in FIG. 50, is operated at this time and it will be presumed that the VCT test is complete and relay 50VCT has just released. With reference to FIG. 45, make contacts of transfer contacts 50VSS–1 and 50VSS–2 couple leads VIR and VIT from video supervisory signal circuit via contacts 50VCT–3 and 50 VCT–4 and leads TVT and RVT to the called line.

Figure 46:
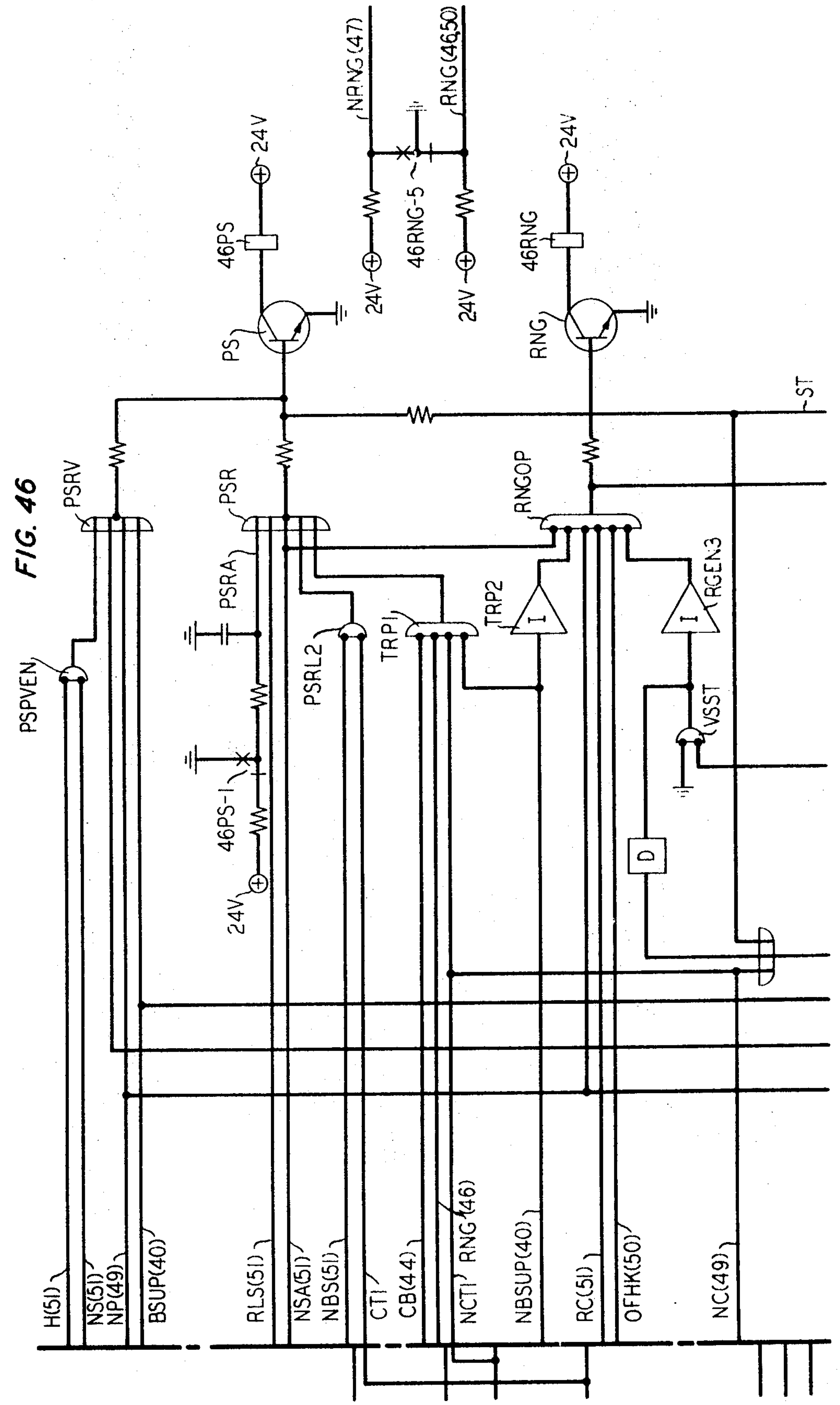

After a delay, customary ringing controlled by relay 46RNG of FIG. 46 is applied to the called line circuit. In FIG. 47, flip-flop RGST is set causing the operation of gate VSST of FIG. 46. It is noted that a delay network DN15 is interposed in the path to withhold the actuation of gate VSST for 200 milliseconds. When gate VSST turns off after the delay, gate RNG P and relay 46RNG are respectively turned off and operated for applying the ringing current to the audio path.

When the called customer answers, the audio path as well as the video path is immediately ready to send and receive the audio and video signals.

In summary, the foregoing discloses equipment for interconnecting a calling customer line concurrently to two independently operated switching systems. One system is equipped with wideband communication channels as well as audio channels. The other system includes only audio channels. A salient aspect of our invention is the provision of apparatus controllable by the caller for selectively releasing either one of the connected systems for choosing a system to complete a call connection. In the specific exemplary embodiment of out invention, the wideband communication channel is utilized to convey video signals between a calling and a called customer. It is however understood that out system is not so limited and, for example, telegraph, facsimile, etc., equipment may be interconnected by out inventive apparatus.

Incoming trunk calls are also connected to the two switching systems under control of attendant generated signals. Prior to dialing a customer address, the attendant selects one of the systems facilely by a key depression. A trunk circuit is responsive to the key operation to release one of the system connections. Also not disclosed in detail in the present illustrative embodiment, numerous applications of the principles of the disclosed invention are determined apparent. For example, it is within the purview of this invention to furnish the system release control circuitry entirely in a trunk circuit, a line circuit, or similar peripheral switching equipment. Moreover, our invention is not limited to application in a particular switching arrangement and may be utilized with so-called direct progressive or with commonly controlled switching systems. In addition, although exemplary embodiment discloses two autonomous systems and the controlled release of one of them by customer signals, we contend that our teaching encompasses arrangements wherein a plurality of systems are concurrently connected to the caller and all but one are released prior to the transmission of an address code. Thus we contemplate providing separate systems, each capable of furnishing unique services which systems are initially connected to a customer in order that he may selectively release any of those systems. Various other applications in light of this teaching may be devised by those skilled in the art without departing from the spirit and scope of this invention.

What is claimed is:

1. A video telephone switching arrangement for establishing audio-only as well as video-audio call connections under the selective control of calling customers comprising a first and a second telephone switching system, a plurality of customer stations each connectable in multiple to both of said switching systems, means actuated by a calling one of said stations for establishing a first connection from said calling station to said first switching system, means responsive to the establishment of said first connection for sending a service request signal to said second switching system, and means responsive to said signal for controlling the establishment of a second connection between said calling station and said second system, whereby said calling station is simultaneously connected in multiple to the first as well as to the second switching systems.

2. The arrangement described by claim 1 and further including means sending an indication signal over said second connection to said calling station for indicating that both connections to said systems are established.

3. The arrangement recited in claim 1 further including means under the control of said calling station for selecting one of said first and second switching systems to control the completion of a call connection from said calling station to a called station.

4. The invention set forth in claim 3 wherein said selecting means includes means for registering a distinctive signal sent from said calling station, and means responsive to the receipt of said distinctive signal for releasing said first switching system thereby selecting said second system for completion of the call connection to said called station.

5. The invention recited in claim 3 wherein said selecting means includes means activated upon the receipt of a first portion of a called station address code for releasing said second switching system thereby selecting automatically said first switching system for completing said call connection to said called station.

6. The invention set forth in claim 3 wherein said calling station includes a terminal in each of said switching systems and wherein said arrangement further includes means controlled by said selecting means for making busy said terminal in the released one of said systems to all other calls until said call connection is released.

7. communication switching equipment comprising a plurality of switching systems for independently establishing respective connections between a calling and called line, means responsive to a call for establishing concurrently a connection between said calling line and each one of said systems, means in a first one of said systems effective after the establishment of all connections from said calling line to said systems for returning an indicating signal over said calling line, and means actuated by a distinctive signal forwarded over said calling line for releasing all but one of said systems over which a call connection between said calling and called line is subsequently established.

8. The equipment described in claim 7 wherein said releasing means includes means situated in a second one of said systems responsive to signals representative of a first portion of an address code of said called station to release all systems but said one system which returned said indicating signal, and means responsive to a distinctive signal preceding said address code to release alternatively all systems but said second one of said systems.

9. The equipment depicted in claim 7 wherein at least one of said systems includes means for establishing plural paths which include audio as well as relatively wider bandwidth communication paths in response to one call, and said releasing means is selectively actuatable to release all systems but said plural path system which in response to the receipt of an address code of said called station establishes plural paths between said calling and called stations.

10. The equipment recited in claim 7 wherein each of said systems is capable of independently establishing calling connections to said calling line in response to calling signals, and further including means responsive to said releasing means to busy said calling line to calling connections via released ones of said systems.

11. A switching arrangement comprising a first and second switching system, a plurality of stations of which at least one of said stations having a plurality of communication paths extending therefrom, one of said plurality of paths being selectively connectable to said first and second system for the establishment of a call connection via either of said systems to said one station, another of said paths being directly connected to said first system, and means responsive to the establishment of a call connection via said first system from said one station to a called one of said stations for automatically establishing a companion connection via said first system and said other path also between said one station and said called station.

12. The arrangement set forth in claim 11 further including means responsive to a call request for initially connecting said one path to both said first and second system, and means in said second system for returning to said calling station an indication signal that said one path is connected to both systems and that said other path is connected to said first system for connection.

13. The invention set forth in claim 12 further including means selectively operative prior to the transmission of the entire address code of said called station for releasing said second system thereby selecting said first system to establish a call connection via said one and other paths from said calling to said called station.

14. Communication equipment comprising a plurality of stations, selected ones of said stations being equipped with an audio communication device as well as a relatively wider bandwidth communication device, a first switching system connectable to all of said stations for establishing first audio communication paths therebetween, a second switching system connectable only to said selected ones of said stations for establishing second audio communication paths between audio devices at said stations concurrently with the establishment of different communication paths which have relatively wider bandwidths than said first and second audio paths between said wide bandwidth devices at said selected stations, means responsive to a service request signal from a selected one of said stations for connecting said station audio device concurrently to said first and second switching system, and means selectively operative after the establishment of said concurrent connections for directing a particular one of said systems to establish a respective first or second audio path between audio devices at said selected and a called station.

15. The equipment claimed in claim 14 including means in said second switching system operative during the establishment of a second audio path between selected stations for automatically establishing said different paths between wider bandwidth devices at said same selected stations.

16. The equipment set forth in claim 15 including means actuated during the establishment of said different path for connecting path continuity test circuitry thereto for verifying path continuity and bandwidth capability.

17. The equipment of claim 16 also including means responsive to a signal from said continuity test circuitry indicating a failure of said different path for preventing the establishment of said second audio path.

18. A video line circuit for connecting station audio and visual equipment to two switching systems comprising, means connecting said visual equipment directly to a first one of said systems, means responsive to a signal from said station audio equipment for requesting extension of a connection from said audio equipment to a second one of said systems, means responsive to a signal from said second system and after establishment of said connection to said second system for requesting extension of a connection from said audio equipment to said first system, and means responsive to a release signal from said second system sent after the connection to both systems and before the receipt of the entire address code of a called station for selectively releasing said respective first or second systems.

19. In a communication switching system for extending incoming connections over interoffice audio as well as video trunks to two switching systems a video trunk circuit comprising means responsive to a seizure signal received over said audio trunk for indicating an incoming audiovisual call, means responsive to said indicating means for requesting a connection to a first one of said systems, means actuated after the establishment of the first system connection for controlling the establishment of a second connection from said circuit to a second one of said systems, said first system being capable of establishing audio-only connections while said second system is capable of the establishment of audio-video connections, and means actuated after said connection to both systems for releasing one of said systems thereby selecting the other one of said systems to extend a call connection from said audio as well as said video trunk.

20. A switching arrangement including two independently operative switching systems each capable of establishing call connections, means responsive to a call request signal from a calling line for establishing a dual connection, said dual connection comprising one connection from said calling line to a first one of said systems and a second connection from said calling line to a second one of said systems, and means for returning a signal to said calling line indicative of the establishment of said dual connection characterized by, equipment controlled by the receipt of a distinctive signal via said calling line for selectively releasing said one system thereby selecting said second system to receive an address code of a called line for directing the establishment of a call connection via said second system.

21. In combination, a first and a second switching system, means responsive to the receipt of a call request signal for connecting a calling line to said first switching system, means responsive to the said connection to said first switching system for sending a second call request signal to said second switching system, means actuated upon the receipt of said second call request signal for establishing a second connection from said calling line to said second switching system, means actuated after the establishment of said second connection for sending an indication signal to said calling line, means in said first switching system automatically enabled after a predetermined time interval for directing the release of said second connection, and means actuated by said directing means for returning a distinctive signal to notify the caller of the timing of the interval and the release of the second connection.

22. The combination recited in claim 21 further including means responsive to selecting signals forwarded by said caller within said time interval for disabling said directing means, and means responsive to said selecting signals for selecting said first or second switching system to control the completion of said call connection.

23. A switching arrangement for selectively establishing wideband communication channels in addition to audio communication channels via independently operated switching systems comprising a line circuit responsive to the receipt of a call request signal for forwarding a first seizure signal to a first one of said systems, scanner means in said first system for identifying said line circuit, a first register, means actuated by said scanner means for connecting said line circuit to said register, means in said register enabled by the seizure of said register for sending a distinctive signal to said line circuit, said line circuit being responsive to the receipt of said distinctive signal for transmitting a second seizure signal to a second one of said systems, a second register, means responsive to said second seizure signal for establishing a second connection from said line circuit to said second register.

24. The arrangement set forth in claim 23 further including signaling means in said second register for sending dial tone over said second connection and said line circuit to said caller for indicating the respective system connections.

25. The arrangement set forth in claim 23 further including detection means in said first register responsive to the receipt of a system selection signal sent by the caller via the line circuit connections and means in said line circuit responsive to the receipt of a release signal thereafter sent by said detection means for releasing said second connection to said second system.

26. The arrangement claimed in claim 25 further including an audio as well as a wideband switching network in said first system, and wherein said first register is responsive to the receipt of an address code of a called station for actuating said connecting means and said actuated connecting means establishes an audio as well as a wideband communication channel via said audio and wideband switching network between said line circuit and a called line circuit.

27. In a communication arrangement including two independently operated switching systems, said systems being concurrently connected on each request for service to each calling terminal and one of said systems being released before each caller sends the address code of a particular called customer, a register circuit in one of said systems connectable to each calling terminal during a call and including detection circuitry for recording a system selection signal generated by a caller and means included in said register circuit responsive to said detection circuitry for transmitting a release signal to control the release of the connection between said calling terminal and the other one of said systems.

28. The invention claimed in claim 27 wherein said register circuit includes means actuated upon a connection of said register circuit to prescribed calling terminals for simulating during each call a system selection signal, and means disabling said transmitting means when said signal is simulated to prevent the release of the connection to said other system by transmission of said release signal.